(12) United States Patent
Takemoto et al.

(10) Patent No.: US 9,923,420 B2
(45) Date of Patent: Mar. 20, 2018

(54) CLAW POLE STATOR MOTOR AND BLOWER

(71) Applicant: ASMO CO., LTD., Shizuoka-ken (JP)

(72) Inventors: Yoshiaki Takemoto, Toyohashi (JP); Shigemasa Kato, Toyohashi (JP); Masashi Matsuda, Kakegawa (JP)

(73) Assignee: ASMO CO., LTD., Shizuoka-ken (JP)

( * ) Notice: Subject to any disclaimer, the term of this patent is extended or adjusted under 35 U.S.C. 154(b) by 250 days.

(21) Appl. No.: 15/044,882

(22) Filed: Feb. 16, 2016

(65) Prior Publication Data

US 2016/0248283 A1    Aug. 25, 2016

(30) Foreign Application Priority Data

Feb. 19, 2015 (JP) .................................. 2015030685
Feb. 26, 2015 (JP) .................................. 2015037146
(Continued)

(51) Int. Cl.
*H02K 1/14* (2006.01)
*H02K 1/22* (2006.01)
(Continued)

(52) U.S. Cl.
CPC ............. *H02K 1/145* (2013.01); *F04D 17/16* (2013.01); *F04D 25/0606* (2013.01);
(Continued)

(58) Field of Classification Search
CPC .......... H02K 1/145; H02K 1/226; H02K 3/28; H02K 16/00; H02K 16/02; H02K 16/04
(Continued)

(56) References Cited

U.S. PATENT DOCUMENTS 3,083,216 A    3/1963  Takemoto et al.
6,590,312 B1 *  7/2003  Seguchi .................. B60K 6/26
                                                    310/114
(Continued)

FOREIGN PATENT DOCUMENTS

JP    H 11-332200 A    11/1999
JP    2007-181303 A     7/2007
(Continued)

*Primary Examiner* — John K Kim
(74) *Attorney, Agent, or Firm* — Bradley L. Thorson; Patterson Thuente Pedersen, P.A.

(57) ABSTRACT

A motor includes a stator and a rotor. The stator includes an inner circumference stator section and an outer circumference stator section. The inner circumference stator section and the outer circumference stator section each include two stator cores and a coil. The two stator cores each include claw poles and are coupled to each other. The coil is arranged between the two stator cores. The rotor includes an inner circumference magnet and an outer circumference magnet. The inner circumference magnet, which is arranged at an inner circumferential side of the inner circumference stator section, opposes the claw poles in the radial direction. The outer circumference magnet, which is arranged at an outer circumferential side of the outer circumference stator section, opposes the claw poles in the radial direction. The inner circumference stator section and the inner circumference magnet form an inner circumference motor unit. The outer circumference stator section and the outer circumference magnet form an outer circumference motor unit.

20 Claims, 36 Drawing Sheets

(30) Foreign Application Priority Data

Aug. 7, 2015 (JP) .................................. 2015157485
Aug. 7, 2015 (JP) .................................. 2015157486

(51) Int. Cl.
| | |
|---|---|
| *H02K 3/28* | (2006.01) |
| *F04D 17/16* | (2006.01) |
| *F04D 29/28* | (2006.01) |
| *F04D 29/42* | (2006.01) |
| *F04D 25/06* | (2006.01) |
| *H02K 37/12* | (2006.01) |
| *H02K 1/27* | (2006.01) |
| *H02K 16/00* | (2006.01) |

(52) U.S. Cl.
CPC ....... *F04D 29/281* (2013.01); *F04D 29/4226* (2013.01); *H02K 1/2713* (2013.01); *H02K 16/00* (2013.01); *H02K 37/12* (2013.01)

(58) Field of Classification Search
USPC ....................... 310/112, 114, 156.37, 156.66
IPC ........................................ H02K 1/14, 1/22, 3/28
See application file for complete search history.

(56) References Cited

U.S. PATENT DOCUMENTS

| | | | |
|---|---|---|---|
| 6,727,632 B2* | 4/2004 | Kusase | H02K 1/27 310/112 |
| 2007/0145854 A1 | 6/2007 | Enomoto et al. | |
| 2007/0164628 A1* | 7/2007 | Fonseca | B60L 11/123 310/112 |
| 2014/0042851 A1 | 2/2014 | Takemoto et al. | |
| 2014/0091662 A1* | 4/2014 | Kim | D06F 37/304 310/114 |
| 2016/0248283 A1* | 8/2016 | Takemoto | H02K 1/145 |

FOREIGN PATENT DOCUMENTS

| | | |
|---|---|---|
| JP | 2009-071984 A | 4/2009 |
| JP | 2014-161198 A | 9/2014 |

* cited by examiner

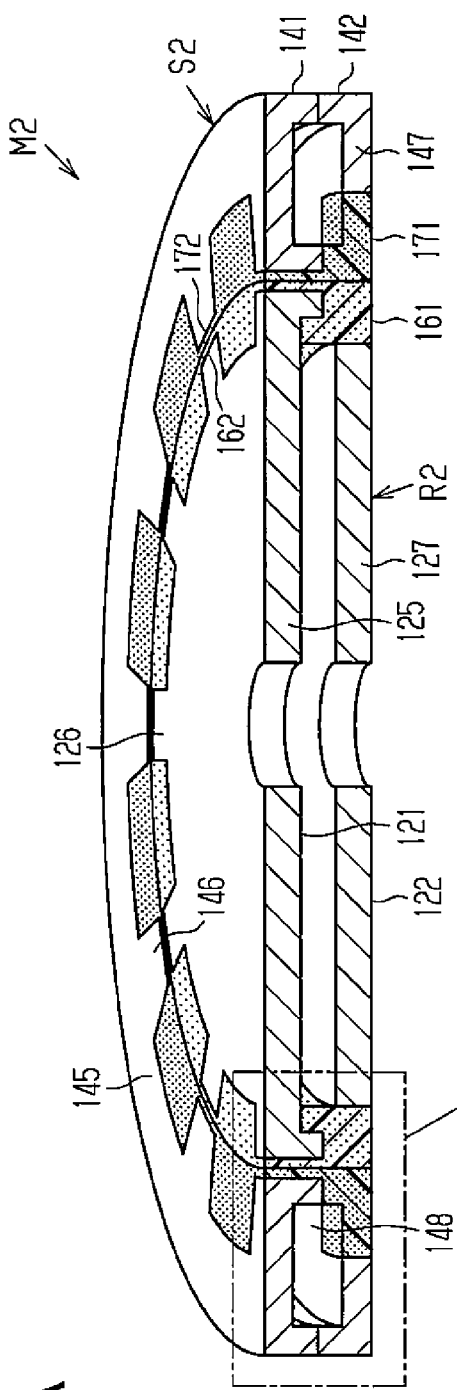
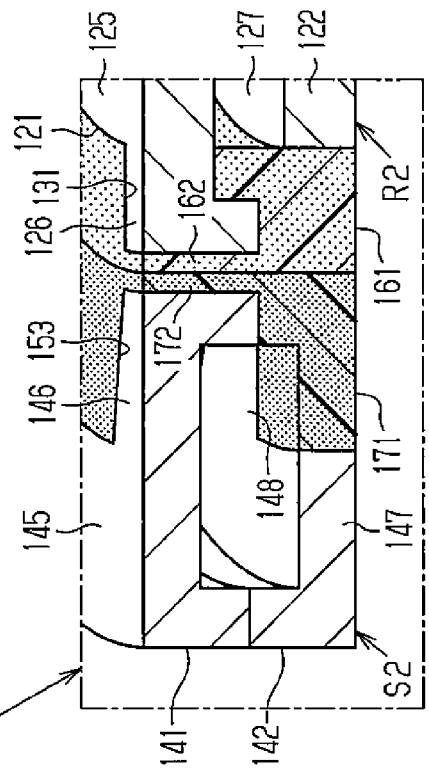
Fig.28A
Fig.28B

CLAW POLE STATOR MOTOR AND BLOWER

BACKGROUND ART

The present invention relates to a motor and a blower.

Japanese Laid-Open Patent Publication No. 2007-181303 describes a prior art example of known motor including a stator having the so-called Lundell structure and a rotor with a permanent magnet opposing the stator in the radial direction and serving as a magnetic pole. The Lundell structure stator includes two stator cores each having an annular shape and including a plurality of claw poles arranged in a circumferential direction. The two stator cores are combined so that their claw poles are alternately arranged in the circumferential direction. A coil portion is arranged between the two stator cores in an axial direction. The coil portion cause the claw poles of the two stator cores to function as magnetic poles that differ alternately.

In the motor described in Japanese Laid-Open Patent Publication No. 2007-181303, when the rotor and the stator are increased in diameter to enlarge the area of the gap between the stator and the rotor and increase the output, dead space is produced in an inner circumferential portion. This is not desirable when reducing the motor in size. In this regard, there is room for improvement.

In the motor described in Japanese Laid-Open Patent Publication No. 2007-181303, when sets of the Lundell structure stator and the permanent magnets of the rotor are arranged in the radial direction of the motor to increase the output, the stators generate heat that causes the motor to be hot. This may adversely affect the motor performance.

A further known Lundell motor includes a Lundell rotor provided with two rotor cores, each including claw poles arranged in the circumferential direction, and permanent magnets arranged between the rotor cores. The permanent magnets function to cause the claw poles of the two rotor cores to function as magnetic poles that differ alternately. Japanese Laid-Open Patent Publication No. 2014-161198 describes a Lundell motor including a Lundell stator in addition to the Lundell rotor. The rotor and the stator both have the Lundell structure. Thus, the Lundell motor is also referred to as a multi-Lundell motor.

The multi-Lundell motor has a feature in that the number of poles can be changed by changing the number of claw poles. This allows the number of poles to be easily increased.

In the Lundell stator of Japanese Laid-Open Patent Publication No. 2014-161198, the two stator cores have a tendency to be displaced in the rotational direction. When the two stator cores are displaced in the rotational direction, the claw poles are moved away from one another in the rotational direction. This may disturb the magnetic flux.

Furthermore, in the Lundell rotor, the two rotor cores have a tendency to be displaced in the rotational direction. When the two rotor cores are displaced in the rotational direction, the claw poles are moved away from one another in the rotational direction. This may disturb the magnetic flux.

Disturbance of the magnetic flux in the motor may generate vibration and noise.

Japanese Laid-Open Patent Publication No. 11-332200 describes a brushless motor used as a drive source for a blower. In the brushless motor, a stator includes a stator core, which includes teeth that extend in the radial direction, and a coil, which is wound around each tooth. A rotor of the motor includes a yoke, which is fixed to and rotated integrally with a rotation shaft, and permanent magnets, which are fixed to the yoke and serve as magnetic poles of the rotor.

In the motor for the blower described above, the number of poles may be changed in the rotor and the stator. In this case, the number of permanent magnets and the like need to be changed in the rotor. Further, the number, winding, and the like of coils need to be changed in accordance with the changed number of teeth in the stator. Thus, it is difficult to change the number of poles.

SUMMARY OF THE INVENTION

A first object of the present invention is to provide a motor that increases the output and reduces dead space without enlarging the motor. A second object is to provide a multi-Lundell motor that reduces disturbance of the magnetic flux. A third object is to provide a blower that can easily be applied to changes in the number of poles of a motor.

To achieve the above objects, one aspect of the present invention is a motor including a stator and a rotor. The stator includes an inner circumference stator section and an outer circumference stator section, which is located at an outer circumferential side of the inner circumference stator section. The inner circumference stator section and the outer circumference stator section each include two stator cores and a coil. The two stator cores each include a plurality of claw poles in a circumferential direction. The stator cores are coupled to each other so that the claw poles of one of the stator cores and the claw poles of the other one of the stator cores are alternately arranged in the circumferential direction. The coil is located between the two stator cores in an axial direction to cause the claw poles to function as magnetic poles. The rotor is rotated by a rotating magnetic field generated at the stator. The rotor includes an inner circumference magnet and an outer circumference magnet. The inner circumference magnet is located at an inner circumferential side of the inner circumference stator section and opposed to the claw poles in a radial direction. The outer circumference magnet is located at an outer circumferential side of the outer circumference stator section and opposed to the claw poles in the radial direction. The inner circumference stator section and the inner circumference magnet configure an inner circumference motor unit. The outer circumference stator section and the outer circumference magnet configure an outer circumference motor unit.

A second aspect of the present invention is a motor including a rotor, a stator, and at least one of a rotor insulator and a stator insulator. The rotor includes first and second rotor cores and a permanent magnet. The first and second rotor cores are stacked in an axial direction and each include a plurality of claw poles arranged in a circumferential direction. The permanent magnet is located between the first rotor core and the second rotor core and magnetized in the axial direction. The stator includes first and second stator cores and a coil. The first and second stator cores are stacked in the axial direction and each include a plurality of claw poles arranged in the circumferential direction. The coil is located between the first stator core and the second stator core and extended in the circumferential direction. The rotor insulator is engaged with at least one of the claw poles of the first rotor core and at least one of the claw poles of the second rotor core in a manner restricting relative movement in the circumferential direction. The stator insulator is engaged with at least one of the claw poles of the first stator core and at least one of the claw poles of the second stator core in a manner restricting relative movement in the circumferential direction.

A third aspect of the present invention is a blower including a motor and a fan. The motor includes a rotor and a stator arranged opposing each other in a radial direction. The fan is configured to be rotatable integrally with the rotor. The motor includes a motor housing, the rotor, and the stator. The rotor includes a first rotor core, a second rotor core, and a permanent magnet. The first and second rotor cores each include a claw pole including a core base configured to be rotatable integrally with the fan, a basal portion extending in the radial direction from the core base, and a magnetic pole portion extending in an axial direction from a distal end of the basal portion. The permanent magnet is located between the first and second rotor cores and magnetized in the axial direction. The stator includes a first stator core, a second stator core, and a coil. The first and second stator core each include a claw pole including a core base supported by the motor housing, a basal portion extending in the radial direction from the core base, and a magnetic pole portion extending in the axial direction from a distal end of the basal portion. The coil is located between the first and second stator cores and extended in a circumferential direction.

BRIEF DESCRIPTION OF THE DRAWINGS

FIGS. 28A and 28B are cross-sectional views of a motor unit in a fifth embodiment.

DETAILED DESCRIPTION OF THE PREFERRED EMBODIMENTS

First Embodiment

A motor according to a first embodiment is described below.

Figure 1:
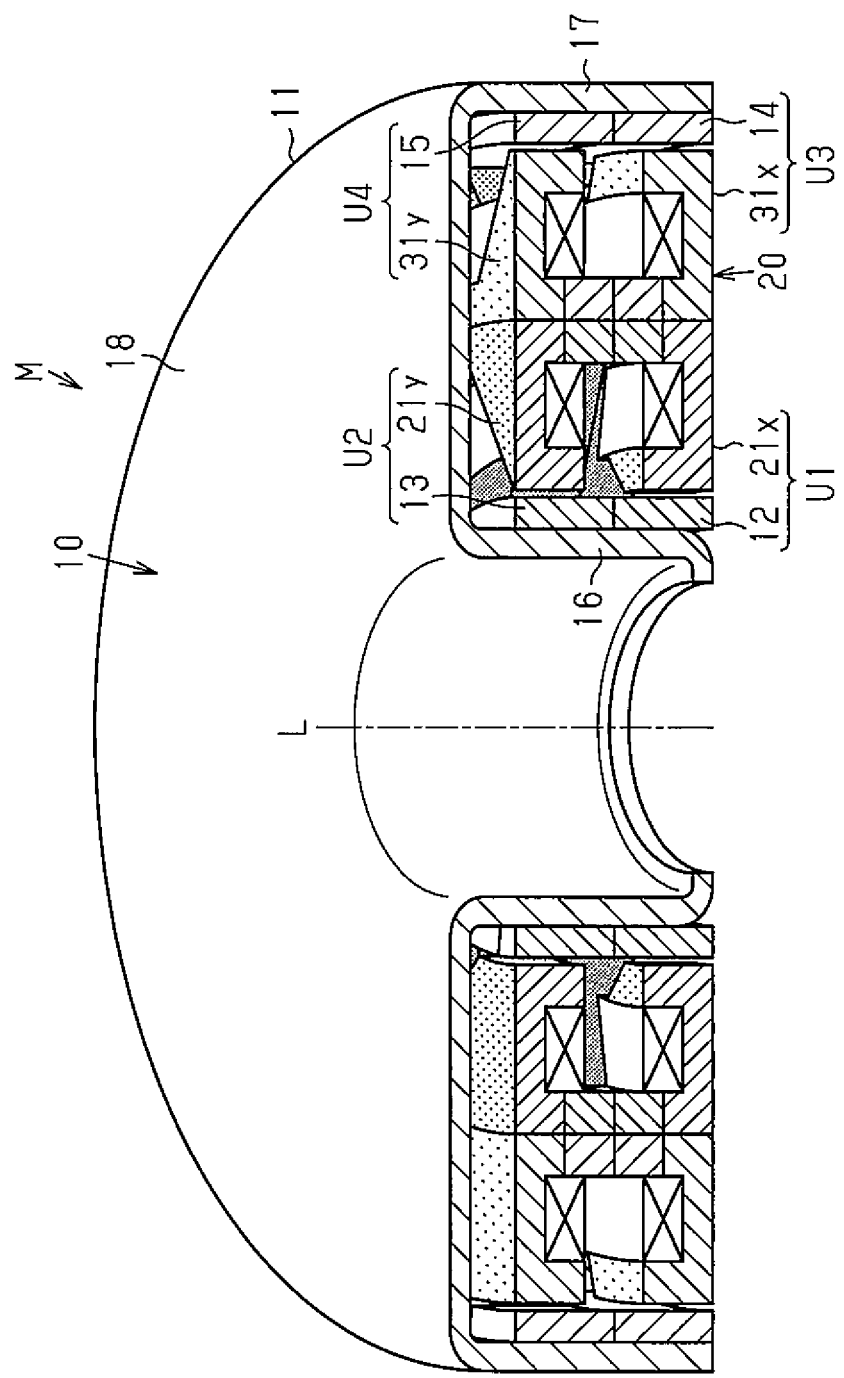
FIG. 1 is a perspective cross-sectional view of a motor according to a first embodiment of the present invention.

As illustrated in FIG. 1, a motor M according to the present embodiment is a brushless motor and includes a rotor 10 rotatably supported by a shaft of a housing (not illustrated) and a stator 20 fixed to the housing.

[Configuration of Rotor]

Figure 2:
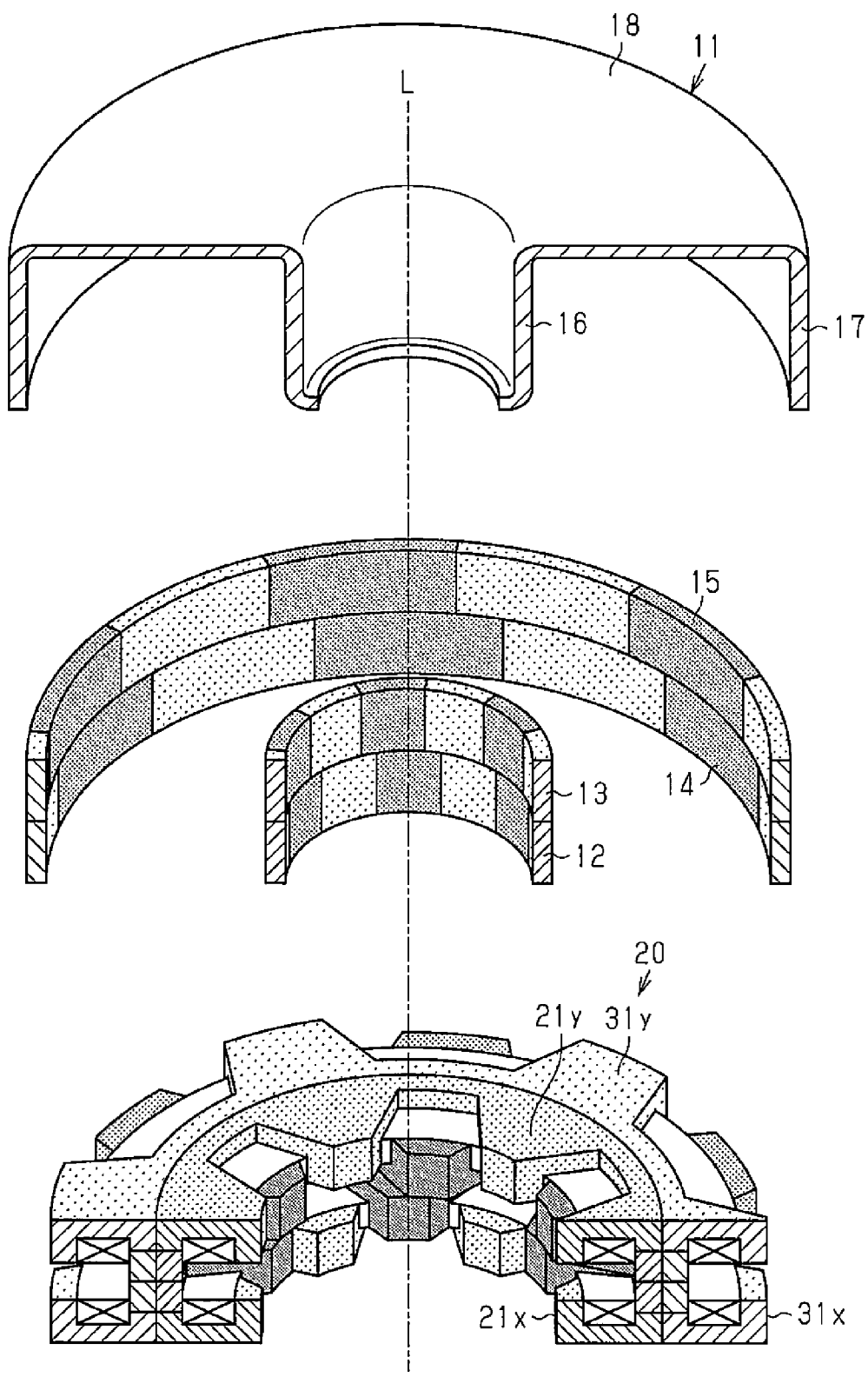
FIG. 2 is an exploded perspective view of the motor shown in FIG. 1.

As illustrated in FIG. 1 and FIG. 2, the rotor 10 includes a rotor core 11, which is formed by a magnetic body, and inner circumference magnets 12 and 13 and outer circumference magnets 14 and 15 that are fixed to the rotor core 11.

The rotor core 11 includes a cylindrical inner circumference side cylindrical portion 16 that extends about an axis L of the rotor 10, a cylindrical outer circumference side cylindrical portion 17 that extends about the axis L and is located further toward the outer circumferential side from the inner circumference side cylindrical portion 16, and an upper bottom portion 18 connecting one end of the inner circumference side cylindrical portion 16 and one end of the outer circumference side cylindrical portion 17 in an axial direction. The upper bottom portion 18 is formed to have a shape of a flat plate orthogonal to the axis L. In the rotor core 11, an inner circumference surface of the inner circumference side cylindrical portion 16 is rotatably supported by the shaft via a bearing (not illustrated).

The inner circumference magnets 12 and 13, respectively for an A-phase and a B-phase, are fixed to an outer circumference surface of the inner circumference side cylindrical portion 16. The inner circumference magnets 12 and 13 are arranged in the axial direction and respectively oppose first and second inner circumference stator sections 21x and 21y, described later, in a radial direction. The inner circumference magnets 12 and 13 are magnetized in the radial direction so that the N and S poles are alternately arranged at equal intervals in a circumferential direction.

The outer circumference magnets 14 and 15, respectively for the A-phase and the B-phase, are fixed to an inner circumference surface of the outer circumference side cylindrical portion 17. The outer circumference magnets 14 are 15 arranged in the axial direction and respectively oppose first and second outer circumference stator sections 31x and 31y, described later, in the radial direction. The outer circumference magnets 14 and 15 are magnetized in the radial direction so that the N and S poles are alternately arranged at equal intervals in the circumferential direction.

The number of poles of the inner circumference magnets 12 and 13 and the number of poles of the outer circumference magnets 14 and 15 are the same, and are each twelve in the present embodiment. Thus, the rotor 10 according to the present embodiment has twelve poles. The inner circumference magnets 12 and 13 and the outer circumference magnets 14 and 15 may each be formed as a single cylindrical magnet, or may include a plurality of magnets divided corresponding to the magnetic poles.

[Configuration of Stator]

The stator 20 includes the first inner circumference stator section 21x, the second inner circumference stator section 21y, the first outer circumference stator section 31x, and the second outer circumference stator section 31y each having an annular shape.

In the present embodiment, the first inner circumference stator section 21x and the first outer circumference stator section 31x, which are for the A-phase, are supplied with drive current of the same phase (A-phase). The second inner circumference stator section 21y and the second outer circumference stator section 31y, which are for the B-phase, are supplied with drive current of the same phase (B-phase).

The first and second inner circumference stator sections 21x and 21y, having the same configuration and shape, are arranged in the axial direction, with the second inner circumference stator section 21y arranged closer to the upper bottom portion 18 in the axial direction (upper side in FIGS. 1 and 2) and the first inner circumference stator section 21x arranged closer to an opening end of the rotor core 11 in the axial direction (lower side in FIGS. 1 and 2).

The first and second outer circumference stator sections 31x and 31y, having the same configuration and shape, are arranged in the axial direction, with the first outer circumference stator section 31x arranged at an outer circumferential side of the first inner circumference stator section 21x and the second outer circumference stator section 31y arranged at an outer circumferential side of the second inner circumference stator section 21y.

A supporting structure for the stator sections 21x, 21y, 31x, and 31y is as follows. Specifically, the first inner circumference stator section 21x and the first outer circumference stator section 31x are supported by the housing. The second inner circumference stator section 21y and the second outer circumference stator section 31y are respectively supported by the first inner circumference stator section 21x and the first outer circumference stator section 31x.

In the motor M having the configuration described above, the first inner circumference stator section 21x is arranged to oppose the inner circumference magnet 12, on its inner circumferential side, in the radial direction, as illustrated in FIG. 1. The first inner circumference stator section 21x and the inner circumference magnet 12 form a first inner circumference motor unit U1.

The second inner circumference stator section 21y is arranged to oppose the inner circumference magnet 13, on its inner circumferential side, in the radial direction. The second inner circumference stator section 21y and the inner circumference magnet 13 form a second inner circumference motor unit U2.

The first outer circumference stator section 31x is arranged to oppose the outer circumference magnet 14, on its outer circumferential side, in the radial direction. The first outer circumference stator section 31x and the outer circumference magnet 14 form a first outer circumference motor unit U3.

The second outer circumference stator section 31y is arranged so that the outer circumferential side is opposed to the outer circumference magnet 15 in the radial direction. The second outer circumference stator section 31y and the outer circumference magnet 15 form a second outer circumference motor unit U4.

Figure 3:
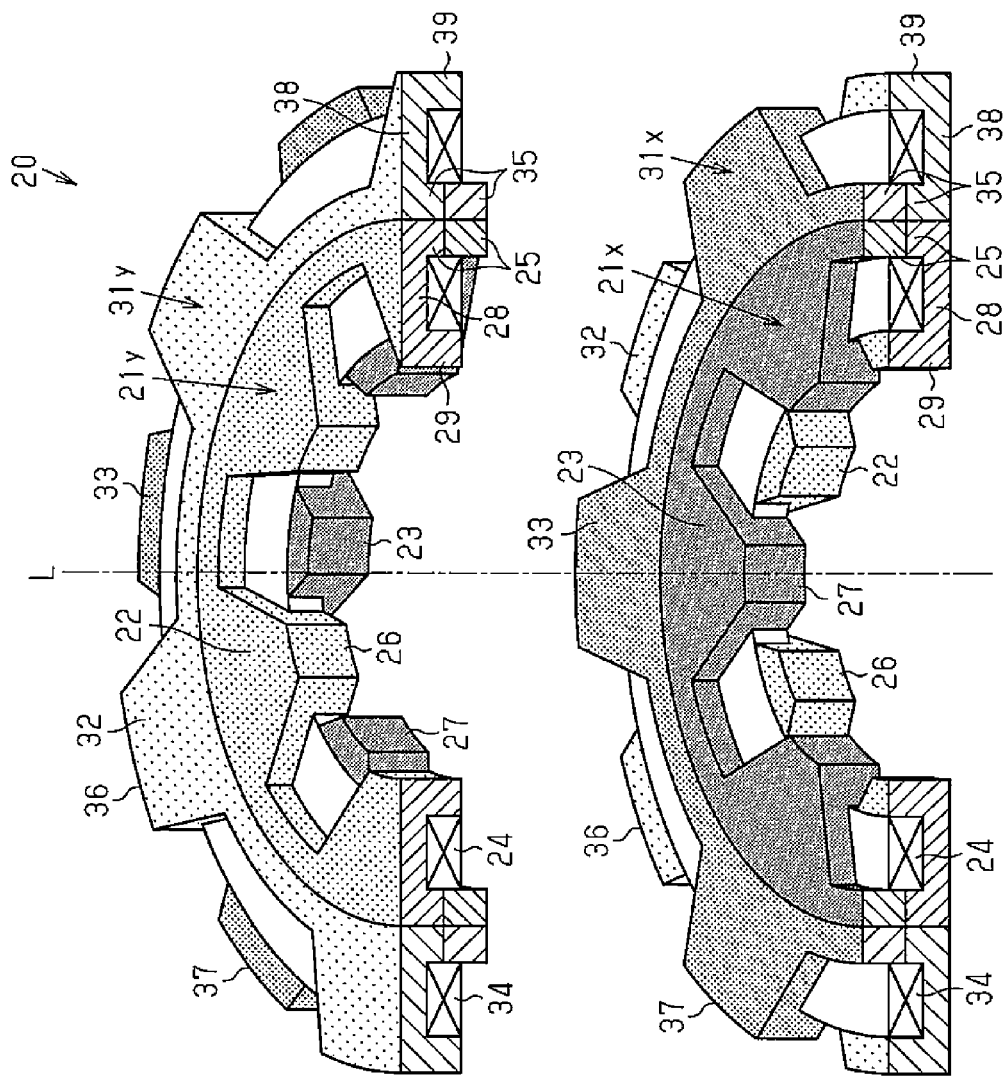
FIG. 3 is an exploded perspective view of a stator shown in FIG. 1.
Figure 4:
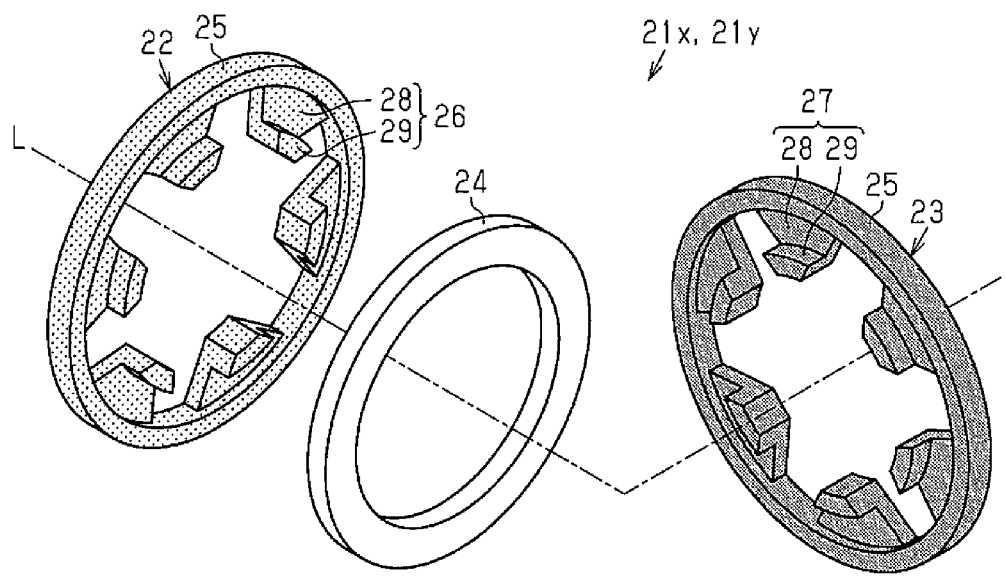
FIG. 4 is an exploded perspective view of an inner circumference stator section shown in FIG. 1.

As illustrated in FIG. 3 and FIG. 4, the first and second inner circumference stator sections 21x and 21y each include two stator cores (a first stator core 22 and a second stator core 23), which have the same shape, and a coil 24, which is arranged between the two stator cores 22 and 23.

The stator cores 22 and 23 each include a cylindrical portion 25, which has a cylindrical shape, and a plurality of (six in the present embodiment) claw poles, which extend toward the inner circumferential side from the cylindrical portion 25. The claw poles formed on the first stator core 22 are referred to as first claw poles 26, and the claw poles formed on the second stator core 23 are referred to as second claw poles 27. The claw poles 26 and 27 have the same shape. The first claw poles 26 are arranged at equal intervals (60-degree interval) in the circumferential direction. In the same manner, the second claw poles 27 are arranged at equal intervals (60-degree interval) in the circumferential direction.

Each of the claw poles 26 and 27, extending inward in the radial direction from the cylindrical portion 25, is bent at a right angle also to extend in the axial direction. Each of the claw poles 26 and 27 includes a radially extending portion 28, which is a portion extending inward in the radial direction from the cylindrical portion 25, and a magnetic pole portion 29, which is a distal end portion bent to extend in the axial direction. The radially extending portion 28 is formed so that the circumferential width decreases toward the inner circumferential side. The inner circumference surface (inner side surface in the radial direction) of the magnetic pole portion 29 is formed to have an arcuate surface extending about the axis L.

The first and second claw poles 26 and 27 may each be formed by bending the magnetic pole portion 29 at a right angle with respect to the radially extending portion 28, or the radially extending portion 28 and the magnetic pole portion 29 may be integrally formed by casting.

The first and second stator cores 22 and 23, having the configuration described above, are coupled together to have their first and second claw poles 26 and 27 (magnetic pole portions 29) opposing opposite sides in the axial direction (see FIG. 3). In the coupled state, the magnetic pole portions 29 of the first claw poles 26 and the magnetic pole portions 29 of the second claw poles 27 are alternately arranged at equal intervals in the circumferential direction. The first and second stator cores 22 and 23 are fixed to each other with their cylindrical portions 25 in contact with each other in the axial direction.

In the coupled state, the coil 24 is arranged between the first and second stator cores 22 and 23 in the axial direction. An insulator (not illustrated) is arranged between the coil 24 and each of the first and second stator cores 22 and 23. The coil 24 has an annular shape along the circumferential direction of the stator 20. The coil 24 is arranged between the radially extending portions 28 of the first claw poles 26 and the radially extending portions 28 of the second claw poles 27 in the axial direction, and is arranged between the cylindrical portion 25 of each of the stator cores 22 and 23 and the magnetic pole portions 29 of the claw poles 26 and 27 in the radial direction.

Figure 5:
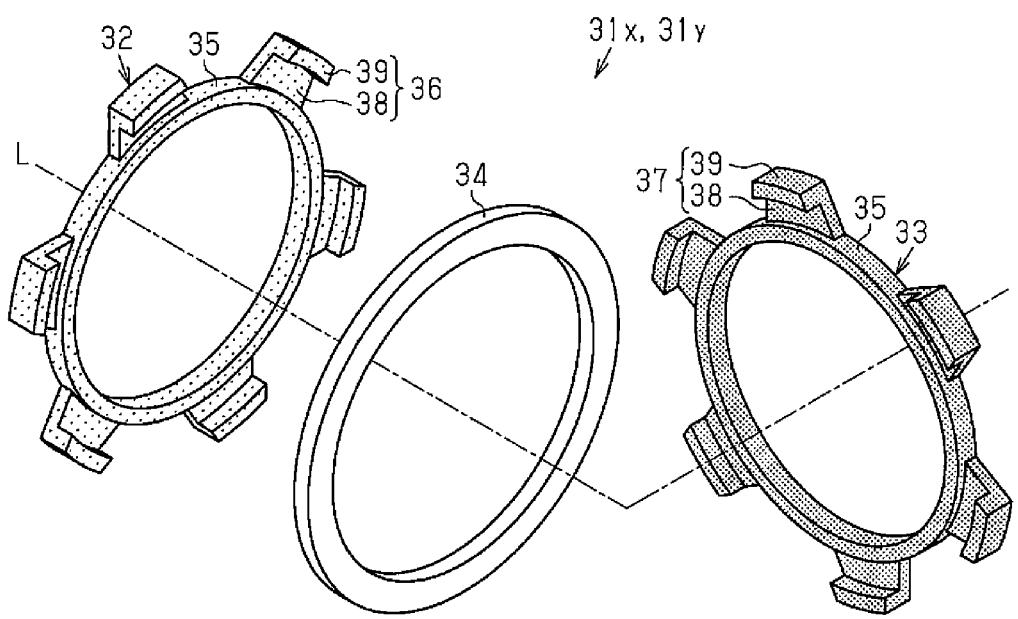
FIG. 5 is an exploded perspective view of an outer circumference stator section shown in FIG. 1.

As illustrated in FIG. 3 and FIG. 5, the first and second outer circumference stator sections 31$x$ and 31$y$ each include two stator cores (a third stator core 32 and a fourth stator core 33), which have the same shape, and a coil 34, which is arranged between the two stator cores 32 and 33.

The stator cores 32 and 33 each include a cylindrical portion 35, which has a cylindrical shape, and a plurality of (six in the present embodiment) claw poles, which extend toward the outer circumferential side from the cylindrical portion 35. The claw poles formed on the third stator core 32 are referred to as third claw poles 36, and the claw poles formed on the fourth stator core 33 are referred to as fourth claw poles 37. The claw poles 36 and 37 have the same shape. The third claw poles 36 are arranged at equal intervals (60-degree interval) in the circumferential direction. In the same manner, the fourth claw poles 37 are arranged at equal intervals (60-degree interval) in the circumferential direction.

Each of the claw poles 36 and 37, extending outward in the radial direction from the cylindrical portion 35, is bent at a right angle also to extend in the axial direction. Each of the claw poles 36 and 37 includes a radially extending portion 38, which is a portion extending outward in the radial direction from the cylindrical portion 35, and a magnetic pole portion 39, which is a distal end portion bent to extend in the axial direction. The radially extending portion 38 is formed so that the circumferential width decreases toward the outer circumferential side. The outer circumference surface (outer side surface in the radial direction) of the magnetic pole portion 39 is formed to have an arcuate surface extending about the axis L.

The third and the fourth claw poles 36 and 37 may each be formed by bending the magnetic pole portion 39 at a right angle with respect to the radially extending portion 38, or the radially extending portion 38 and the magnetic pole portion 39 may be integrally formed by casting.

The third and the fourth stator cores 32 and 33, having the configuration described above, are coupled together to have their third and fourth claw poles 36 and 37 (magnetic pole portions 39) opposing opposite sides in the axial direction (see FIG. 3). In the coupled state, the magnetic pole portions 39 of the third claw poles 36 and the magnetic pole portions 39 of the fourth claw poles 37 are alternately arranged at equal intervals in the circumferential direction. The third and the fourth stator cores 32 and 33 are fixed to each other with their cylindrical portions 35 in contact with each other in the axial direction.

In the coupled state, the coil 34 is arranged between the third and the fourth stator cores 32 and 33 in the axial direction. An insulator (not illustrated) is arranged between the coil 34 and each of the third and the fourth stator cores 32 and 33. The coil 34 has an annular shape along the circumferential direction of the stator 20. The coil 34 is arranged between the radially extending portions 38 of the third claw poles 36 and the radially extending portions 38 of the fourth claw poles 37 in the axial direction, and is arranged between the cylindrical portion 35 of each of the stator cores 32 and 33 and the magnetic pole portions 39 of the claw poles 36 and 37 in the radial direction.

The stator sections 21$x$, 21$y$, 31$x$, and 31$y$, which have the configuration described above, form the so-called Lundell structure. More specifically, the first and second inner circumference stator sections 21$x$ and 21$y$ form a Lundell structure with twelve poles, in which, with the coil 24, arranged between the first and second stator cores 22 and 23, the first and second claw poles 26 and 27 are magnetized to different magnetic poles. In the same manner, the first and second outer circumference stator section 31$x$ and 31$y$ form a Lundell structure with twelve poles, in which, with the coil 34, arranged between the third and the fourth stator cores 32 and 33, the third and the fourth claw poles 36 and 37 are magnetized to different magnetic poles.

Next, arrangement of the stator sections 21$x$, 21$y$, 31$x$, and 31$y$ will be described.

As illustrated in FIG. 3, the first outer circumference stator section 31$x$ is arranged on the outer circumferential side of the first inner circumference stator section 21$x$, with the first stator core 22 of the first inner circumference stator section 21$x$ and the third stator core 32 of the first outer circumference stator section 31$x$ adjacently arranged in the radial direction. More specifically, the first stator core 22 and the third stator core 32 are arranged to have their cylindrical portions 25 and 35 in contact with each other in the radial direction. In the same manner, the second stator core 23 and the fourth stator core 33 are adjacently arranged in the radial direction to have their cylindrical portions 25 and 35 in contact with each other in the radial direction. An axial direction length of each of the cylindrical portions 25 of the first and second stator cores 22 and 23 and an axial direction length of each of the cylindrical portions 35 of the third and the fourth stator cores 32 and 33 are set to be the same. This configuration similarly applies to the second inner circumference stator section 21$y$ and the second outer circumference stator section 31$y$.

Figure 6:
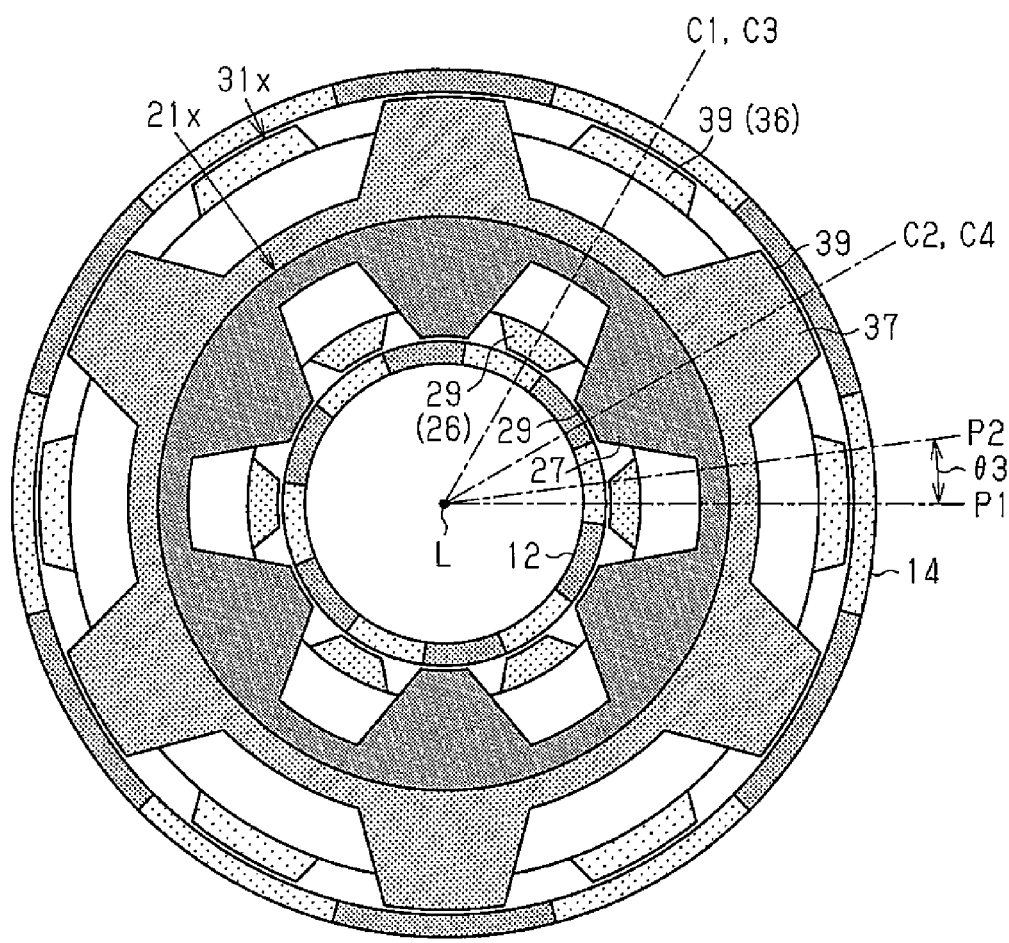
FIG. 6 is a plan view illustrating the positional relationship of the inner circumference stator section, the outer circumference stator section, an inner circumference magnet, and an outer circumference magnet shown in FIG. 1.

As illustrated in FIG. 6, a positional relationship between the first inner circumference stator section 21$x$ and the first outer circumference stator section 31x in the circumferential direction is set so that the positions of the magnetic pole portions 29 of the first claw poles 26 and the positions of the magnetic pole portions 39 of the third claw poles 36 match in the circumferential direction. Thus, a circumferential direction center line C1 of the magnetic pole portions 29 of the first claw poles 26 and a circumferential direction center line C3 of the magnetic pole portions 39 of the third claw poles 36 match. In the same manner, a circumferential direction center line C2 of the magnetic pole portions 29 of the second claw poles 27 and a circumferential direction center line C4 of the magnetic pole portions 39 of the fourth claw poles 37 match. The above-described positional relationship between the first inner circumference stator section 21x and the first outer circumference stator section 31x in the circumferential direction similarly applies to a positional relationship between the second inner circumference stator section 21y and the second outer circumference stator section 31y in the circumferential direction (see FIG. 3).

Next, a relationship between the first and second inner circumference stator sections 21x and 21y for the A-phase and a relationship between the first and second outer circumference stator sections 31x and 31y for the B-phase will be described.

The first and second inner circumference stator sections 21x and 21y are stacked to have their second stator cores 23 adjacently arranged in the axial direction. In the same manner, the first and second outer circumference stator sections 31x and 31y are stacked to have their fourth stator cores 33 adjacently arranged in the axial direction.

Figure 7A:
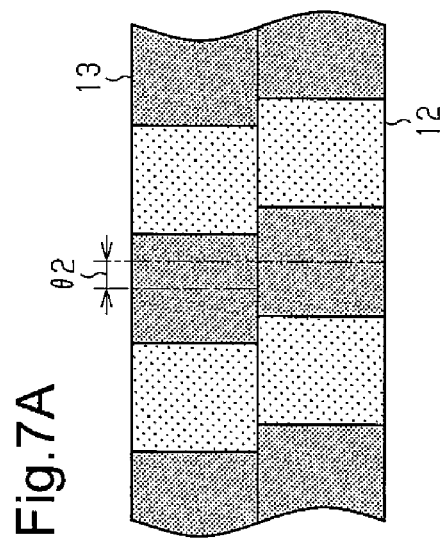
FIG. 7A is a schematic view of the inner circumference magnets shown in FIG. 1 and taken from a radially inner side.
Figure 7B:
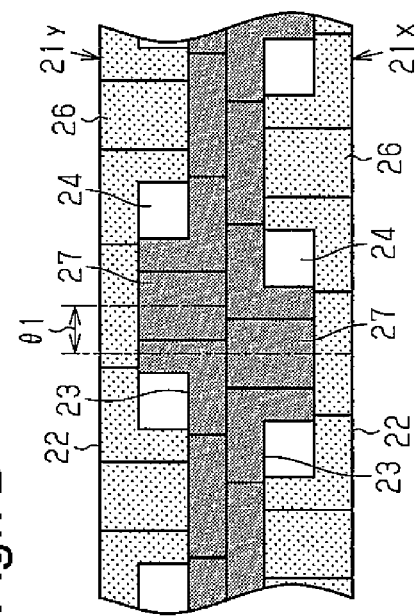
FIG. 7B is a schematic view of first and second inner circumference stator sections shown in FIG. 1 and taken from a radially inner side.

As illustrated in FIG. 7B, an angle of arrangement of the second inner circumference stator section 21y for the B-phase with respect to the first inner circumference stator section 21x for the A-phase is set so that the shifting in a clockwise direction (rightward in FIG. 7B) by a predetermined angle is achieved as viewed from the upper side in the axial direction (viewed from a side of the stator section 21y). More specifically, the first inner circumference stator section 21x and the second inner circumference stator section 21y are arranged so that the first claw poles 26 (second claw poles 27) of the second inner circumference stator section 21y are shifted from the first claw poles 26 (second claw poles 27) of the first inner circumference stator section 21x in the clockwise direction by a predetermined electrical angle θ1.

The inner circumference magnets 12 and 13 of the rotor 10, opposing the first and second inner circumference stator sections 21x and 21y in the radial direction, are also arranged while being shifted from each other in the circumferential direction.

As illustrated in FIG. 7A, an angle of arrangement of the inner circumference magnet 13 for the B-phase with respect to the inner circumference magnet 12 for the A-phase is set so that the shifting in a counterclockwise direction (leftward in FIG. 7) by a predetermined angle is achieved as viewed from the upper side in the axial direction (viewed from the inner circumference magnet 13). More specifically, the inner circumference magnet 12 and the inner circumference magnet 13 for the B-phase are arranged so that the N pole (S pole) of the inner circumference magnet 13 for the B-phase is shifted from the N pole (S pole) of the inner circumference magnet 12 for the A-phase in the counterclockwise direction by a predetermined electrical angle θ2.

The shifted angle (the electrical angle θ1) of the second inner circumference stator section 21y with respect to the first inner circumference stator section 21x and the shifted angle (the electrical angle θ2) of the inner circumference magnet 13 for the B-phase with respect to the inner circumference magnet 12 for the A-phase are set to satisfy relational equation (a) shown below.

$$\theta 1 + |\theta 2| = 90° \text{ (electrical angle)} \quad \text{relational equation (a)}$$

In the present embodiment, the electrical angles θ1 and θ2 are each set to 45° (mechanical angle of 7.5°).

In such a configuration, a phase difference of 90° is obtained between the first inner circumference motor unit U1 for the A-phase, including the first inner circumference stator section 21x and the inner circumference magnet 12, and the second inner circumference motor unit U2 for the B-phase, including the second inner circumference stator section 21y and the inner circumference magnet 13.

The positional relationship between the first and second inner circumference stator sections 21x and 21y in the circumferential direction and the positional relationship between the inner circumference magnets 12 and 13 in the circumferential direction, which are described above, similarly apply to the positional relationship between the first and second outer circumference stator sections 31x and 31y in the circumferential direction and the positional relationship between the outer circumference magnets 14 and 15 in the circumferential direction.

Thus, the angle of arrangement of the second outer circumference stator section 31y with respect to the first outer circumference stator section 31x is set to 45° in the clockwise direction as viewed from the upper side in the axial direction (viewed from the stator section 31y). The angle of arrangement of the outer circumference magnet 15 for the B-phase with respect to the outer circumference magnet 14 for the A-phase is set to 45° in the counterclockwise direction as viewed from the upper side in the axial direction (viewed from the outer circumference magnet 15). Thus, a phase difference of 90° is obtained between the first outer circumference motor unit U3 for the A-phase, including the first outer circumference stator section 31x and the outer circumference magnet 14, and the second outer circumference motor unit U4 for the B-phase, including the second outer circumference stator section 31y and the outer circumference magnet 15.

As described above, the phase difference between the A and the B-phase sides is set to 90° for the motor units U1 and U2 on the inner circumferential side and for the motor units U3 and U4 on the outer circumferential side.

Next, an angle of arrangement of the inner circumference magnet 12 with respect to the outer circumference magnet 14 in the circumferential direction will be described.

As illustrated in FIG. 6, the angle of arrangement of the inner circumference magnet 12 with respect to the outer circumference magnet 14 is set so that the shifting in the counterclockwise direction is by an electrical angle θ3 is achieved as viewed from the upper side in the axial direction (B-phase side). Thus, the outer circumference magnet 14 and the inner circumference magnet 12 are arranged so that a magnetic pole center line P2 of the inner circumference magnet 12 in the circumferential direction is shifted from a magnetic pole center line P1 of the outer circumference magnet 14 in the circumferential direction by the electrical angle θ3 in the counterclockwise direction.

A shifted angle of the first inner circumference stator section 21x with respect to the first outer circumference stator section 31x in the clockwise direction as viewed from the upward side in the axial direction (side of the B-phase)

is referred to as an electrical angle θ4. The electrical angles θ3 and θ4 are set to satisfy relational equation (b) shown below.

$$|\theta 3|+\theta 4=45° \text{ (electrical angle)} \qquad \text{relational equation (b)}$$

In the present embodiment, the electrical angle θ3 between the inner circumference magnet 12 and the outer circumference magnet 14 is set to 45° (mechanical angle of) 7.5°, and the electrical angle θ4 between the first inner circumference stator section 21x and the first outer circumference stator section 31x is set to 0°. Thus, as described above, the first inner circumference stator section 21x and the first outer circumference stator section 31x are arranged without shifting from each other in the circumferential direction.

In such a configuration, a phase difference of 45° is obtained between the first inner circumference motor unit U1, including the first inner circumference stator section 21x and the inner circumference magnet 12, and the first outer circumference motor unit U3, including the first outer circumference stator section 31x and the outer circumference magnet 14.

The positional relationship between the first inner circumference stator section 21x and the first outer circumference stator section 31x for the A-phase in the circumferential direction and the positional relationship between the inner circumference magnet 12 and the outer circumference magnet 14 for the A-phase in the circumferential direction, which are described above, similarly apply to the B-phase side.

The second inner circumference stator section 21y and the second outer circumference stator section 31y are arranged without shifting from each other in the circumferential direction. The angle of arrangement of the outer circumference magnet 15 with respect to the inner circumference magnet 13 is set to 45° in the counterclockwise direction as viewed from the upper side in the axial direction (B-phase side). Thus, a phase difference of 45° is obtained between the second inner circumference motor unit U2, including the second inner circumference stator section 21y and the inner circumference magnet 13, and the second outer circumference motor unit U4, including the second outer circumference stator section 31y and the outer circumference magnet 15.

As described above, the phase difference between the inner circumferential side and the outer circumferential side is set to 45° for the motor units U1 and U3 for the A-phase and for the motor units U2 and U4 for the B-phase.

In the stator 20 having the configuration described above, the coils 24 of the first inner circumference stator section 21x and the first outer circumference stator section 31x, which are for the A-phase, are supplied with A-phase drive current, and the coils 34 of the second inner circumference stator section 21y and the second outer circumference stator section 31y, which are for the B-phase, are supplied with B-phase drive current. A-phase difference between the A-phase drive current and the B-phase drive current, which are alternate current, is set to 90°, for example.

Next, an operation in the first embodiment will now be described.

When the stator sections 21x, 21y, 31x, and 31y are each supplied with the corresponding one of the A-phase drive current and the B-phase drive current, torque for rotating the magnets 12 to 15 is generated in the motor units U1 to U4, whereby the rotor 10 is rotated.

An operation for reducing a cogging torque in the motor M according to the first embodiment will now be described.

Figure 8A:
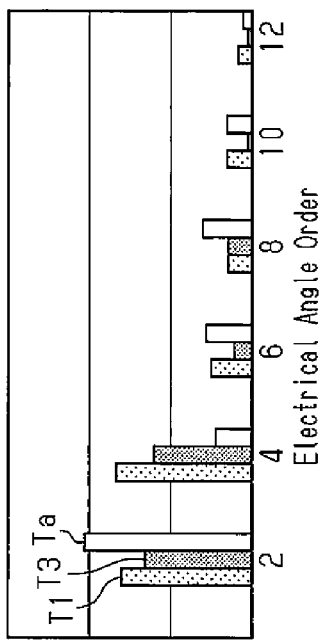
FIG. 8A is a graph illustrating the cogging torque of an A-phase motor unit shown in FIG. 1 for each high-order component.

FIG. 8A illustrates a magnitude of a cogging torque T1 generated in the first inner circumference motor unit U1 for the A-phase for each high-order component, a magnitude of a cogging torque T3 generated in the first outer circumference motor unit U3 for the A-phase for each high-order component, and a magnitude of an A-phase combined cogging torque Ta obtained by combining the cogging torques T1 and T3 for each high-order component.

Figure 8B:
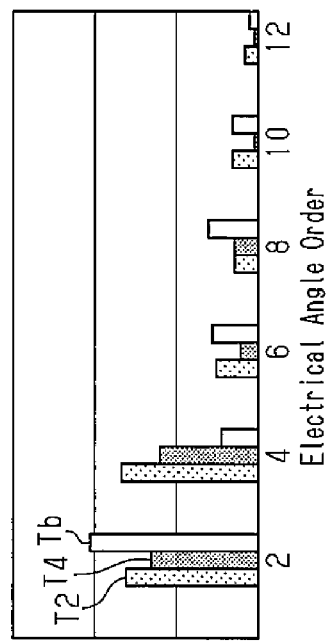
FIG. 8B is a graph illustrating the cogging torque of a B-phase motor unit shown in FIG. 1 for each high-order component.

FIG. 8B illustrates a magnitude of a cogging torque T2 generated in the second inner circumference motor unit U2 for the B-phase for each high-order component, a magnitude of a cogging torque T4 generated in the second outer circumference motor unit U4 for the B-phase for each high-order component, and a magnitude of a B-phase combined cogging torque Tb obtained by combining the cogging torques T2 and T4 for each high-order component.

As illustrated in FIGS. 8A and 8B, the cogging torques T1, T2, T3, and T4, respectively generated in the motor units U1 to U4, each have secondary and quartic components larger than the components of the other orders.

In the present embodiment, the phase difference between the first inner circumference motor unit U1 and the first outer circumference motor unit U3 on the A-phase side is set to 45°. Thus, the phase difference between the cogging torques T1 and T3 (primary component) is 45°. Thus, the cogging torques T1 and T3 have the quartic components with a phase difference of 180° (i.e., opposite phase), and the quartic components of the cogging torques T1 and T3 offset each other and thus the quartic component of the A-phase combined cogging torque Ta is reduced as illustrated in FIG. 8A.

In the same manner, the phase difference between the second inner circumference motor unit U2 and the second outer circumference motor unit U4 on the B-phase side is set to 45°. Thus, the phase difference between the cogging torques T2 and T4 (primary component) is 45°. Thus, the cogging torques T2 and T4 have the quartic components with a phase difference of 180° (i.e., opposite phase), and the quartic components of the cogging torques T2 and T4 offset each other and thus the quartic component of the B-phase combined cogging torque Tb is reduced as illustrated in FIG. 8B.

Figure 8C:
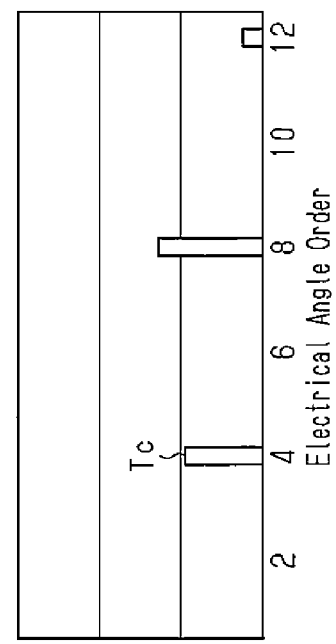
FIG. 8C is a graph illustrating the combined cogging torque of the A-phase and B-phase motor unit shown in FIG. 1 for each high-order component.

FIG. 8C illustrates a magnitude of a combined cogging torque Tc obtained by combining the A-phase combined cogging torque Ta and the B-phase combined cogging torque Tb described above for each high-order component.

In the present embodiment, the phase difference between the motor units U1 and U3 for the A-phase and the motor units U2 and U4 for the B-phase is set to 90°. Thus, the phase difference between the primary components of the A-phase combined cogging torque Ta and of the B-phase combined cogging torque Tb is 90°. Thus, the A-phase combined cogging torque Ta and the B-phase combined cogging torque Tb have the secondary components with a phase difference of 180° (i.e., opposite phase), and the secondary components of the cogging torques Ta and Tb offset each other and thus the secondary component of the combined cogging torque Tc is reduced as illustrated in FIG. 8C.

The combined cogging torque Tc is obtained as a sum of the quartic components of the cogging torques Ta and Tb. The quartic components of the cogging torques Ta and Tb are reduced with the phase difference between the inner circumference motor units U1 and U2 and the outer circumference motor units U3 and U4 set to 45°. Thus, the quartic component of the combined cogging torque Tc as a sum of such quartic components is also reduced.

As described above, the secondary and the quartic components as main components of the cogging torque (combined cogging torque Tc) generated in the rotor 10 are reduced, whereby the cogging torque is effectively reduced. As a result, low vibration of the motor M can be achieved.

Next, advantages of the first embodiment will be described.

(1) The motor M includes the first and second inner circumference motor units U1 and U2 including the first and second inner circumference stator sections 21x and 21y, which form the Lundell structure, and the inner circumference magnets 12 and 13. The motor M also includes the first and second outer circumference motor units U3 and U4 including the first and second outer circumference stator sections 31x and 31y, which form the Lundell structure, and the outer circumference magnets 14 and 15. The first and second inner circumference motor units U1 and U2 are arranged respectively on the inner circumferential sides of the first and second outer circumference motor units U3 and U4.

Thus, a large opposing area (gap area) between the magnet of the rotor 10 and the stator 20 can be achieved in each of the motor units U1 to U4, while reducing the dead space in the inner circumferential portion of the motor M with the first and second inner circumference motor units U1 and U2 respectively arranged on the inner circumferential sides of the first and second outer circumference motor units U3 and U4. Accordingly, a large output can be achieved without enlarging the motor M while reducing the dead space.

(2) The first inner circumference motor unit U1 (second inner circumference motor unit U2) and the first outer circumference motor unit U3 (second outer circumference motor unit U4) are configured to have different phases. Thus, the cogging torque (the combined cogging torque Tc) of the entire motor, obtained by combining the cogging torques generated in the motor units U1 to U4, can be prevented from increasing.

(3) With a plurality of sets of the inner circumference motor units U1 and U2 and a plurality of sets of the outer circumference motor units U3 and U4 arranged in the axial direction, an attempt to increase the output of the motor M can be facilitated.

(4) The first and second inner circumference motor units U1 and U2 are different from each other in phase. The first and second outer circumference motor units U3 and U4 are different from each other in phase. Thus, the cogging torque (the combined cogging torque Tc) of the entire motor, obtained by combining the cogging torques generated in the motor units U1 to U4, can be prevented from increasing.

The first embodiment may additionally include the following configuration.

Figure 9:
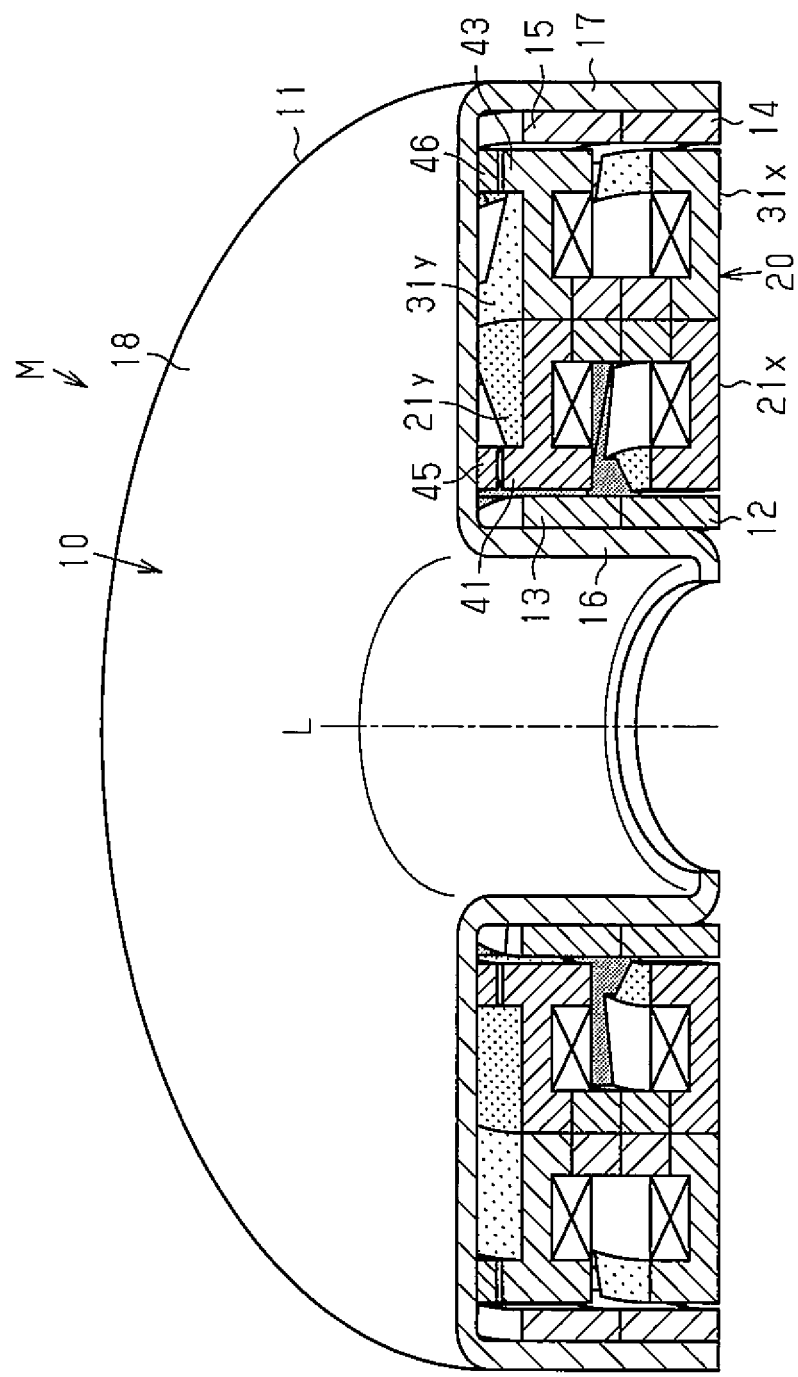
FIG. 9 is a perspective cross-sectional view of a motor in a modified example.
Figure 10:
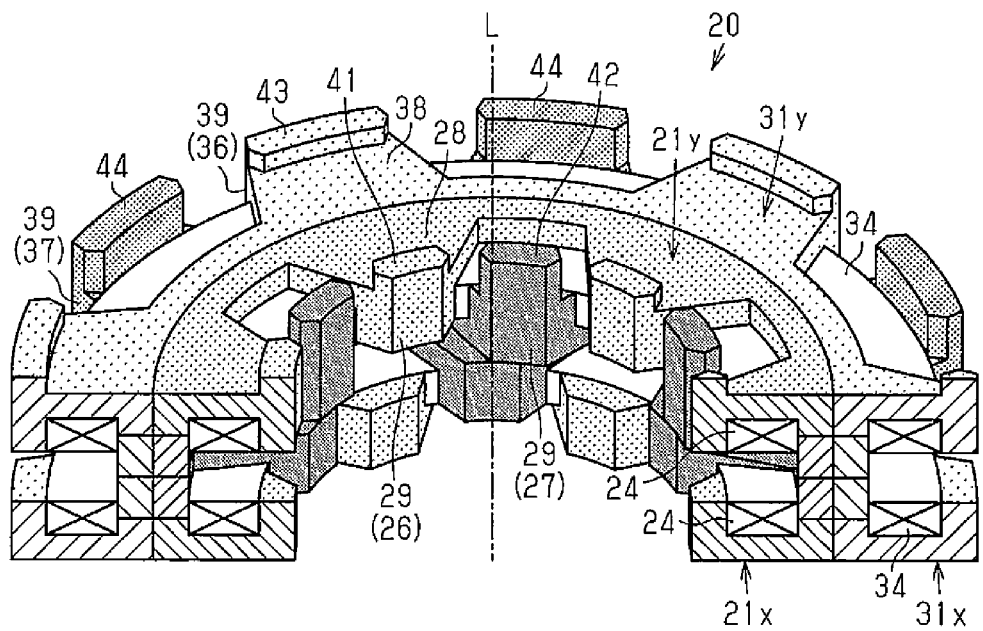
FIG. 10 is a perspective cross-sectional view of a stator in the modified example of FIG. 9.

As illustrated in FIG. 9 and FIG. 10, projections 41 to 44, projecting in the axial direction, may be provided to stator sections arranged while opposing the upper bottom portion 18 of the rotor core 11, that is, the claw poles 26, 27, 36, and 37 of the second inner circumference stator section 21y and the second outer circumference stator section 31y. The projections 41 to 44 oppose axial opposing magnets 45 and 46 fixed to the rotor core 11.

As illustrated in FIG. 10, a first projection 41 is formed on a back surface of each first claw pole 26 of the second inner circumference stator section 21y (an end surface on a side opposite to the magnetic pole portion 29) and projects toward the upper bottom portion 18 in the axial direction. The first projection 41 is formed on a distal end portion of the radially extending portion 28 of the first claw pole 26 (end portion on a radially inner side), with surfaces of the first projection 41 and the magnetic pole portion 29 of the first claw pole 26 on the radially inner side being flush with each other. The first projection 41 and the magnetic pole portion 29 of the first claw pole 26 are formed to have substantially the same radial width and circumferential width.

A second projection 42 is formed to project further in the axial direction from a distal end of the magnetic pole portion 29 of each of the second claw poles 27 in the second inner circumference stator section 21y. Surfaces of the second projection 42 and the magnetic pole portion 29 of the second claw pole 27 on the radially inner side are formed to be flush with each other. The second projection 42 and the magnetic pole portion 29 of the second claw pole 27 are formed to have substantially the same radial width and circumferential width.

A third projection 43 is formed on a back surface of each third claw pole 36 of the second outer circumference stator section 31y (an end surface on a side opposite to the magnetic pole portion 39) and projects toward the upper bottom portion 18 in the axial direction. The third projection 43 is formed on a distal end portion of the radially extending portion 38 of the third claw pole 36 (end portion on a radially inner side), with surfaces of the third projection 43 and the magnetic pole portion 39 of the third claw pole 36 on the radially inner side being flush with each other. The third projection 43 and the magnetic pole portion 39 of the third claw pole 36 are formed to have substantially the same radial width and circumferential width.

A fourth projection 44 is formed to project further in the axial direction from a distal end of the magnetic pole portion 39 of each of the fourth claw poles 37 in the second outer circumference stator section 31y. Surfaces of the fourth projection 44 and the magnetic pole portion 39 of the fourth claw pole 37 on the radially inner side are formed to be flush with each other. The fourth projection 44 and the magnetic pole portion 39 of the fourth claw pole 37 are formed to have substantially the same radial width and circumferential width.

The first and second axial opposing magnets 45 and 46, having an annular shape, are fixed on an end surface of the upper bottom portion 18 of the rotor core 11 opposing the stator 20. The second axial opposing magnet 46 has a larger diameter than the first axial opposing magnet 45, and is arranged on the outer circumferential side of the first axial opposing magnet 45. The first axial opposing magnet 45 opposes the first and second projections 41 and 42, provided to the second inner circumference stator section 21y, in the axial direction. The second axial opposing magnet 46 opposes the third and the fourth projections 43 and 44, provided to the second outer circumference stator section 31y, in the axial direction. The first axial opposing magnet 45 has twelve poles, as in the case of the inner circumference magnet 13, and has circumferential direction positions of the magnetic poles set so that the same phase as the inner circumference magnet 13 is achieved. The second axial opposing magnet 46 has twelve poles, as in the case of the outer circumference magnet 15, and has circumferential direction positions of the magnetic poles set so that the same phase as the outer circumference magnet 15 is achieved.

In this configuration, the first and second axial opposing magnets 45 and 46 of the rotor 10 oppose the projections 41 to 44 of the stator 20 in the axial direction. Thus, a large opposing area between the magnet of the rotor 10 and the stator 20 can be achieved not only on the inner circumferential side and the outer circumferential side of the stator 20, but also on one side in the axial direction, and an even larger output can be achieved.

In the configuration described above, the second inner circumference stator section 21y and the second outer circumference stator section 31y, provided with the projections 41 to 44, are stator sections of the same phase supplied with the drive current (B-phase drive current) of the same phase. Thus, pulsation in the thrust force is produced by the attraction force between the axial opposing magnets 45 and 46 and the projections 41 to 44.

Accordingly, the first and second inner circumference motor units U1 and U2 are used for the A-phase and the first and second outer circumference motor units U3 are U4 are used for the B-phase. Thus, the second inner circumference stator section 21y, provided with the first and second projections 41 and 42, corresponds to the A-phase, and the second outer circumference stator section 31y, provided with the third and the fourth projections 43 and 44, corresponds to the B-phase. Thus, the pulsation in the thrust force, which may be produced with the axial opposing magnets 45 and 46 and the projections 41 to 44 opposing each other in the axial direction, can be reduced. Further, vibration of the motor M can be decreased.

Figure 11:
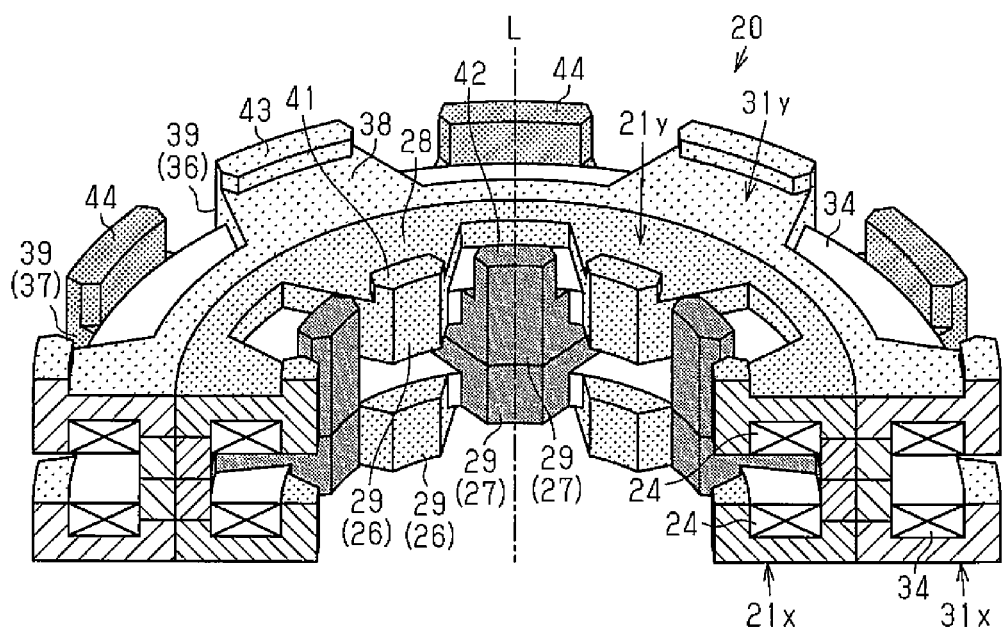
FIG. 11 is a perspective cross-sectional view of a stator in a modified example.
Figure 12:
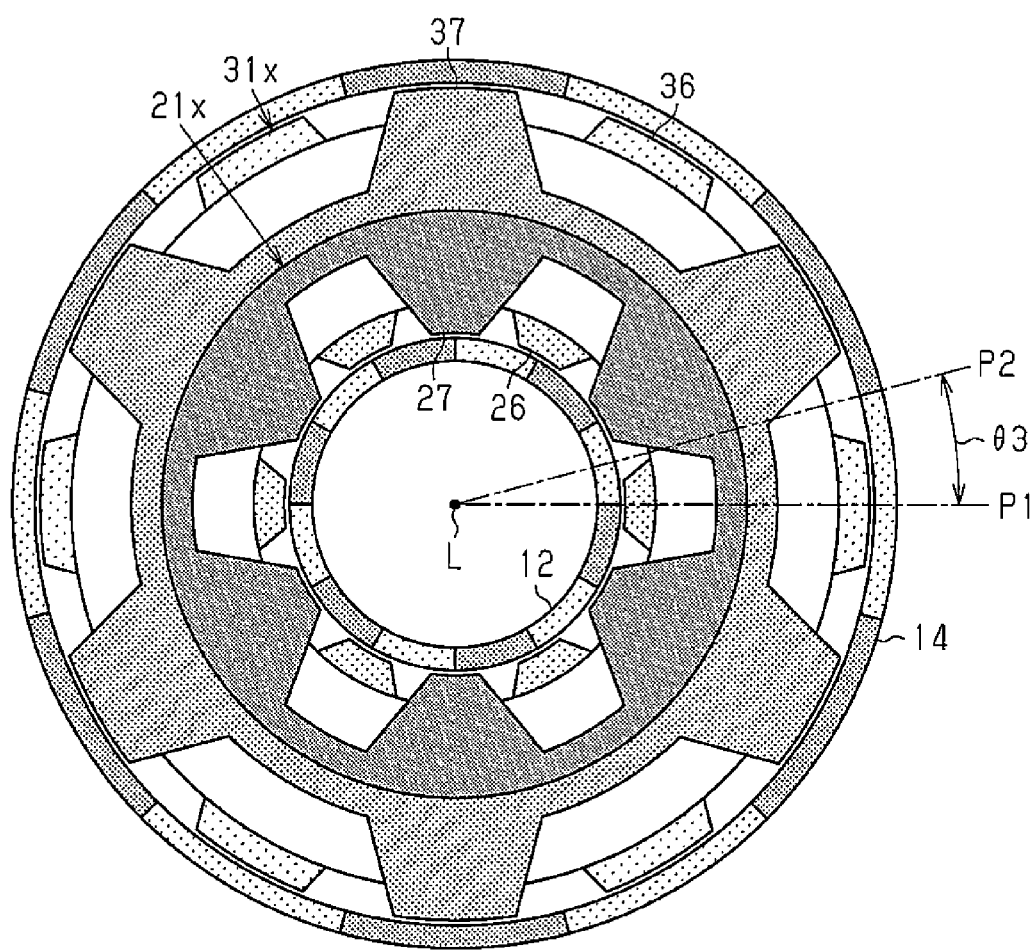
FIG. 12 is a plan view illustrating the positional relationship of an inner circumference stator section, an outer circumference stator section, an inner circumference magnet, and an outer circumference magnet in the modified example of FIG. 11.

FIG. 11 and FIG. 12 illustrate an example of the stator 20 in which the first and second inner circumference stator sections 21x and 21y correspond to the A-phase, and the first and second outer circumference stator sections 31x and 31y correspond to the B-phase.

As illustrated in FIG. 11, the first and second inner circumference stator sections 21x and 21y are arranged with positions the first claw poles 26 (second claw poles 27) of one of the first and second inner circumference stator sections 21x and 21y matching the positions of those of the other one of the first and second inner circumference stator sections 21x and 21y in the circumferential direction.

The inner circumference magnets 12 and 13, respectively opposing the first and second inner circumference stator sections 21x and 21y, are arranged so that the N pole (S pole) of the inner circumference magnet 13 is shifted in the counterclockwise direction by the predetermined electrical angle $\theta 2$ with respect to the N pole (S pole) of the inner circumference magnet 12, as viewed from the upper side in the axial direction, as in the first embodiment (see FIG. 7A).

Here, a shifting angle of the second inner circumference stator section 21y with respect to the first inner circumference stator section 21x is defined as an electrical angle $\theta 1$, and the electrical angles $\theta 1$ and $\theta 2$ are set to satisfy relational equation (c) shown below.

$\theta 1+|\theta 2|=45°$ (electrical angle)  relational equation (c)

In this example, the electrical angle $\theta 2$ between the inner circumference magnets 12 and 13 is set to 45° (mechanical angle of 7.5°), and the electrical angle $\theta 1$ between the first and second inner circumference stator sections 21x and 21y is set to 0°. Thus, as described above, the first inner circumference stator section 21x and the second inner circumference stator section 21y are arranged without shifting from each other in the circumferential direction.

In such a configuration, a phase difference between the first and second inner circumference motor units U1 and U2 for the A-phase is set to 45°. In the same manner, a phase difference between the first and second outer circumference motor units U3 and U4 for the B-phase is set to 45°.

As illustrated in FIG. 12, the positional relationship between the first inner circumference stator section 21x for the A-phase and the first outer circumference stator section 31x for the B-phase in the circumferential direction is set so that the positions of the magnetic pole portions 29 of the first claw poles 26 and the positions of the magnetic pole portions 39 of the third claw poles 36 match in the circumferential direction.

An angle of arrangement of the inner circumference magnet 12 for the A-phase relative to the outer circumference magnet 14 for the B-phase is set so that shifting in the counterclockwise direction is by the electrical angle $\theta 3$ is achieved as viewed from the upper side in the axial direction. Thus, the outer circumference magnet 14 and the inner circumference magnet 12 are arranged so that the magnetic pole center line P2 of the inner circumference magnet 12 in the circumferential direction is shifted from the magnetic pole center line P1 of the outer circumference magnet 14 in the circumferential direction, by the electrical angle $\theta 3$ in the counterclockwise direction.

A shifted angle of the first inner circumference stator section 21x with respect to the first outer circumference stator section 31x in the clockwise direction as viewed from the upward side in the axial direction (side of the B-phase) is referred to as the electrical angle $\theta 4$. The electrical angles $\theta 3$ and $\theta 4$ are set to satisfy relational equation (d) shown below.

$|\theta 3|+\theta 4=90°$ (electrical angle)  relational equation (d)

In this example, the electrical angle $\theta 3$ between the inner circumference magnet 12 and the outer circumference magnet 14 is set to 90° (mechanical angle of 15°), and the electrical angle $\theta 4$ between the first inner circumference stator section 21x and the first outer circumference stator section 31x is set to 0°. Thus, as described above, the first inner circumference stator section 21x and the first outer circumference stator section 31x are arranged without shifting from each other in the circumferential direction.

In such a configuration, a phase difference between the first inner circumference motor unit U1 for the A-phase and the first outer circumference motor unit U3 for the B-phase is set to 90°. In the same manner, a phase difference between the second inner circumference motor unit U2 for the A-phase and the second outer circumference motor unit U4 for the B-phase is set to 45°.

In this example, with the phase differences for the motor units U1 to U4 set as described above, a phase difference of 90° is obtained between the A-phase and the B-phase, and a phase difference of 45° is obtained between an upper stage and a lower stage. Thus, an effect of reducing the cogging torque, similar to that in the first embodiment, can be obtained.

Second Embodiment

A second embodiment of a motor is described below. In the following description of the second embodiment, the configurations that are the same as those in the first embodiment are denoted with the same reference numerals, and differences are described in detail.

Figure 13:
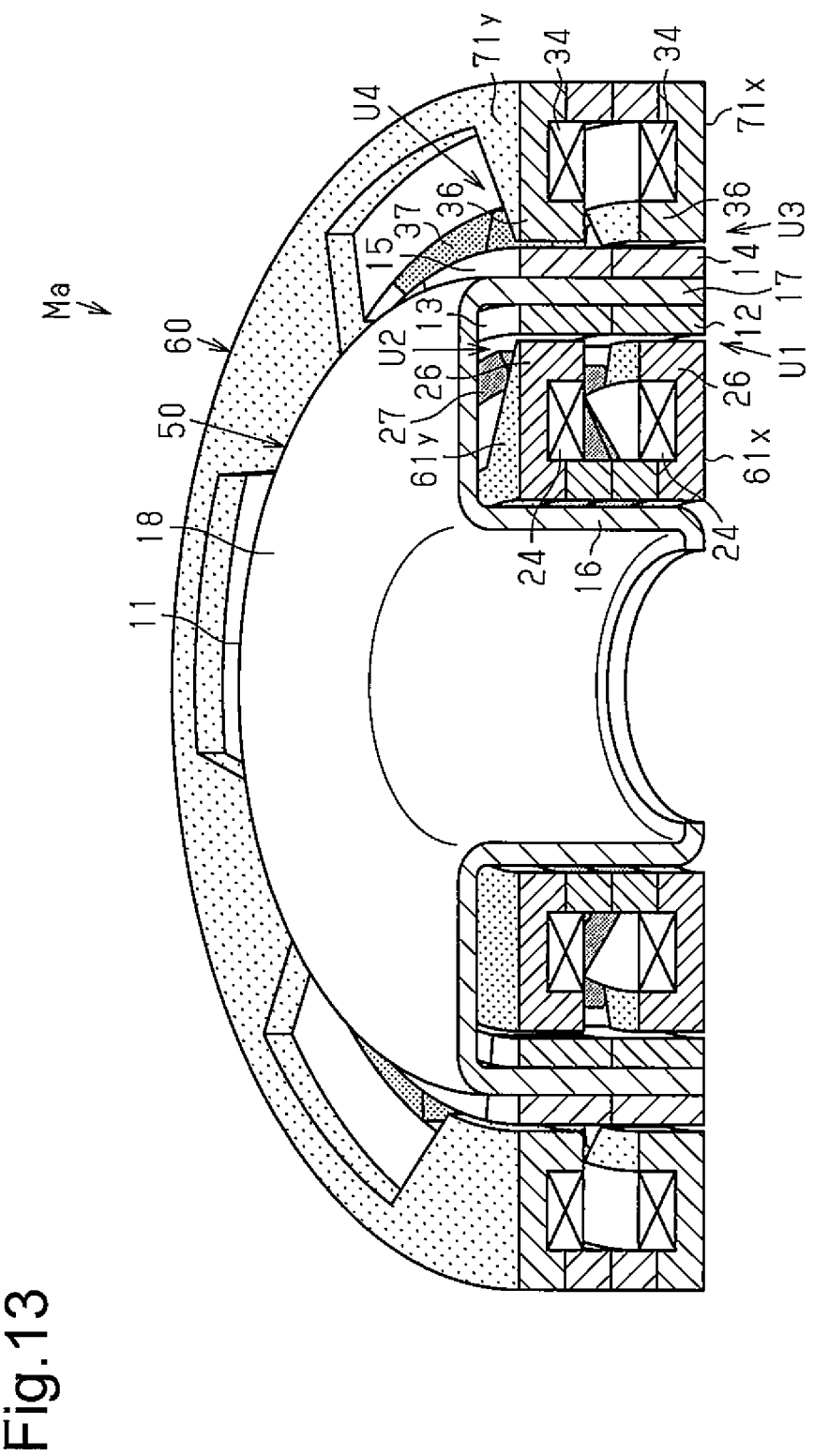
FIG. 13 is a perspective cross-sectional view of a motor in a second embodiment.

As illustrated in FIG. 13, a rotor 50 of a motor Ma according to the present embodiment includes the inner circumference magnets 12 and 13, which are fixed to the inner circumference surface of the outer circumference side cylindrical portion 17 of the rotor core 11, and the outer circumference magnets 14 and 15, which are fixed to the outer circumference surface of the outer circumference side cylindrical portion 17.

The stator 60 of the motor Ma includes a first inner circumference stator section 61x, a second inner circumference stator section 61y, a first outer circumference stator section 71x, and a second outer circumference stator section 71y forming a Lundell structure. The first and second inner circumference stator sections 61x and 61y have the same configuration and shape, and are arranged in the axial direction. The first and second outer circumference stator sections 71x and 71y have the same configuration and shape and are arranged in the axial direction.

The first outer circumference stator section 71x is arranged on an outer circumferential side of the first inner circumference stator section 61x, and the outer circumference side cylindrical portion 17, the inner circumference magnet 12, and the outer circumference magnet 14 of the rotor core 11 are arranged between the first outer circumference stator section 71x and the first inner circumference stator section 61x in the radial direction. The second outer circumference stator section 71y is arranged on the outer circumferential side of the second inner circumference stator section 61y, and the outer circumference side cylindrical portion 17, the inner circumference magnet 13, and the outer circumference magnet 15 are arranged between the second outer circumference stator section 71y and the second inner circumference stator section 61y in the radial direction.

The claw poles 26 and 27 of the first and second inner circumference stator sections 61x and 61y have an extending direction opposite to that in the first and second inner circumference stator sections 21x and 21y according to the first embodiment. More specifically, the claw poles 26 and 27 of the first and second inner circumference stator sections 61x and 61y according to the present embodiment extend outward in the radial direction. The claw poles 26 and 27 of the first inner circumference stator section 61x oppose the inner circumference magnet 12, arranged on their outer circumferential sides, in the radial direction, and the claw poles 26 and 27 of the second inner circumference stator section 61y oppose the inner circumference magnet 13, arranged on their outer circumferential sides, in the radial direction.

The claw poles 36 and 37 of the first and second outer circumference stator sections 71x and 71y have an extending direction opposite to that in the first and second outer circumference stator sections 31x and 31y according to the first embodiment. More specifically, the claw poles 36 and 37 of the first and second outer circumference stator sections 71x and 71y according to the present embodiment extend inward in the radial direction. The claw poles 36 and 37 of the first outer circumference stator section 71x oppose the outer circumference magnet 14, arranged on their inner circumferential sides, in the radial direction. The claw poles 36 and 37 of the second outer circumference stator section 71y oppose the outer circumference magnet 15, arranged on their inner circumferential sides, in the radial direction.

In the motor Ma having the configuration described above, the first inner circumference stator section 61x and the inner circumference magnet 12 form the first inner circumference motor unit U1, and the second inner circumference stator section 61y and the inner circumference magnet 13 form the second inner circumference motor unit U2. The first outer circumference stator section 71x and the outer circumference magnet 14 form the first outer circumference motor unit U3, and the second outer circumference stator section 71y and the outer circumference magnet 15 form the second outer circumference motor unit U4.

The present embodiment can achieve advantages similar to those of the first embodiment. Furthermore, in the present embodiment, a small diameter of the rotor core 11 can be achieved, and the amount of material used for the rotor core 11 can be decreased to lower cost.

The first and second embodiment can be modified as follows.

In each of the motor units U1 to U4 in the above-described embodiments, the phase difference between the A-phase side and the B-phase side is set to 90° (electrical angle), and the phase difference between the inner circumferential side and the outer circumferential side is set to 45° (electrical angle). However, the phase differences are not limited to those in the embodiments, and may be modified in accordance with configuration.

For example, in the motor units U1 to U4, the phase difference between the A-phase side and the B-phase side may be set to 45°, and the phase difference between the inner circumferential side and the outer circumferential side may be set to 90°. This configuration can also reduce the secondary and the quartic components of the cogging torque (combined cogging torque Tc) generated in the rotor 10 but involves a large torque ripple. With the phase difference between the A-phase side and the B-phase side set to 90°, and the phase difference between the inner circumferential side and the outer circumferential side set to 45° as in the above-described embodiment, not only the cogging torque but also the torque ripple can be prevented from increasing.

In each of the above-described embodiments, the first inner circumference stator section 21x and the first outer circumference stator section 31x are formed as separate members. More specifically, the stator cores 22 and 23 of the first inner circumference stator section 21x and the stator cores 32 and 33 of the first outer circumference stator section 31x are formed as separate members. However, the structure is not limited in such a manner.

For example, the first and the third stator cores 22 and 32 may be formed as an integrated member with the cylindrical portion 25 of the first stator core 22 on the inner circumferential side integrally formed with the cylindrical portion 35 of the third stator core 32 on the outer circumferential side. In the same manner, the second and the fourth stator cores 23 and 33 may be formed as an integrated member with the cylindrical portion 25 of the second stator core 23 on the inner circumferential side integrally formed with the cylindrical portion 35 of the fourth stator core 33 on the outer circumferential side. This modified example can be applied to the second inner circumference stator section 21y and the second outer circumference stator section 31y.

The number of poles (the number of poles of the magnets 12 to 15) of the rotors 10 and 50 and the number of poles (the number of claw poles of the stator sections 21x, 21y, 31x, and 31y) of the stators 20 and 60 are not limited as described in the above embodiments, and can be changed in accordance with configuration.

In each of the above-described embodiments, the inner circumference stator sections 21x and 21y (61x and 61y) form a two-stage configuration, and the outer circumference stator sections 31x and 31y (71x and 71y) similarly form a two-stage configuration. However, the structure is not limited in such a manner, and the inner circumferential side and the outer circumference stator section may each form a configuration with a single stage or three or more stages.

Third Embodiment

A third embodiment of a motor is described below. In the following description of the third embodiment, the configurations that are the same as those in the first embodiment are denoted with the same reference numerals, and differences are described in detail.

Figure 14:
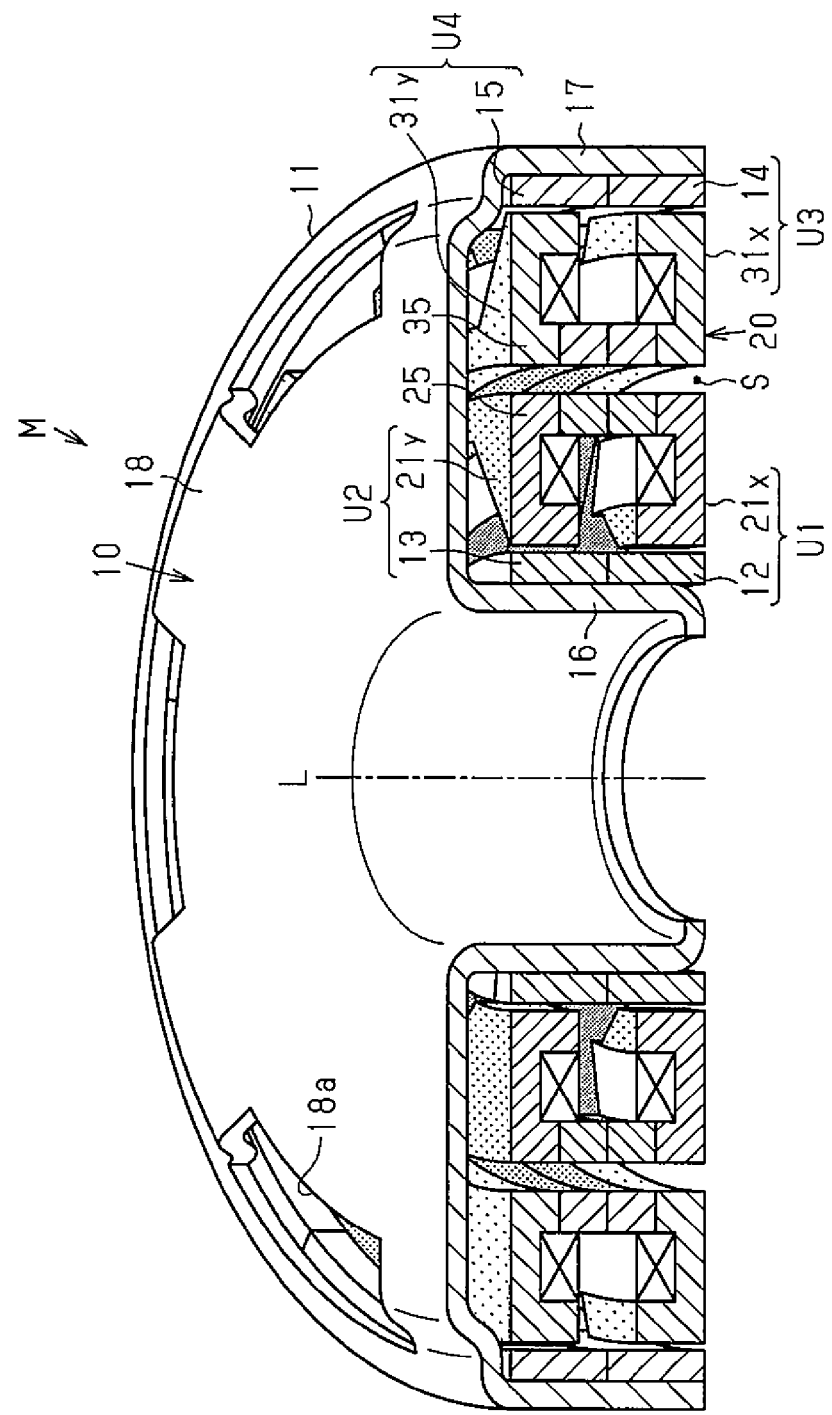
FIG. 14 is a perspective cross-sectional view of a motor in a third embodiment.

As illustrated in FIG. 14, the motor M according to the present embodiment is a brushless motor used for a blower for a vehicle.

[Configuration of Rotor]

Figure 15:
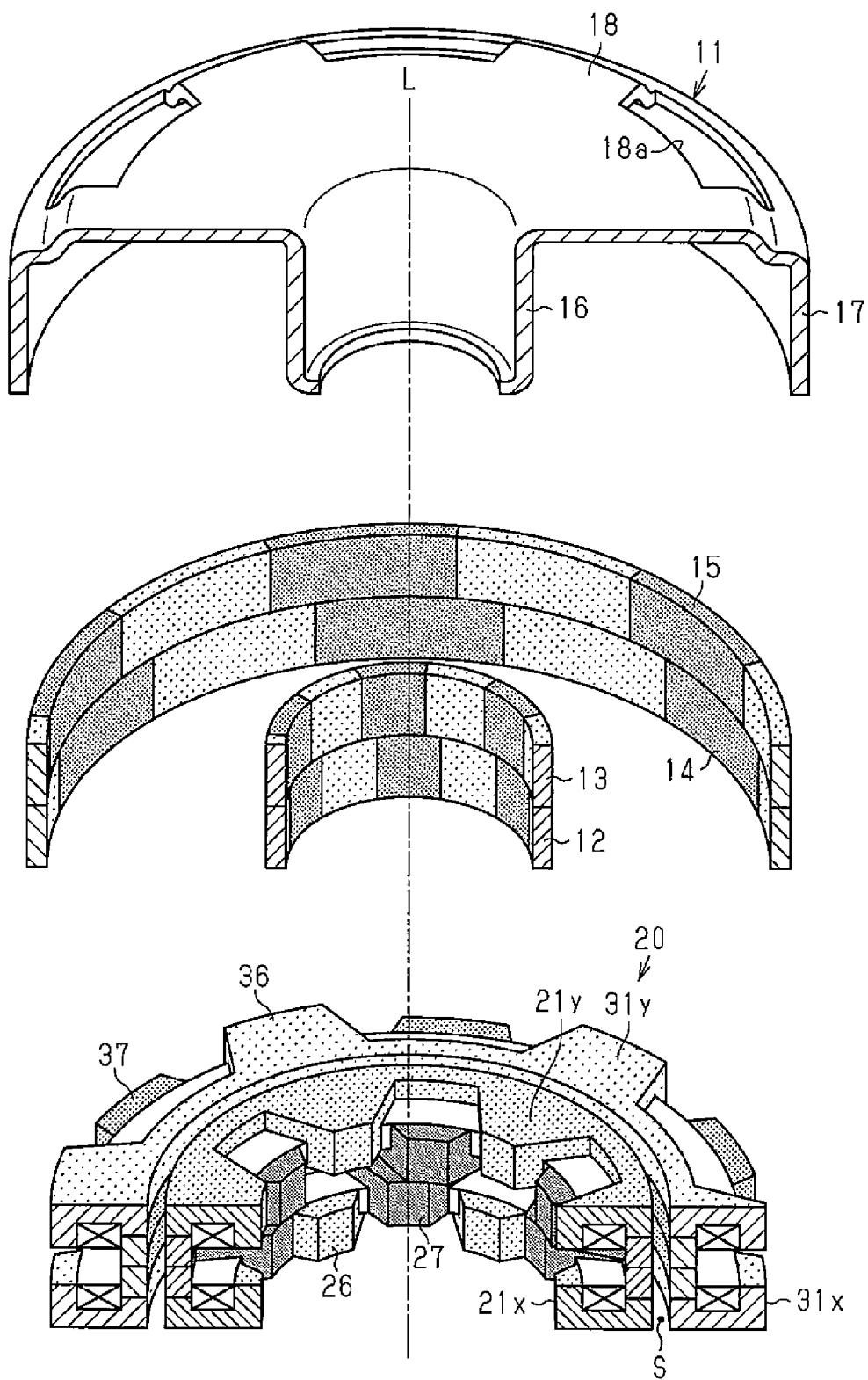
FIG. 15 is an exploded perspective view of the motor shown in FIG. 14.

As illustrated in FIG. 14 and FIG. 15, a plurality of vent holes 18a are formed along the circumferential direction at portions close to an outer circumference edge of the upper bottom portion 18 of the rotor core 11. A blower fan (not illustrated) opposing the upper bottom portion 18 in the axial direction is attached to the rotor core 11, and integrally rotates with the rotor core 11 about the axis L.

[Configuration of Stator]

Figure 16:
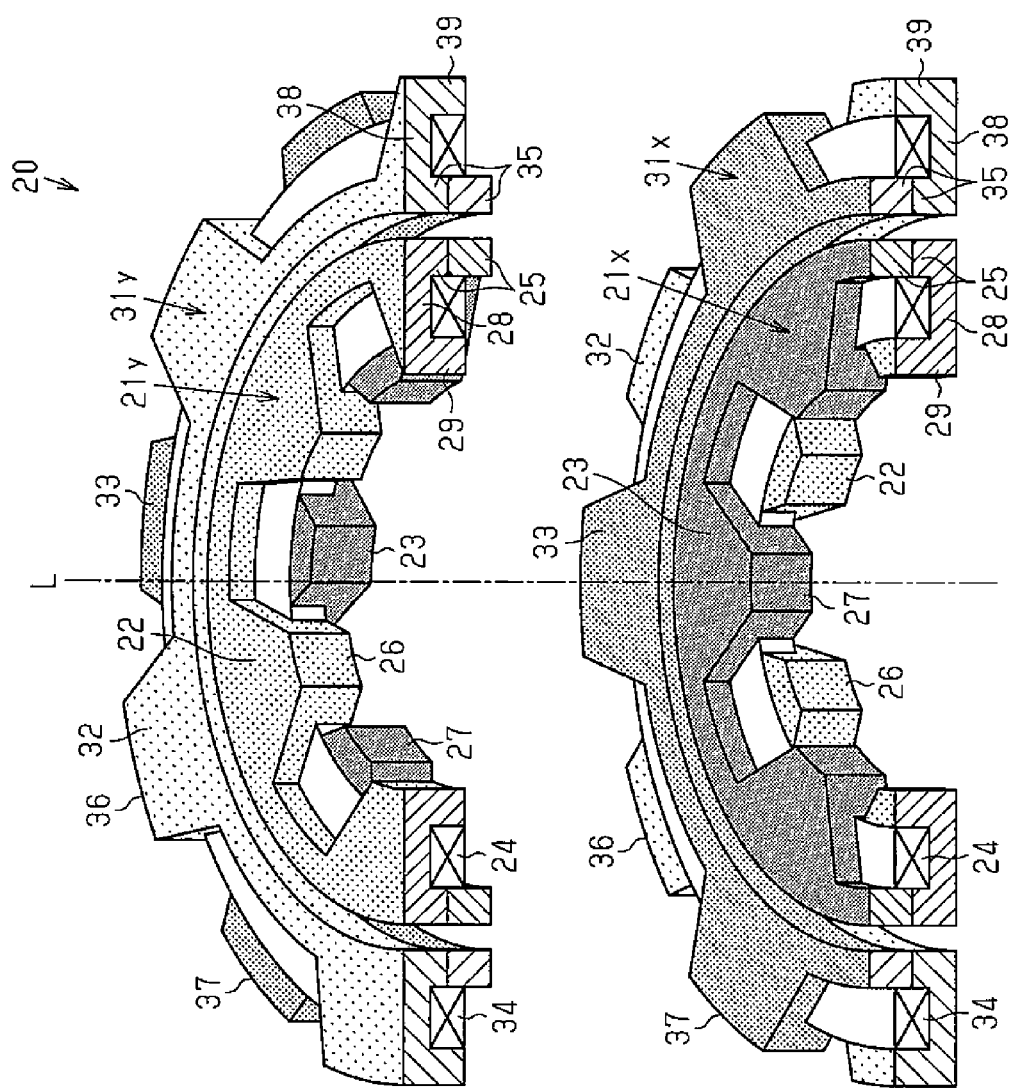
FIG. 16 is an exploded perspective view of a stator shown in FIG. 14.
Figure 17:
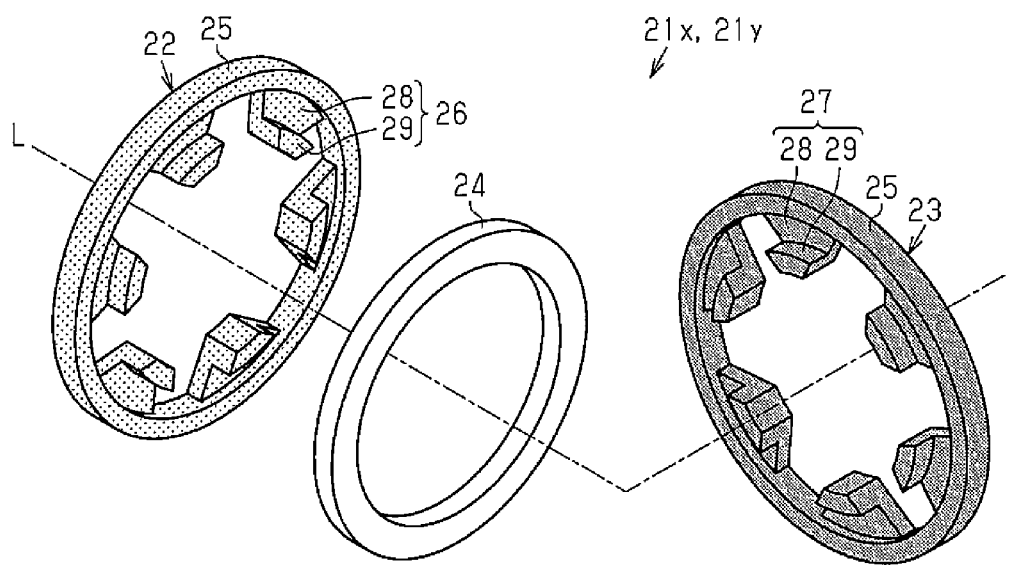
FIG. 17 is an exploded perspective view of an inner circumference stator section shown in FIG. 14.
Figure 18:
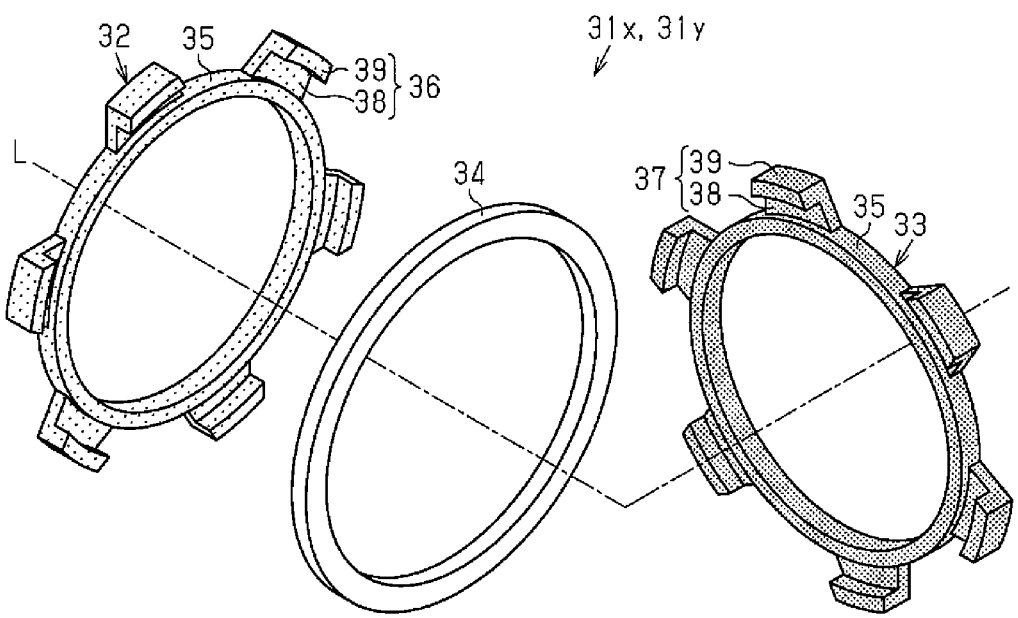
FIG. 18 is an exploded perspective view of an outer circumference stator section shown in FIG. 14.

The stator 20 is arranged between the inner circumference magnets 12 and 13 and the outer circumference magnets 14 and 15 in the radial direction. As illustrated in FIG. 16, the first stator core 22 and the third stator core 32 are arranged to have their cylindrical portions 25 and 35 opposing each other in the radial direction with a gap in between. In the same manner, the second stator core 23 and the fourth stator core 33 are arranged to have their cylindrical portions 25 and 35 opposing each other in the radial direction with a gap in between.

Figure 19:
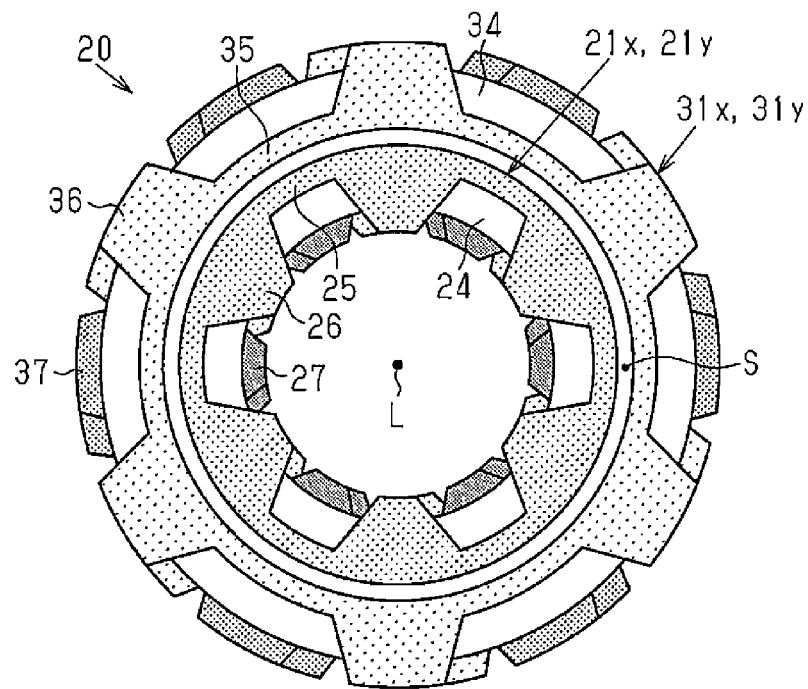
FIG. 19 is a plan view of the stator shown in FIG. 14.

As illustrated in FIG. 14 and FIG. 19, in the stator 20 according to the third embodiment, the first inner circumference stator section 21x and the first outer circumference stator section 31x are arranged while being separated from each other in the radial direction. In the same manner, the second inner circumference stator section 21y and the second outer circumference stator section 31y are arranged while being separated from each other in the radial direction. Thus, a ventilation passage S communicating between one side of the stator 20 in the axial direction with the other side is formed between the cylindrical portions 25 (stator cores 22 and 23) of the inner circumference stator sections 21x and 21y and the cylindrical portions 35 (stator cores 32 and 33) of the outer circumference stator sections 31x and 31y.

In the present embodiment, the outer circumference surfaces of the cylindrical portions 25 of the inner circumference stator sections 21x and 21y are flush with each other and form a circular shape extending about the axis L as viewed in the axial direction. The inner circumference surfaces of the cylindrical portions 35 of the outer circumference stator sections 31x and 31y are flush with each other and form a circular shape extending about the axis L as viewed in the axial direction. Thus, the ventilation passage S, defined by the outer circumference surfaces of the plurality of cylindrical portions 25 and the inner circumference surfaces of the plurality of cylindrical portions 35, is a void linearly extending in the axial direction between the inner circumference stator sections 21x and 21y and the outer circumference stator sections 31x and 31y.

Next, an operation in the third embodiment will be described.

The coils 24 of the first inner circumference stator section 21x and the first outer circumference stator section 31x for the A-phase are supplied with A-phase drive current, and the coils 34 of the second inner circumference stator section 21y and the second outer circumference stator section 31y for the B-phase are supplied with B-phase drive current. For example, the A-phase drive current and the B-phase drive current are both alternate current, and a phase difference therebetween is set to 90°, for example. When the stator sections 21x, 21y, 31x, and 31y are each supplied with the corresponding one of the A-phase drive current and the B-phase drive current, torque for rotating the magnets 12 to 15 is generated in the motor units U1 to U4, and the rotor 10 is rotationally driven.

Next, advantages of the third embodiment will be described.

(1) The stator 20 includes the first and second inner circumference stator sections 21x and 21y, which form the Lundell structure, and the first and second outer circumference stator sections 31x and 31y, which also form the Lundell structure. The first and second inner circumference stator sections 21x and 21y are respectively arranged on the inner circumferential sides of the first and second outer circumference stator sections 31x and 31y. The rotor 10 includes the inner circumference magnets 12 and 13, which respectively oppose the inner circumferential sides of the first and second inner circumference stator sections 21x and 21y, and the outer circumference magnets 14 and 15, which respectively oppose the outer circumferential sides of the first and second outer circumference stator sections 31x and 31y. The ventilation passage S, communicating opposite sides of the stator 20 in the axial direction, extends between the first and second inner circumference stator sections 21x and 21y and the first and second outer circumference stator sections 31x and 31y.

In this configuration, a large opposing area (gap area) between the magnet of the rotor 10 and the inner circumferential side and the outer circumferential side of the stator 20 can be achieved to obtain a large output while preventing heat dissipation from degrading with the ventilation passage S, through which heat dissipation is facilitated, provided between the inner circumference stator sections 21x and 21y the outer circumference stator sections 31x and 31y. The first and second inner circumference motor units U1 and U2 are arranged respectively on the inner circumferential sides of the first and second outer circumference motor units U3 and U4. Thus, the dead space can be reduced at the inner circumferential portion of the motor without enlarging the motor.

(2) The inner circumference stator sections 21x and 21y and the outer circumference stator sections 31x and 31y are arranged in the radial direction with a gap in between. The ventilation passage S is defined by the outer circumference surfaces of the inner circumference stator sections 21x and 21y (the outer circumference surfaces of the cylindrical portions 25) and the inner circumference surfaces of the outer circumference stator sections 31x and 31y (the inner circumference surfaces of the cylindrical portions 35), which oppose each other in the radial direction with the gap in between. Thus, the ventilation passage S can be easily formed with a simple configuration of arranging the inner circumference stator sections 21x and 21y and the outer circumference stator sections 31x and 31y with a gap in between.

(3) A plurality of the inner circumference motor units U1 and U2 and a plurality of the outer circumference motor units U3 and U4 are arranged in the axial direction, to contribute to an even larger output of the motor M.

(4) The first inner circumference motor unit U1 (second inner circumference motor unit U2) and the first outer circumference motor unit U3 (second outer circumference motor unit U4) are configured to have different phases. Thus, the cogging torque of the entire motor, obtained by combining the cogging torques generated in the motor units U1 to U4, can be prevented from increasing.

(5) The first and second inner circumference motor units U1 and U2 are different from each other in phase. The first and second outer circumference motor units U3 and U4 are different from each other in phase. Thus, the cogging torque of the entire motor, obtained by combining the cogging torques generated in the motor units U1 to U4, can be prevented from increasing.

The third embodiment may be modified as follows.

In the above-described embodiment, at least one of the outer circumference surfaces of the cylindrical portions 25 of the inner circumference stator sections 21x and 21y and the inner circumference surfaces of the cylindrical portions 35 of the outer circumference stator sections 31x and 31y may include recesses and projections. With this configuration, the ventilation passage S formed by the cylindrical portions 25 and 35 has a larger surface area, and higher heat dissipation can be achieved with the ventilation passage S.

Figure 20:
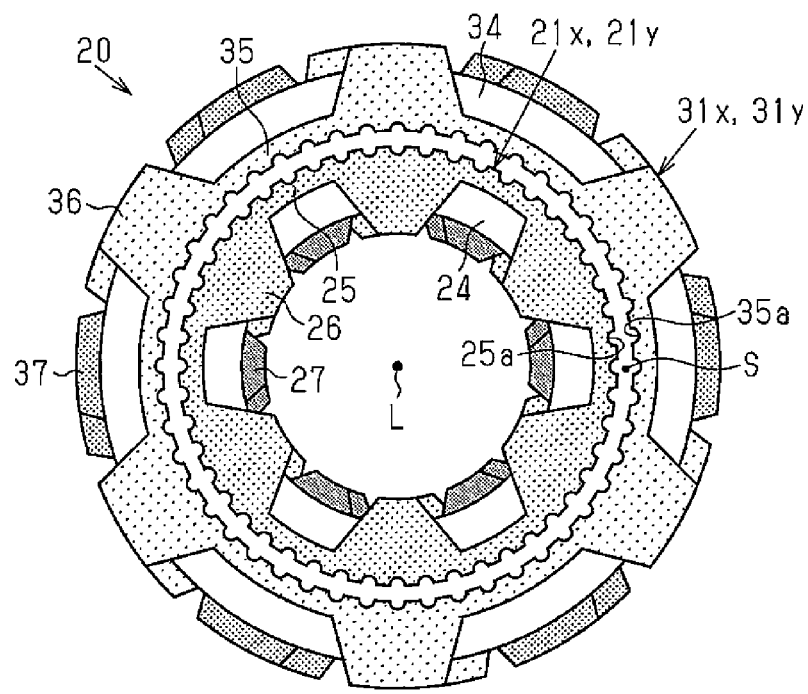
FIG. 20 is a plan view of a stator in a modified example.

FIG. 20 illustrates an example where the recesses and the projections are formed on both of the outer circumference surfaces of the cylindrical portions 25 and the inner circumference surfaces of the cylindrical portions 35. As illustrated in the drawing, a plurality of recesses 25a recessed inward in the radial direction are formed on the outer circumference surfaces of the cylindrical portions 25 at an equal interval in the circumferential direction. A plurality of recesses 35a recessed outward in the radial direction are formed in the inner circumference surfaces of the cylindrical portions 35 at equal intervals in the circumferential direction. The recesses 25a and 35a increase the surface area of the ventilation passage S, and heat dissipation can be increased with the ventilation passage S. The recesses 25a and 35a are formed to linearly extend in the axial direction.

In the configuration as illustrated in FIG. 20, the recesses 25a and 35a may be used for positioning the stator sections 21x, 21y, 31x, and 31y in the circumferential direction.

More specifically, a positioning projection projecting in the axial direction is formed on the cylindrical portion 25 (the cylindrical portion 25 of the second stator core 23) of at least one of the first and second inner circumference stator sections 21x and 21y. The second inner circumference stator section 21y can be positioned with respect to the first inner circumference stator section 21x in the circumferential direction by fitting the positioning projection in the recess 25a of the cylindrical portion 25.

In the same manner, a positioning projection projecting in the axial direction is formed on the cylindrical portion 35 (the cylindrical portion 35 of the fourth stator core 33) of at least one of the first and second outer circumference stator sections 31x and 31y. The second outer circumference stator section 31y can be positioned with respect to the first outer circumference stator section 31x in the circumferential direction by fitting the positioning projection in the recess 35a of the cylindrical portion 35.

The stator sections 21x and 31x can be positioned with respect to the housing in the circumferential direction, with positioning projections that project in the axial direction and formed on the housing, which supports the first inner circumference stator section 21x and the first outer circumference stator section 31x, fit in the recesses 25a and 35a.

In the above-described embodiment, the first inner circumference stator section 21x and the first outer circumference stator section 31x are separated from each other in the radial direction with a gap in between. More specifically, the stator cores 22 and 23 of the first inner circumference stator section 21x and the stator cores 32 and 33 of the first outer circumference stator section 31x are formed as separate members. However, the structure is not limited in such a manner.

For example, the first and the third stator cores 22 and 32 may be formed as an integrated member with the cylindrical portion 25 of the first stator core 22 on the inner circumferential side integrally formed with the cylindrical portion 35 of the third stator core 32 on the outer circumferential side. In the same manner, the second and the fourth stator cores 23 and 33 may be formed as an integrated member with the cylindrical portion 25 of the second stator core 23 on the inner circumferential side integrally formed with the cylindrical portion 35 of the fourth stator core 33 on the outer circumferential side. In such a case, a vent hole serving as a ventilation passage for cooling is preferably formed in the axial direction through a boundary portion of the first and the third stator cores 22 and 32 (the cylindrical portions 25 and 35 integrally formed) and a boundary portion of the second and the fourth stator cores 23 and 33 (the cylindrical portions 25 and 35 integrally formed). This modified example can be applied to the second inner circumference stator section 21y and the second outer circumference stator section 31y.

In the above-described embodiment, the first inner circumference motor unit U1 and the first outer circumference motor unit U3 are used for the A-phase, and the second inner circumference motor unit U2 and the second outer circumference motor unit U4 are used for the B-phase. More specifically, the coils 24 and 34 of the stator sections 21x and 31x are supplied with the drive current (A-phase drive current) of the same phase, and the coils 24 and 34 of the stator sections 21y and 31y are supplied with the drive current (B-phase drive current) of the same phase. However, the structure is not limited in such a manner. For example, the coils 24 of the first and second inner circumference stator sections 21x and 21y may be supplied with the A-phase drive current, so that the first and second inner circumference motor units U1 and U2 are used for the A-phase, and the coils 34 of the first and second outer circumference stator sections 31x and 31y may be supplied with the B-phase drive current, so that the first and second outer circumference motor units U3 and U4 are used for the B-phase.

Projections projecting toward the upper bottom portion 18 in the axial direction may be provided to stator sections arranged while opposing the upper bottom portion 18 of the rotor core 11, that is, the claw poles 26, 27, 36, and 37 of the second inner circumference stator section 21y and the second outer circumference stator section 31y, and the projections may oppose the magnet, fixed to the upper bottom portion 18, in the axial direction.

The number of poles (the number of poles of the magnets 12 to 15) of the rotors 10 and 50 and the number of poles (the number of claw poles of the stator sections 21x, 21y, 31x, and 31y) of the stator 20 are not limited as described in the above embodiments and can be changed in accordance with configuration.

In the above-described embodiment, the inner circumference stator sections 21x and 21y form a two-stage configuration, and the outer circumference stator sections 31x and 31y form a two-stage configuration. However, the structure is not limited in such a manner, and the inner circumferential side and the outer circumference stator section may each form a configuration with a single stage or three or more stages.

The present invention is applied to the motor M used for the blower for a vehicle in the above-described embodiment, but is not particularly limited to this, and may be applied to a motor used in a device other than the blower.

Next, technical concepts that can be recognized from the second embodiment and modified examples of the second embodiment are described below.

(A) A motor in which recesses and projections are formed in at least one of the outer circumference surface of the inner circumference stator section and the inner circumference surface of the outer circumference stator section and are used to position the at least one of the stator sections including the recesses and the projections.

In this configuration, the stator section can be positioned in the circumferential direction.

Fourth Embodiment

A motor according to a fourth embodiment is described below.

Figure 21:
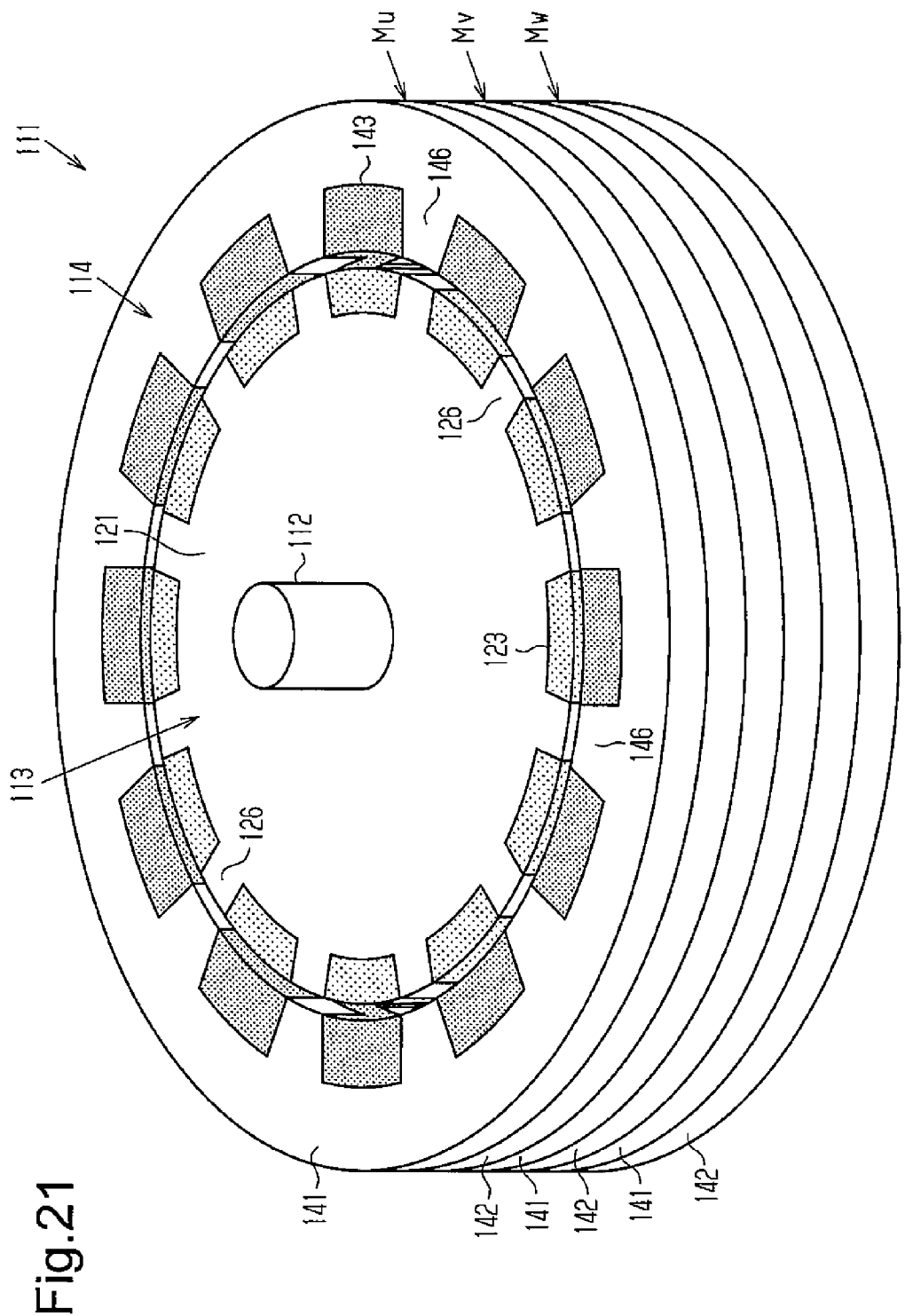
FIG. 21 is a perspective view of a motor in a fourth embodiment.

As illustrated in FIG. 21, a motor 111 according to the present embodiment includes a rotor 113, which has a rotation shaft 112, and a stator 114, which has an annular shape and is fixed to a motor housing (not illustrated) arranged on an outer side of the rotor 113.

The motor 111 includes single motor units in three stages stacked in the axial direction. The single motor units in three stages include a U-phase motor unit Mu, a V-phase motor unit Mv, and a W-phase motor unit Mw that are stacked in this order from the upper side as illustrated in FIG. 21.

Figure 22:
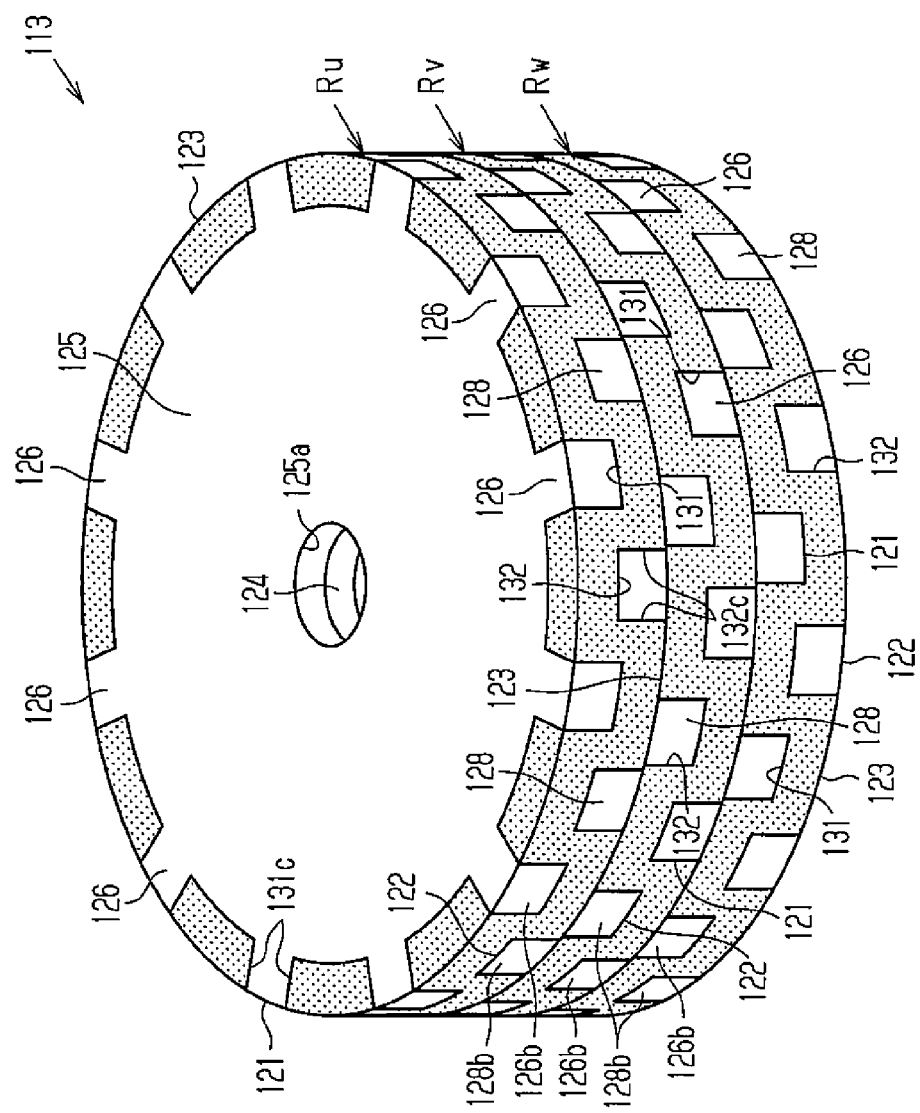
FIG. 22 is a perspective view of a rotor shown in FIG. 21.
Figure 24:
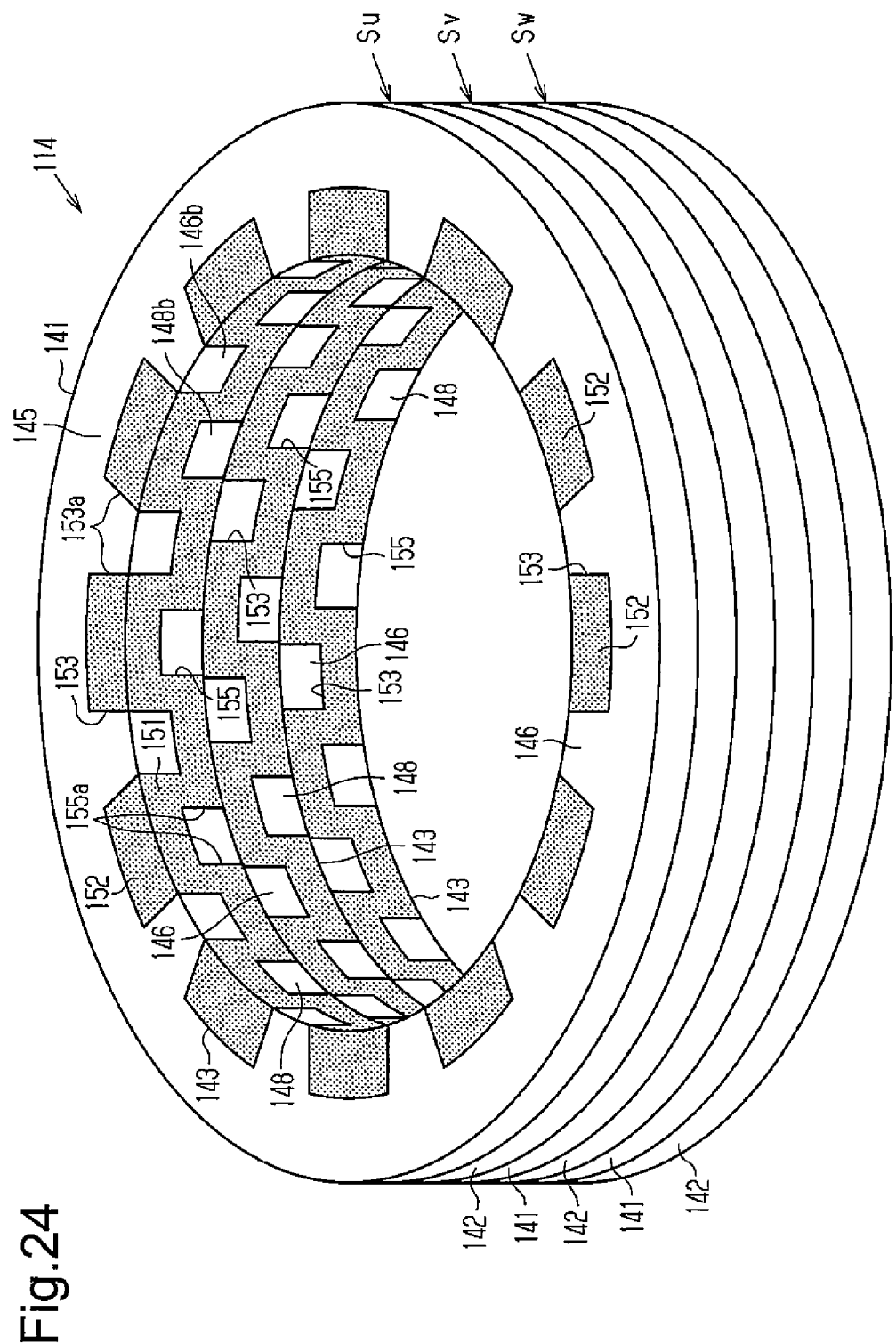
FIG. 24 is a perspective view of a stator shown in FIG. 21.

As illustrated in FIG. 22 and FIG. 24, the three motor units Mu, Mv, and Mw respectively each include rotor sections (a U-phase rotor section Ru, a V-phase rotor section Rv, and a W-phase rotor section Rw) and stator sections (a U-phase stator section Su, a V-phase stator section Sv, and a W-phase stator section Sw). The rotor sections Ru, Rv, and Rw of different phases form a rotor 113, and the stator sections Su, Sv, and Sw of different phases form a stator 114.

[Configuration of Rotor]

Figure 23:
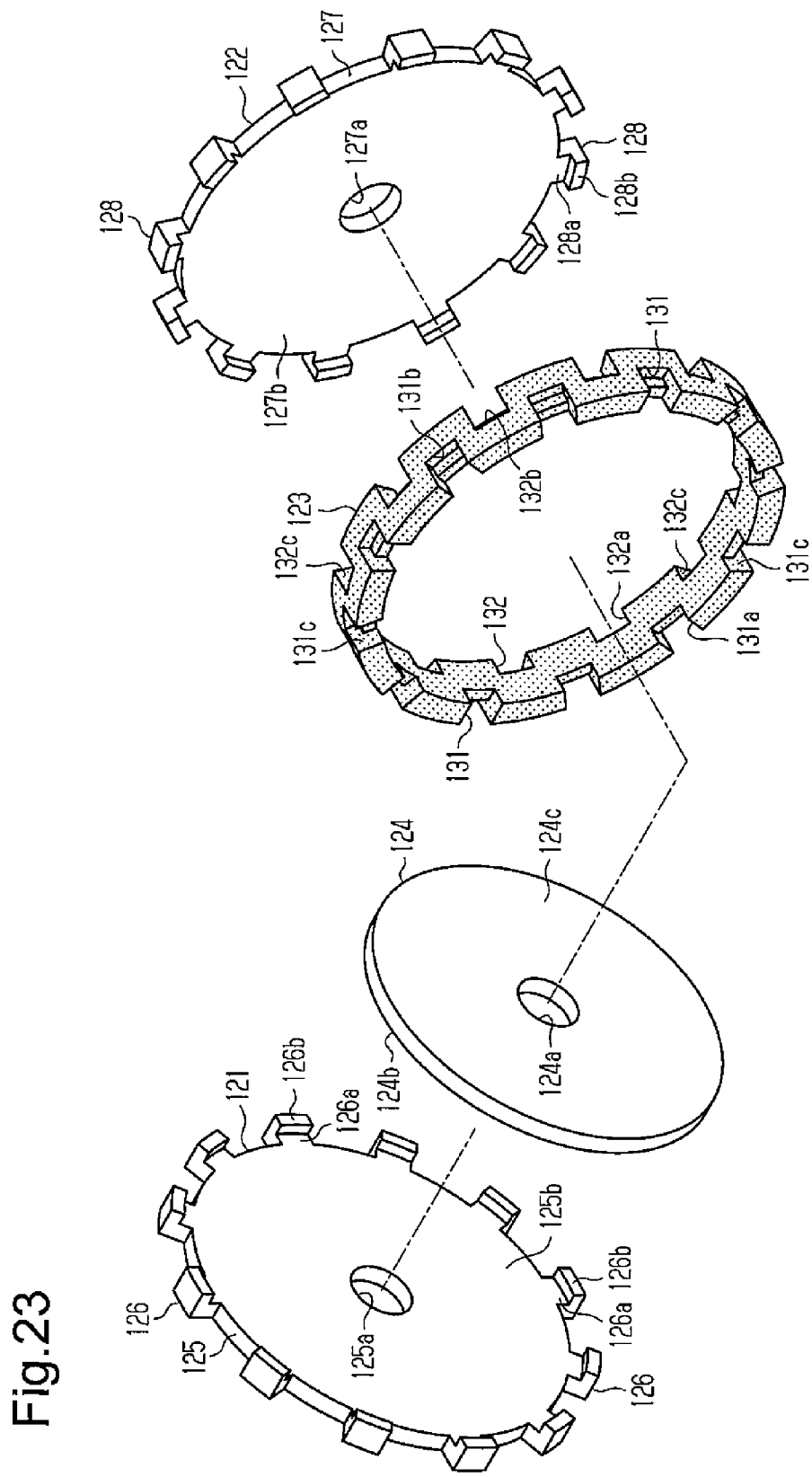
FIG. 23 is an exploded perspective view of a rotor section shown in FIG. 21.

As illustrated in FIG. 22 and FIG. 23, the rotor sections Ru, Rv, and Rw of three phases, forming the rotor 113, are stacked in this order in the axial direction. The rotor sections Ru, Rv, and Rw have substantially the same configuration, and each include a first rotor core 121 a second rotor core 122, a rotor insulator 123 arranged between the first and second rotor cores 121 and 122, and a field magnet (permanent magnet) 124 sandwiched between the first and second rotor cores 121 and 122.

The first rotor core 121 includes a first rotor core base 125 having a disk shape and having a through hole 125a, in which the rotation shaft 112 (see FIG. 21) is inserted and fixed, at a radially center portion. On an outer circumference edge of the first rotor core base 125, 12 first rotor claw poles (claw poles) 126 are arranged at equal intervals (interval of 30°) in the circumferential direction.

The first rotor claw poles 126 each include a first radially extending portion 126a, which extends outward in the radial direction from the outer circumference edge of the first rotor core base 125, and a first magnetic pole portion 126b, which extends in one side of the axial direction from a distal end portion (an end portion on the radially outer side) of the first radially extending portion 126a. The first rotor claw pole 126 may be formed by bending the first magnetic pole portion 126b at a right angle with respect to the first radially extending portion 126a, or by integrally forming the first radially extending portion 126a and the first magnetic pole portion 126b by casting.

The first radially extending portion 126a is formed to have a substantially rectangular shape with a uniform width in the circumferential direction, as viewed in the axial direction. Side surfaces of the first rotor claw pole 126, including the first radially extending portion 126a and the first magnetic pole portion 126b, in the circumferential direction are flat parallel surfaces. The first rotor claw pole 126 has a symmetrical shape with respect to a plane that passes through the center thereof in the circumferential direction and is orthogonal to the circumferential direction, serving as a plane of symmetry. A surface of each of the first magnetic pole portions 126b on the radially outer side has an arcuate shape and extends along a circle about a rotational axis of the rotor 113 as viewed in the axial direction.

As illustrated in FIG. 23, the second rotor core 122 has the same shape as the first rotor core 121, and includes a second rotor core base 127 and twelve second rotor claw poles (claw poles) 128. The second rotor core base 127 having a through hole 127a, in which the rotation shaft 112 (see FIG. 21) is inserted and fixed, has the same shape as the first rotor core base 125 having the through hole 125a. Each of the second rotor claw poles 128 including a second radially extending portion 128a and a second magnetic pole portion 128b has the same shape as the first rotor claw pole 126 including the first radially extending portion 126a and the first magnetic pole portion 126b.

For example, the rotor insulator 123 is formed of an insulative resin material and has an annular shape. The rotor insulator 123 is formed to have an outer diameter that is the same as an outer diameter of the first rotor core 121 (diameter of a circle passing through surfaces of the twelve first claw poles 126b on the radially outer side, which is the same as the outer diameter of the second rotor core 122), and to have an inner diameter that is the same as a diameter of the first rotor core base 125 (same as a diameter of the second rotor core base 127).

The rotor insulator 123 includes first positioning recesses 131, in the same number as the first rotor claw poles 126 (i.e., twelve) on one axial end portion (an end portion that opposes the first rotor core 121 and is on the left side in FIG. 23). The first positioning recesses 131 are formed at an equal interval (interval of 30°) in the circumferential direction. The first positioning recesses 131 each include a first through portion 131a, which is formed through one axial end portion of the rotor insulator 123 in the radial direction, and a first recessed portion 131b, which is recessed from a bottom surface of the first through portion 131a toward the other end side (i.e., toward the second rotor core 122) of the rotor insulator 123 in the axial direction. The first recessed portion 131b is formed as a recess at a portion of the bottom surface of the first through portion 131a on the radially outer side and is open on the radially outer side and one side in the axial direction (toward the first through portion 131a).

The first positioning recesses 131 each have a substantially rectangular shape as viewed in the radial direction. The first positioning recess 131 is formed to have a width in the circumferential direction that is the same as a width in the circumferential direction of the first rotor claw pole 126. More specifically, the first through portion 131a is formed to have a width in the circumferential direction that is the same as a width in the circumferential direction the first radially extending portion 126a, and the first recessed portion 131b is formed to have a width in the circumferential direction that is the same as a width in the circumferential direction the first magnetic pole portion 126b. The first positioning recess 131 is formed to have a length (depth) in the axial direction that is the same as a length in the axial direction of the first rotor claw pole 126. The first recessed portion 131b is formed to have a length (depth) in the axial direction that is the same as a distance between the inner side surface of the first rotor core base 125 and a distal end surface (an end surface in the axial direction) of the first magnetic pole portion 126b. The first recessed portion 131b is formed to have a width in the radial direction that is the same as a thickness of the first magnetic pole portion 126b in the radial direction. The first positioning recess 131 has inner side surfaces 131c on both sides in the circumferential direction that have planar shape that are in parallel with the axial direction and extend along the radial direction. As described above, the first positioning recess 131 has a shape corresponding to an inner side surface of the first rotor core 121 in the first rotor claw pole 126 and both side surfaces of the first rotor claw pole 126 in the circumferential direction.

The rotor insulator 123 has second positioning recesses 132 in the same number as the second rotor claw poles 128 (i.e., twelve) at the other axial end portion (an end portion that opposes the second rotor core 122 and is on the right side in FIG. 23). The second positioning recesses 132 are formed at equal intervals (30° interval) in the circumferential direction and area each formed at a position to be at the center between the corresponding two first positioning recesses 131 adjacent to each other in the circumferential direction. Thus, the first positioning recesses 131 and the second positioning recesses 132 are alternately arranged in the circumferential direction and at intervals of 15°.

The second positioning recesses 132 each have the same shape as the first positioning recesses 131, but are each open in a direction opposite to that of the first positioning recesses 131 in the axial direction. The second positioning recesses 132 each include a second through portion 132a, which has the same shape as the first through portion 131a and is formed through the other axial end portion of the rotor insulator 123 in the radial direction, and a second recessed portion 132b, which has the same shape as the first recessed portion 131b and is recessed from a bottom surface of the second through portion 132a toward one end side (i.e., toward the first rotor core 121) of the rotor insulator 123 in the axial direction. The second positioning recess 132 has a shape corresponding to an inner side surface of the second rotor core 122 of the second rotor claw pole 128 and both side surfaces of the second rotor claw pole 128 in the circumferential direction.

As illustrated in FIG. 22 and FIG. 23, the first rotor core 121 and the second rotor core 122 are stacked in the axial direction with distal ends of one of the magnetic pole portions 126b and 128b and distal ends of the other one of the magnetic portions 126b and 128b extending in opposite directions, and the second magnetic pole portions 128b each being arranged between the corresponding two first magnetic pole portions 126b adjacent to each other in the circumferential direction. The rotor insulator 123 is arranged between the first rotor core 121 and the second rotor core 122, more specifically, between the first rotor claw poles 126 and the second rotor claw poles 128. The twelve first rotor claw poles 126 of the first rotor core 121 are inserted in the respective first positioning recesses 131 of the rotor insulator 123. The first radially extending portions 126a are arranged in the first through portions 131a, and the first magnetic pole portions 126b are arranged in the first recessed portions 131b. Each of the first rotor claw poles 126 comes into contact, in the circumferential direction, with the inner side surfaces 131c of the first positioning recesses 131 on both sides in the circumferential direction. With the first rotor claw poles 126 thus engaged with the first positioning recesses 131 (more specifically, with the rotor insulator 123 engaged with the first rotor claw poles 126 in a manner restricting relative movement in the circumferential direction), relative movement of the first rotor core 121 and the rotor insulator 123 is restricted in the circumferential direction. In the same manner, the twelve second rotor claw poles 128 of the second rotor core 122 are inserted in the respective second positioning recesses 132 of the rotor insulator 123. The second radially extending portions 128a are arranged in the second through portions 132a, and the second magnetic pole portions 128b are arranged in the second recessed portions 132b. Each of the second rotor claw poles 128 comes into contact, in the circumferential direction, with inner side surfaces 132c of the second positioning recesses 132 on both sides in the circumferential direction. With the second rotor claw poles 128 thus engaged with the second positioning recesses 132 (more specifically, with the rotor insulator 123 engaged with the second rotor claw poles 128 in a manner restricting relative movement in the circumferential direction), relative movement of the second rotor core 122 and the rotor insulator 123 is restricted in the circumferential direction.

The first magnetic pole portions 126b, inserted in the first positioning recesses 131, and the second magnetic pole portions 128b, inserted in the second positioning recesses 132, are alternately arranged in the circumferential direction, and are positioned at an equal interval (interval of 15°) in the circumferential direction. The outer circumference surface of the first rotor core 121 (the end surfaces of the first rotor claw poles 126 on the radially outer side), the outer circumference surface of the second rotor core 122 (the end surfaces of the second rotor claw poles 128 on the radially outer side), and the outer circumference surface of the rotor insulator 123 are flush with one another. The end surface of the first rotor core 121 on the side opposite to the second rotor core 122 in the axial direction and one end surface of the rotor insulator 123 in the axial direction are positioned on the same plane. In the same manner, the end surface of the second rotor core 122 on the side opposite to the first rotor core 121 in the axial direction and the other end surface of the rotor insulator 123 in the axial direction are positioned on the same plane. The rotor insulator 123 buries the gaps between the first rotor claw poles 126 adjacent to each other in the circumferential direction, between the second rotor claw poles 128 adjacent to each other in the circumferential direction, and between the first magnetic pole portions 126b and the respective second magnetic pole portions 128b.

When the first and second rotor cores 121 and 122 are coupled together, the first rotor core base 125 and the second rotor core base 127 are arranged in parallel with each other, with the field magnet 124 arranged in between. The field magnet 124 is a permanent magnet having a disk shape and is formed of a ferrite magnet, for example. A through hole 124a, in which the rotation shaft 112 (see FIG. 21) is inserted, is formed at a center position of the field magnet 124. The field magnet 124 is clamped by the first rotor core base 125 and the second rotor core base 127 in the axial direction to be fixed, with one end surface 124b of the field magnet 124 brought in contact with an inner side surface 125b of the first rotor core base 125 and another end surface 124c of the field magnet 124 brought in contact with an inner side surface 127b of the second rotor core base 127. The outer diameter of the field magnet 124 is set to be the same as the outer diameter of each of the rotor core bases 125 and 127.

The field magnet 124 is magnetized in the axial direction to have a side closer to the first rotor core base 125 serving as the N pole and a side closer to the second rotor core base 127 serving as the S pole. Thus, with the field magnet 124, the first rotor claw poles 126 of the first rotor core 121 function as the N pole, and the second rotor claw poles 128 of the second rotor core 122 function as the S pole.

As described above, the rotor sections Ru, Rv, and Rw each having the so-called Lundell structure using the field magnet 124, each include twenty-four poles (twelve pairs of poles) with the first rotor claw poles 126 serving as the N pole and the second rotor claw poles 128 serving as the S pole alternately arranged in the circumferential direction.

Next, a stacked structure of the rotor sections Ru, Rv, and Rw will be described.

The rotor 113 includes the U-phase rotor section Ru, the V-phase rotor section Rv, and the W-phase rotor section Rw stacked in the axial direction.

The V-phase rotor section Rv in the middle stage is stacked upside down on the upper U-phase rotor section Ru and the lower W-phase rotor section Rw. Thus, the second rotor core bases 127 are adjacent to each other in the axial direction between the U-V-phases, and the first rotor core bases 125 are adjacent to each other in the axial direction between the V-W-phases.

Thus, the magnetizing directions of the field magnets 124 for the U-phase and the W-phase are the same (upward direction in FIG. 22), and the magnetizing direction of the field magnet 124 for the V-phase is opposite to the magnetizing directions of the field magnets 124 for the U-phase and the W-phase. More specifically, the S poles of the field magnets 124 for the U-phase and the V-phase oppose each other with the two adjacent second rotor core bases 127 in between. The N poles of the field magnets 124 for the V-phase and the W-phase oppose each other with the two adjacent first rotor core bases 125 in between. Thus, the magnetizing directions of the field magnets 124 of the rotor sections Ru, Rv, and Rw are opposite to each other between the adjacent phases.

The projecting directions (downward direction in FIG. 22) of the first magnetic pole portions 126b (first rotor claw poles 126) of the U-phase rotor section Ru and the W-phase rotor section Rw in the axial direction are the same. The projecting direction of the first magnetic pole portions 126b (first rotor claw poles 126) of the V-phase rotor section Rv in the axial direction (upward direction in FIG. 22) is opposite to the projecting directions of the first magnetic pole portions 126b of the U-phase rotor section Ru and the W-phase rotor section Rw in the axial direction.

In the same manner, the projecting directions (upward direction in FIG. 22) of the second magnetic pole portions 128b (second rotor claw poles 128) of the U-phase rotor section Ru and the W-phase rotor section Rw in the axial direction are the same, and are opposite to the projecting direction (downward direction in FIG. 22) of the second magnetic pole portions 128b of the V-phase rotor section Rv.

The U-phase rotor section Ru, the V-phase rotor section Rv, and the W-phase rotor section Rw are stacked with their phases shifted from each other by an electrical angle of 60°. More specifically, the V-phase rotor section Rv is arranged to have the phase of the magnetic pole shifted from the phase of the magnetic pole of the U-phase rotor section Ru by an electrical angle of 60° in the clockwise direction. The W-phase rotor section Rw is arranged to have the phase of the magnetic pole shifted from the phase of the magnetic pole of the V-phase rotor section Rv by an electrical angle of 60° in the clockwise direction.

[Configuration of Stator]

Figure 25:
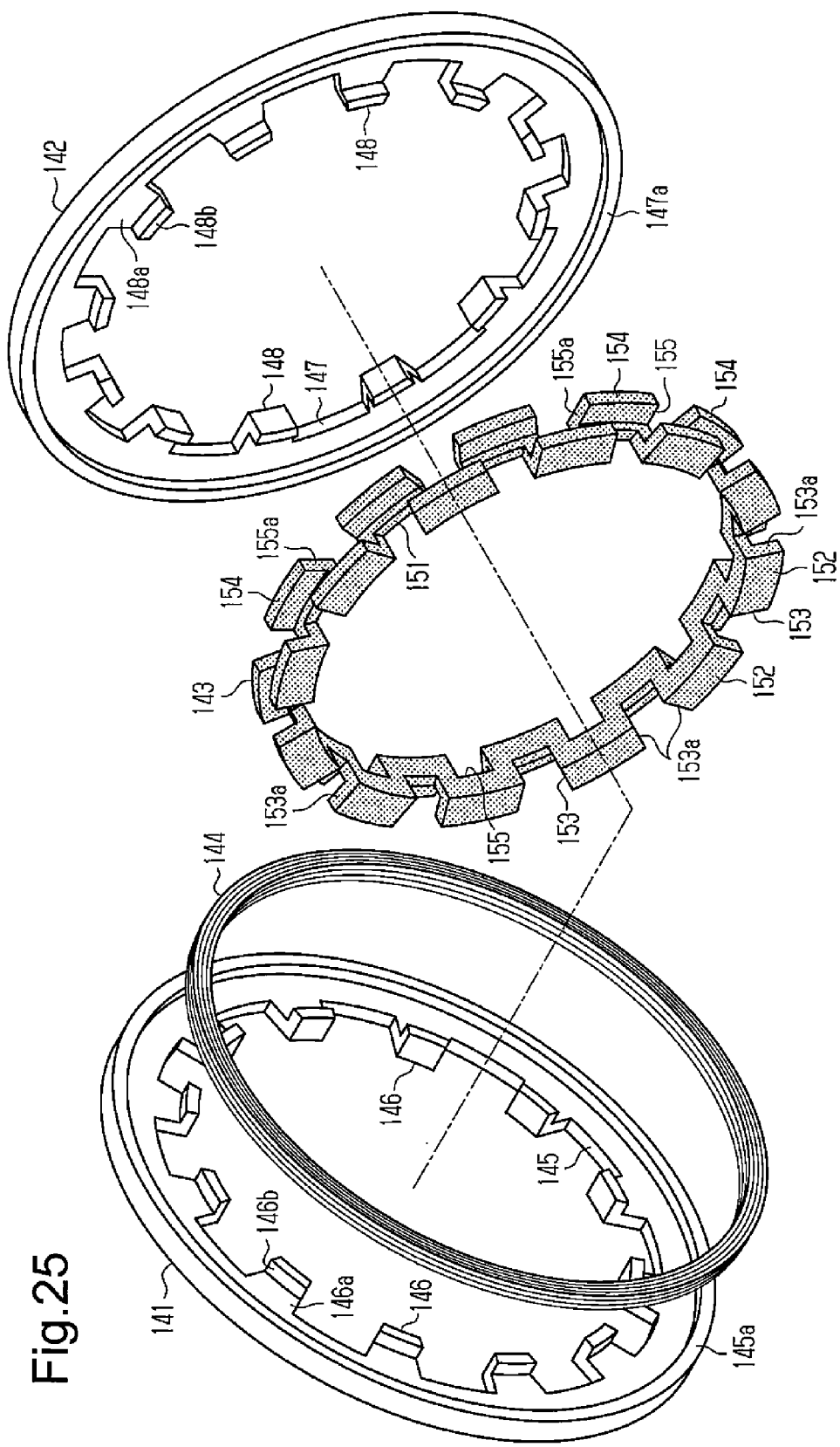
FIG. 25 is an exploded perspective view of a stator section shown in FIG. 21.
Figure 26:
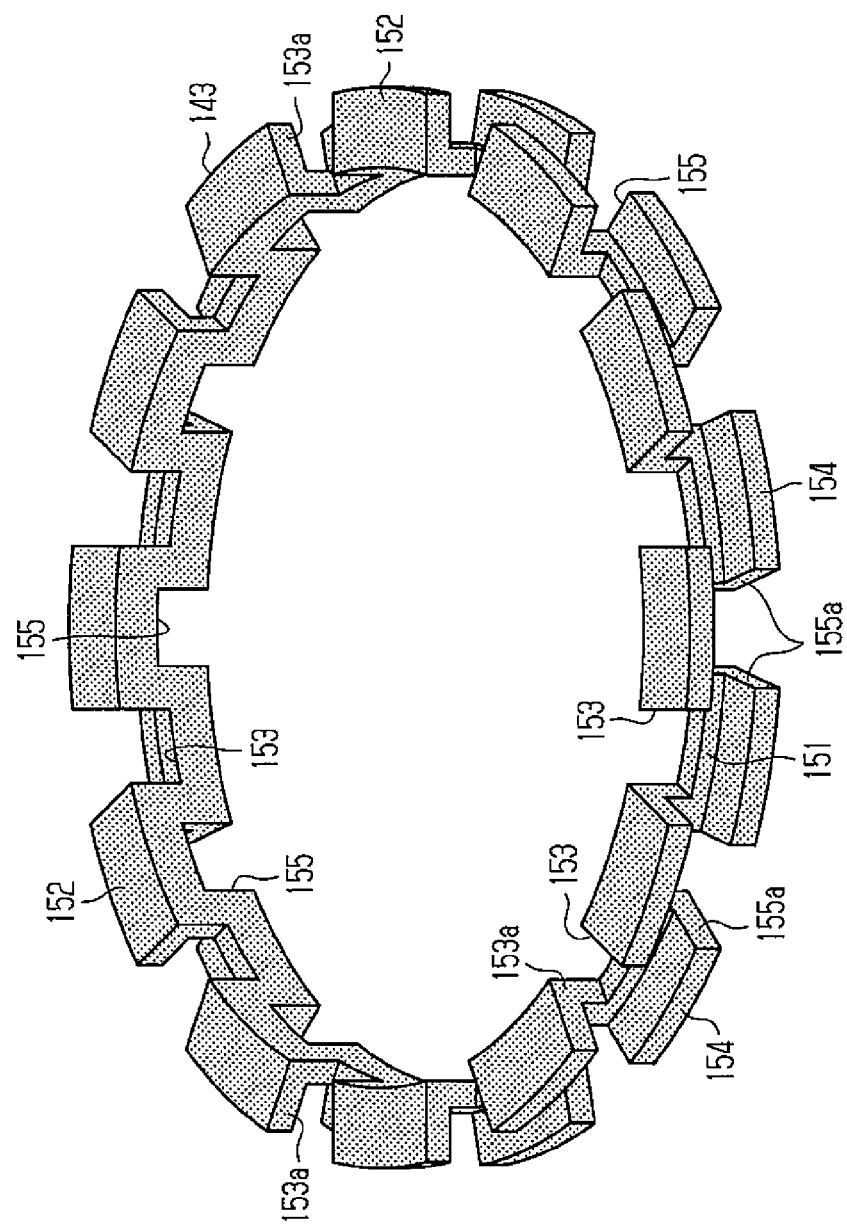
FIG. 26 is a perspective view of a stator insulator shown in FIG. 21.

As illustrated in FIG. 21, FIG. 22, and FIG. 24, the stator 114 arranged on an outer side of the rotor 113 in the radial direction includes the stator sections Su, Sv, Sw of three phases (the U-phase, the V-phase, and the W-phase) that are stacked in the axial direction and respectively correspond to the rotor sections Ru, Rv, and Rw. As illustrated in FIG. 24 and FIG. 25, the stator sections Su, Sv, and Sw have substantially the same configuration, and each include a first stator core 141, a second stator core 142, a stator insulator 143 arranged between the first and second stator cores 141 and 142, and a coil 144 arranged between the first and second stator cores 141 and 142.

As illustrated in FIG. 25, the first stator core 141 includes a first stator core base 145 having an annular shape. The first stator core base 145 has a plate shape extending in a direction orthogonal to the axial direction. The first stator core base 145 has a cylindrical wall 145a having a cylindrical shape extending in the axial direction from an outer circumference edge of the first stator core base 145. On an inner circumference edge of the first stator core base 145, twelve first stator claw poles (claw poles) 146 are arranged at equal intervals (interval of 30°) in the circumferential direction.

The first stator claw poles 146 each include a first radially extending portion 146a, which extends inward in the radial direction from the inner circumference surface of the first stator core base 145, and a first magnetic pole portion 146b, which extends toward one side in the axial direction from a distal end portion (an end portion on the radially inner side) of the first radially extending portion 146a. The first stator claw pole 146 may be formed by bending the first magnetic pole portion 146b at a right angle with respect to the first radially extending portion 146a, or by integrally forming the first radially extending portion 146a and the first magnetic pole portion 146b by casting.

The first radially extending portion 146a is formed to have a trapezoidal shape so that the circumferential width decreases toward the radially inner side, as viewed in the axial direction. The first magnetic pole portion 146b is formed to have a trapezoidal shape to have a portion closer to the distal end having a smaller width in the circumferential direction, as viewed in the axial direction. The first stator claw pole 146 has a symmetrical shape with respect to a plane that passes through the center thereof in the circumferential direction and is orthogonal to the circumferential direction, serving as a plane of symmetry.

The second stator core 142 has a similar configuration as the first stator core 141, and includes a second stator core base 147 and twelve second stator claw poles (claw poles) 148. More specifically, the second stator core base 147 has a cylindrical wall 147a that is similar to the cylindrical wall 145a, and has the same shape as the first stator core base 145. Each of the second stator claw poles 148 including a second radially extending portion 148a and a second magnetic pole portion 148b has the same shape as the first stator claw pole 146 including the first radially extending portion 146a and the first magnetic pole portion 146b.

As illustrated in FIG. 24 to FIG. 27, for example, the stator insulator 143 includes an annular shape portion 151 that is formed of an insulative resin material and has an annular shape. The annular shape portion 151 is formed to have an inner diameter that is the same as the inner diameter of the first stator core 141 (that is the same as the inner diameter of the second stator core 142). The annular shape portion 151 is formed to have a thickness in the radial direction that is the same as a thickness of the first magnetic pole portion 146b in the radial direction (that is the same as the thickness of the second magnetic pole portion 148b in the radial direction). The annular shape portion 151 is formed to have a length in the axial direction that is the same as the length in the axial direction of the first stator core 141 and the second stator core 142 coupled to each other (that is the same as the length of each of the stator sections Su, Sv, and Sw in the axial direction).

First extending portions 152 in the same number as the first stator claw poles 146 (i.e., twelve) are integrally formed on one axial end portion of the annular shape portion 151 (an end portion that opposes the first stator core 141 and is on the left side in FIG. 25). The twelve first extending portions 152 are formed at equal intervals (30° interval) in the circumferential direction.

The first extending portions 152 extend outward in the radial direction from the annular shape portion 151. Each of the first extending portions 152 is formed to have a width in the circumference direction that is the same as a width in the circumference direction of a void between the first radially extending portions 146a of the first stator core 141. Each of the first extending portions 152 is formed to have a length in the radial direction that is the same as a length of the first stator claw pole 146 in the radial direction. Each of the first extending portions 152 is formed to have a length (thickness) in the axial direction that is the same as a length (thickness) of the first radially extending portion 146a in the axial direction. Each of the first extending portions 152 has a substantially rectangular shape as viewed in the axial direction.

In the stator insulator 143, first positioning recesses 153 are provided, each between the corresponding two first extending portions 152 adjacent to each other in the circumferential direction and having inner circumference surfaces corresponding to an outer shape of the first stator claw pole 146, that is, shapes of both side surfaces of the first stator claw pole 146 in the circumferential direction and of a distal end surface of the first magnetic pole portion 146b (distal end surface in the axial direction). The twelve first positioning recesses 153 are arranged at equal intervals (30° interval) in the circumferential direction. Each of the first positioning recess 153 is arranged between the corresponding two first extending portions 152 adjacent to each other in the circumferential direction, and reaches the annular shape portion 151 in the axial direction. A portion of each of the first positioning recesses 153 on the annular shape portion 151 is recessed to form a rectangular shape as viewed in the radial direction and is formed through the annular shape portion 151 in the radial direction. Each of the first positioning recesses 153 is formed to have a depth in the axial direction that is the same as the length of the first stator claw pole 146 in the axial direction. Each of the first positioning recesses 153 is formed to have a width in the circumferential direction that is the same as the width of the first stator claw pole 146 in the circumferential direction. The first positioning recess 153 has inner side surfaces 153a on both sides in the circumferential direction having a plate shape that is in parallel with the axial direction and extends along the radial direction.

Second extending portions 154 in the same number as the second stator claw poles 148 (i.e., twelve) are integrally formed on the other axial end portion of the annular shape portion 151 (an end portion that opposes the second stator core 142 and is on the right side in FIG. 25). The twelve second extending portions 154 are formed at equal intervals (30° interval) in the circumferential direction. Each of the second extending portions 154 is formed at a middle position between the corresponding two first extending portions 152 adjacent to each other in the circumferential direction. Thus, in the stator insulator 143, the twelve second extending portions 154 are formed while being shifted from the twelve first extending portions 152 by 15° in the circumferential direction. The second extending portions 154 each have the same shape as the first extending portions 152.

In the stator insulator 143, second positioning recesses 155 are provided, each between the corresponding two second extending portions 154 adjacent to each other in the circumferential direction and having inner circumference surfaces corresponding to an outer shape of the second stator claw pole 148, that is, shapes of both side surfaces of the second stator claw pole 148 in the circumferential direction and a distal end surface of the second magnetic pole portion 148b (a distal end surface in the axial direction). The second positioning recesses 155 are formed at equal intervals (30° interval) in the circumferential direction. Each of the second positioning recesses 155 is formed at a middle position between the corresponding two first positioning recesses 153 adjacent to each other in the circumferential direction. Thus, in the stator insulator 143, the twelve second positioning recesses 155 are formed while being shifted from the twelve first positioning recesses 153 by 15° in the circumferential direction, and the first positioning recesses 153 and the second positioning recesses 155 are alternately formed in the circumferential direction. Each of the second positioning recesses 155 has the same shape as the first positioning recesses 153, but has an opening direction in the axial direction opposite to that of the first positioning recesses 153.

Figure 27:
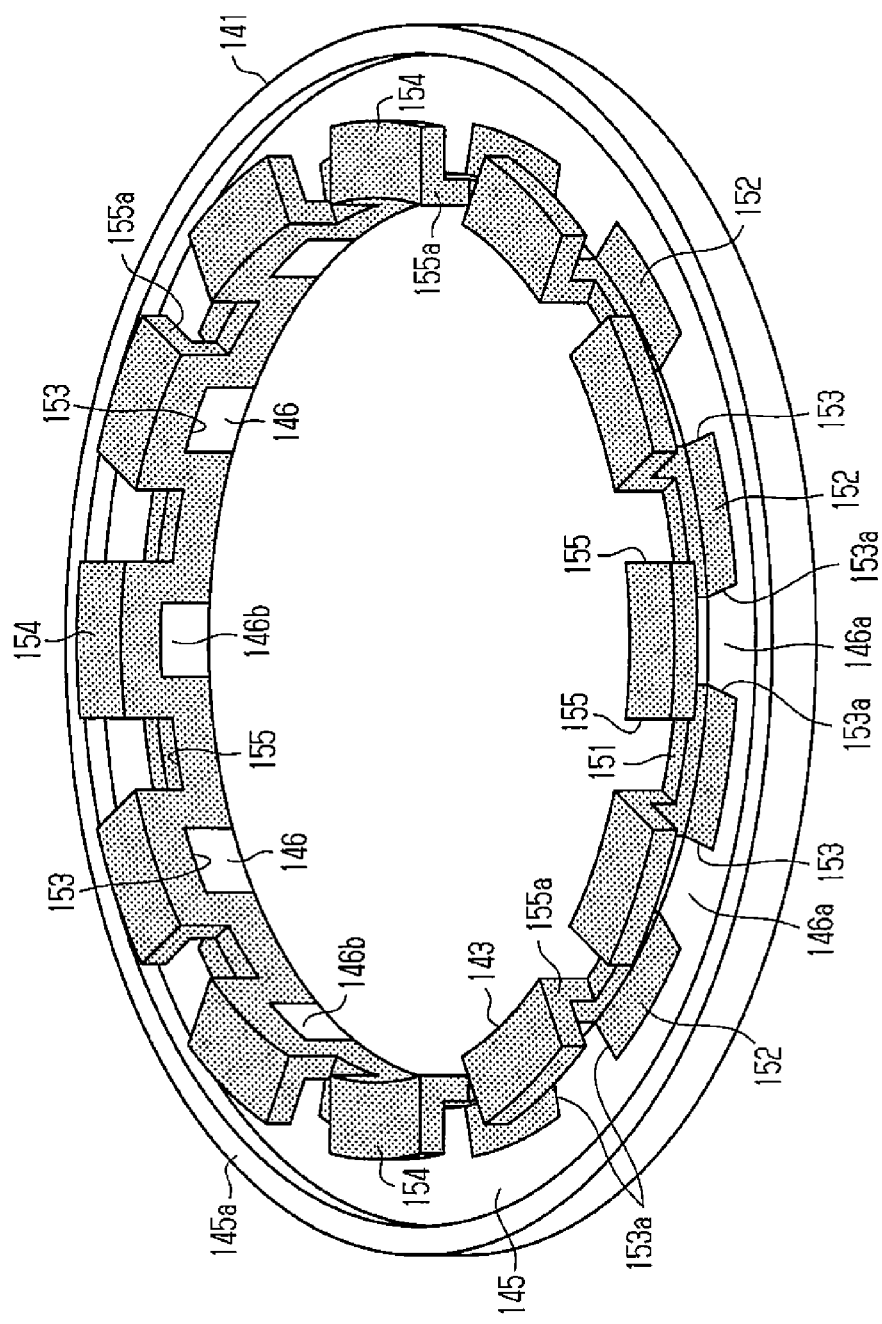
FIG. 27 is a perspective view of a first stator core and the stator insulator shown in FIG. 21.

As illustrated in FIG. 24 and FIG. 25, the first stator core 141 and the second stator core 142 are stacked so that distal ends of one of the magnetic pole portions 146b and 148b and distal ends of the other one of the magnetic pole portions 146b and 148b extend in opposite directions, and the second magnetic pole portions 148b are each arranged between the corresponding two first magnetic pole portions 146b in the circumferential direction. The stator insulator 143 is arranged between the first stator core 141 and the second stator core 142, more specifically, between the first stator claw poles 146 and the second stator claw poles 148. As illustrated in FIG. 24 and FIG. 27, the twelve first stator claw poles 146 of the first stator core 141 are inserted in the respective first positioning recesses 153 of the stator insulator 143. Each of the first stator claw poles 146 comes into contact, in the circumferential direction, with the inner side surfaces 153a of the first positioning recesses 153 in the circumferential direction. With the first stator claw poles 146 thus engaged with the first positioning recesses 153 (more specifically, with the stator insulator 143 engaged with the first stator claw poles 146 in a manner restricting relative movement in the circumferential direction), relative movement of the first stator core 141 and the stator insulator 143 is restricted in the circumferential direction. As illustrated in FIG. 24 and FIG. 25, the twelve second stator claw poles 148 of the second stator core 142 are inserted in the respective second positioning recesses 155 of the stator insulator 143. Each of the second stator claw poles 148 comes into contact, in the circumference direction, with the inner side surfaces 155a of the second positioning recesses 155 on both sides in the circumferential direction. With the second stator claw poles 148 engaged with the second positioning recesses 155 (more specifically, with the stator insulator 143 engaged with the second stator claw poles 148 in a manner restricting relative movement in the circumferential direction), relative movement of the second stator core 142 and the stator insulator 143 is restricted in the circumferential direction.

The first magnetic pole portions 146b, inserted in the first positioning recesses 153, and the second magnetic pole portions 148b, inserted in the second positioning recesses 155, are alternately arranged in the circumferential direction and are positioned at an equal interval (interval of 15° in the present embodiment) in the circumferential direction. The inner circumference surface of the first stator core 141 (distal end surfaces of the first stator claw poles 146 on the radially inner side), the inner circumference surface of the second stator core 142 (distal end surfaces of the second stator claw poles 148 on the radially inner side), and the inner circumference surface of the stator insulator 143 (the inner circumference surface of the annular shape portion 151) are flush with one another. The end surface of the first stator core 141 on the side opposite to the second stator core 142 in the axial direction and one end surface of the stator insulator 143 in the axial direction are positioned on the same plane. In the same manner, the end surface of the second stator core 142 on side opposite to the first stator core 141 in the axial direction and the other end surface of the stator insulator 143 in the axial direction are positioned on the same plane. The stator insulator 143 buries the gaps between the first stator claw poles 146 adjacent to each other in the circumferential direction, between the second stator claw poles 148 adjacent to each other in the circumferential direction, and between the first magnetic pole portions 146*b* and the respective second magnetic pole portions 148*b*.

When the first and second stator cores 141 and 142 are coupled to each other, the first stator core base 145 and the second stator core base 147 are in parallel with each other. The cylindrical walls 145*a* and 147*a* of the first and second stator core bases 145 and 147 are in contact with each other in the axial direction to form outer circumference walls of the stator sections Su, Sv, and Sw. The coil 144, having an annular shape in the circumferential direction, is arranged in a space on the inner circumferential side of the cylindrical walls 145*a* and 147*a* and between the first and second stator core bases 145 and 147 in the axial direction.

The stator sections Su, Sv, and Sw with the configurations described above have the so-called Lundell (claw pole) structure having twenty-four poles in which the first and second stator claw poles 146 and 148 are magnetized by the coil 144 to be magnetic poles different from one another and assigned depending on occasions.

Next, a stacked structure of the stator sections Su, Sv, and Sw of different phases will be described.

The stator 114 includes the U-phase stator section Su, the V-phase stator section Sv, and the W-phase stator section Sw that are stacked in this order in the axial direction. The stator sections Su, Sv, and Sw are stacked so that the first stator core bases 145 and the second stator core bases 147 are alternately arranged in the axial direction.

The U-phase stator section Su, the V-phase stator section Sv, and the W-phase stator section Sw are stacked with their phases shifted from each other by an electrical angle of 60°. More specifically, the V-phase stator section Sv is arranged to have the phase of the magnetic pole shifted from the phase of the magnetic pole of the U-phase stator section Su in the clockwise direction by an electrical angle of 60°. The W-phase stator section Sw is arranged to have the phase of the magnetic pole shifted from the phase of the magnetic pole of the V-phase stator section Sv in the clockwise direction by an electrical angle of 60°.

Next, the operation of the motor 111 having the configuration described above will be described.

In the motor 111 as illustrated in FIG. 21, when three-phase AC voltage is applied to the stator 114, U-phase power supply voltage, V-phase power supply voltage, and W-phase power supply voltage are respectively applied to the coil 144 of the U-phase stator section Su, the coil 144 of the V-phase stator section Sv, and the coil 144 of the W-phase stator section Sw. Thus, a rotating magnetic field is generated in the stator 114, and the rotor 113 is rotated.

As illustrated in FIG. 22 and FIG. 23, in the rotor sections Ru, Rv, and Rw of different phases, the first rotor claw poles 126 of the first rotor core 121 each come into contact with the inner side surfaces 131*c* of the first positioning recesses 131 of the rotor insulator 123 on both sides in the circumferential direction, to be engaged with the rotor insulator 123 in a manner restricting relative movement in the rotational direction. In the rotor sections Ru, Rv, and Rw of different phases, the second rotor claw poles 128 of the second rotor core 122 each come into contact with the inner side surfaces 132*c* of the second positioning recesses 132 of the rotor insulator 123 on both sides in the circumferential direction, to be engaged with the rotor insulator 123 in a manner restricting relative movement in the rotational direction. Thus, in the rotor sections Ru, Rv, and Rw of different phases, the first rotor core 121 and the second rotor core 122 are positioned in the rotational direction by the rotor insulator 123.

As illustrated in FIG. 24 and FIG. 25, in the stator sections Su, Sv, and Sw of different phases, the first stator claw poles 146 of the first stator core 141 each come into contact with the inner side surfaces 153*a* of the first positioning recesses 153 of the stator insulator 143 on both sides in the circumferential direction, to be engaged with the stator insulator 143 in a manner restricting relative movement in the rotational direction. In the stator sections Su, Sv, and Sw of different phases, the second stator claw poles 148 of the second stator core 142 each come into contact with the inner side surfaces 155*a* of the second positioning recesses 155 of the stator insulator 143 on both sides in the circumferential direction, to be engaged with the stator insulator 143 in a manner restricting relative movement in the rotational direction. Thus, in the stator sections Su, Sv, and Sw of different phases, the first stator core 141 and the second stator core 142 are positioned in the rotational direction by the stator insulator 143.

Next, advantages of the fourth embodiment will be described.

(1) The rotor insulator 123 is engaged with the twelve first rotor claw poles 126 of the first rotor core 121 and the twelve second rotor claw poles 128 of the second rotor core in a manner restricting relative movement in the circumferential direction. Thus, the first rotor core 121 and the second rotor core 122 are positioned in the rotational direction by the rotor insulator 123. Thus, in each of the rotor sections Ru, Rv, and Rw of the rotor 113, the positions of the first rotor core 121 and the second rotor core 122 can be prevented from shifting in the rotational direction by the rotor insulator 123. The stator insulator 143 is engaged with the twelve first stator claw poles 146 of the first stator core 141 and the twelve second stator claw poles 148 of the second stator core 142 in a manner restricting relative movement in the circumferential direction. Thus, the first stator core 141 and the second stator core 142 are positioned in the rotational direction by the stator insulator 143. Thus, in each of the stator sections Su, Sv, and Sw of the stator 114, the positions of the first stator core 141 and the second stator core 142 can be prevented from shifting in the rotational direction by the stator insulator 143. Accordingly, the magnetic flux can be prevented from being disturbed. As a result, vibration and noise due to the disturbance of the magnetic flux can be prevented from being generated.

(2) In each of the rotor sections Ru, Rv, and Rw, the rotor insulator 123 can prevent the field magnet 124 from scattering when the field magnet 124 is damaged.

(3) Insulating between the first rotor core 121 and the second rotor core 122 can be easily achieved with the rotor insulator 123. Insulating between the first stator core 141 and the second stator core 142 can be easily achieved with the stator insulator 143.

(4) The rotor sections Ru, Rv, and Rw of different phases each include the rotor insulator 123, so that no jig for positioning the first rotor core 121 and the second rotor core 122 in the rotational direction needs to be used when assembling the rotor sections Ru, Rv, and Rw of different phases. The stator sections Su, Sv, and Sw of different phases each include the stator insulator 143, so that no jig for positioning the first stator core 141 and the second stator core 142 in the rotational direction needs to be used when assembling the stator sections Su, Sv, and Sw of different phases. Thus, coupling of each of the rotor sections Ru, Rv, and Rw and the stator sections Su, Sv, and Sw is prevented from being burdensome, and each of the rotor sections Ru, Rv, and Rw and the stator sections Su, Sv, and Sw can be easily coupled.

Fifth Embodiment

A fifth embodiment of a motor is described below. In the fifth embodiment, the configurations that are the same as those in the fourth embodiment are denoted with the same reference numerals, and a detailed description thereof will be omitted.

The motor 111 includes a motor unit M2 illustrated in FIG. 28A instead of the motor units Mu, Mv, and Mw according to the fourth embodiment. The motor unit M2 includes a rotor section R2, which is fixed to the rotation shaft 112 (not illustrated FIG. 28, refer to FIG. 21), and a stator section S2, which is arranged on an outer circumference of the rotor section R2 and opposes the rotor section R2 in the radial direction.

As illustrated in FIG. 28A and FIG. 28B, the rotor section R2 includes the first rotor core 121, the second rotor core 122, the field magnet 124 (not illustrated in FIG. 28, refer to FIG. 23), and a rotor insulator 161 arranged between the first and second rotor cores 121 and 122. Thus, the rotor section R2 includes the rotor insulator 161 instead of the rotor insulator 123 in each of the rotor sections Ru, Rv, and Rw according to the fourth embodiment.

The rotor insulator 161 has a configuration obtained by adding a rotor slidable contact portion (slidable contact portion) 162 to the rotor insulator 123 according to the fourth embodiment. More specifically, the rotor insulator 161 includes an insulative resin material for example, and has an annular shape. The rotor slidable contact portion 162 is a portion, in the rotor insulator 161, projecting toward the outer side in the radial direction from the outer circumference surface of the first rotor core 121 (i.e., surfaces of the first rotor claw poles 126 on the radially outer side) and the outer circumference surface of the second rotor core 122 (i.e., surfaces of the second rotor claw poles 128 (see FIG. 22) on the radially outer side). The rotor slidable contact portion 162 has a cylindrical shape. The rotor slidable contact portion 162 is formed to have a thickness in the radial direction that is substantially the same as half the length of a distance between the rotor claw poles 126 and 128 and the stator claw poles 146 and 148 opposing each other in the radial direction. The rotor slidable contact portion 162 is formed to have a length in the axial direction that is the same as a length (i.e., the length of the rotor section R2 in the axial direction) of the first rotor core 121 and the second rotor core 122, coupled to each other, in the axial direction. The outer circumference surface of the rotor slidable contact portion 162 forms a cylindrical shape coaxial with the first and second rotor cores bases 125 and 127. In the rotor section R2, the rotor slidable contact portion 162 covers the outer circumference surface of the first rotor core 121 and the outer circumference surface of the second rotor core 122. The outer circumference surface of the first rotor core 121 (surfaces of the first rotor claw poles 126 on the radially outer side) and the outer circumference surface of the second rotor core 122 (surfaces of the second rotor claw poles 128 on the radially outer side) are in contact with the rotor slidable contact portion 162.

The stator section S2 includes the first stator core 141, the second stator core 142, the coil 144 (not illustrated in FIG. 28, refer to FIG. 25), and a stator insulator 171 arranged between the first and second stator cores 141 and 142. Thus, the stator section S2 includes the stator insulator 171 instead of the stator insulator 143 in each of the stator sections Su, Sv, and Sw according to the fourth embodiment.

The stator insulator 171 has a configuration obtained by adding a stator slidable contact portion (slidable contact portion) 172 to the stator insulator 143 according to the fourth embodiment. More specifically, for example, the stator insulator 171 is formed of an insulative resin material, and has an annular shape. The stator slidable contact portion 172 is a portion in the stator insulator 171 projecting toward the inner side in the radial direction from the inner circumference surface of the first stator core 141 (i.e., surfaces of the first stator claw pole 146 on the radially inner side) and the inner circumference surface of the second stator core 142 (i.e., surfaces of the second stator claw poles 148 on the radially inner side). The stator slidable contact portion 172 has a cylindrical shape. The stator slidable contact portion 172 is formed to have a thickness in the radial direction that is substantially the same as one half the length of the distance between the rotor claw poles 126 and 128 and the stator claw poles 146 and 148 opposing each other in the radial direction. The stator slidable contact portion 172 is formed to have a length in the axial direction that is the same as the length (a length of the stator section S2 in the axial direction) of the first stator core 141 and the second stator core 142, coupled to each other, in the axial direction. The inner circumference surface of the stator slidable contact portion 172 has a cylindrical shape coaxial with the first and second stator core bases 145 and 147. In the stator section S2, the stator slidable contact portion 172 covers the inner circumference surface of the first stator core 141 and the inner circumference surface of the second stator core 142. The inner circumference surface of the first stator core 141 (surfaces of the first stator claw poles 146 on the radially inner side) and the inner circumference surface of the second stator core 142 (surfaces of the second stator claw poles 148 on the radially inner side) are in contact with the stator slidable contact portion 172.

When the rotor section R2 is coupled to the inner side of the stator section S2, the rotor slidable contact portion 162 and the stator slidable contact portion 172 oppose each other in the radial direction. The rotor slidable contact portion 162 and the stator slidable contact portion 172 bury the gap between the first and second rotor cores 121 and 122 and the first and second stator cores 141 and 142. The outer circumference surface of the rotor slidable contact portion 162 and the inner circumference surface of the stator slidable contact portion 172 are in contact with each other to be slidable in the rotational direction of the rotor section R2. The rotor slidable contact portion 162 and the stator slidable contact portion 172 are preferably formed of a resin material with which smooth slidable contact can be achieved. A lubricating material may be applied between the rotor slidable contact portion 162 and the stator slidable contact portion 172.

In the motor including the motor unit M2, when power supply voltage is applied to the stator section S2, the rotor section R2 is rotated with the outer circumference surface of the rotor slidable contact portion 162 and the inner circumference surface of the stator slidable contact portion 172 in slidable contact with each other.

The fifth embodiment has the following advantages in addition to the advantages of the fourth embodiment.

(1) With the rotor slidable contact portion 162 of the rotor insulator 161 and the stator slidable contact portion 172 of the stator insulator 171, an air gap between the rotor section R2 and the stator section S2 can be eliminated. The rotor slidable contact portion 162 and the stator slidable contact portion 172 are in slidable contact with each other and thus hold the rotor section R2 (rotor) in such a manner as to be rotatable with respect to the stator section S2 (stator). Thus, the rotor including the rotor section R2 can be axially supported with a small number of parts. With the slidable contact portions 162 and 172, runout of the rotor section R2 (rotor) in the radial direction with respect to the stator section S2 (stator) can be prevented, and vibration of the rotor can be reduced.

Sixth Embodiment

A sixth embodiment of a motor is described below. In the sixth embodiment, the configurations that are the same as those in the fourth embodiment are denoted with the same reference numerals, and a detailed description thereof will be omitted.

Figure 29:
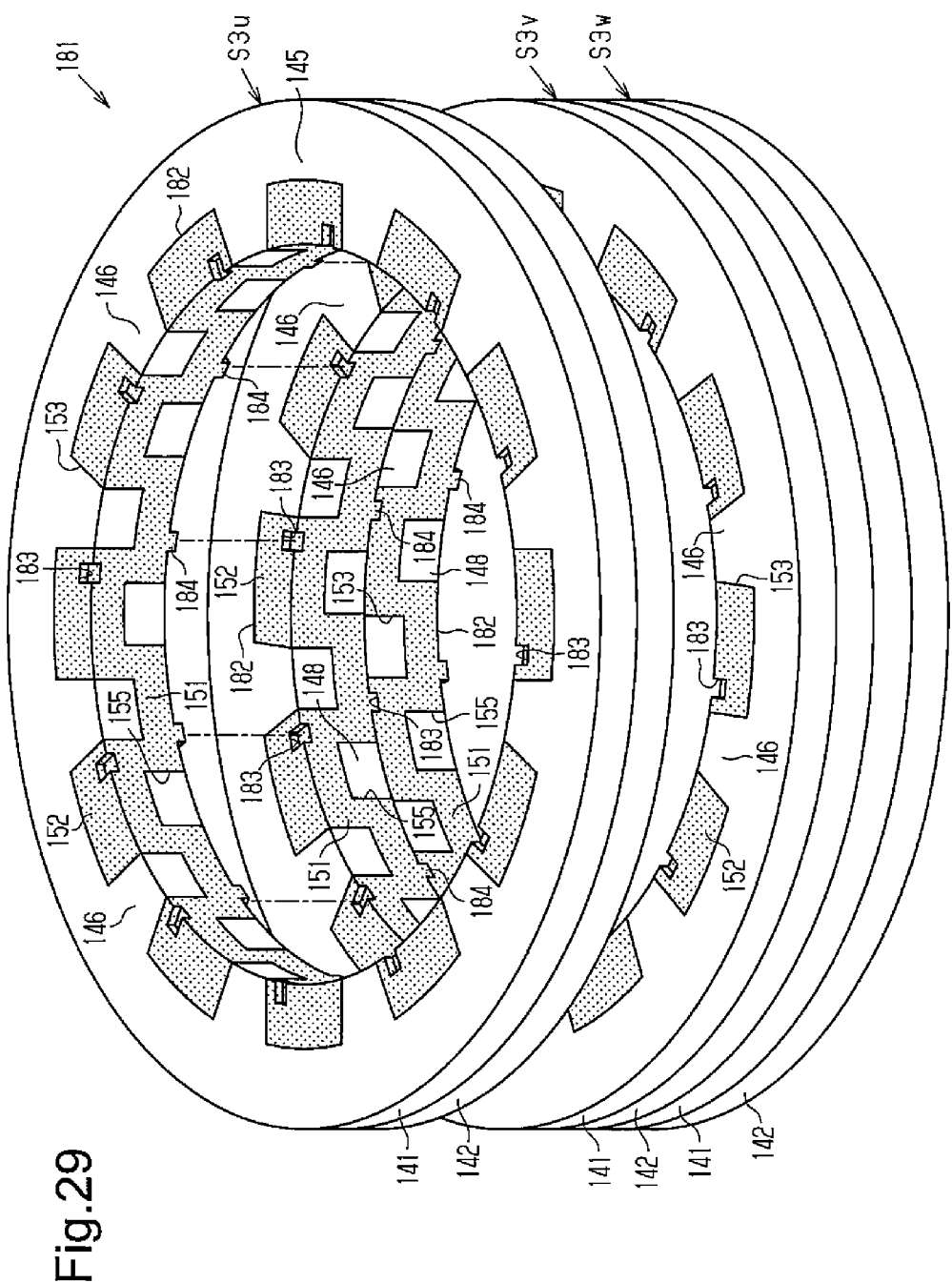
FIG. 29 is an exploded perspective view of a stator in a sixth embodiment.

The motor 111 includes a stator 181 illustrated in FIG. 29 instead of the stator 114 according to the fourth embodiment. Stator sections S3u, S3v, and S3w in the stator 181 each include a stator insulator 182 instead of the stator insulator 143 according to the fourth embodiment.

The stator insulator 182 has a configuration obtained by adding first engaging portions 183 and second engaging portions 184 to the stator insulator 143 according to the fourth embodiment. More specifically, twelve first engaging portions 183 are formed as recesses on one end surface (an upper end surface in FIG. 29) of the stator insulator 182 in the axial direction. The first engaging portions 183 are formed at twelve portions in the stator insulator 182 at an equal interval (interval of 30°) in the circumferential direction. In the present embodiment, the twelve first engaging portions 183 are formed on an inner circumferential edge portion of the one end surface (the upper end surface in FIG. 29) of the annular shape portion 151 in the axial direction. The twelve first engaging portions 183 are formed at positions on the inner side of the twelve first extending portions 152 in the radial direction, in one axial end portion of the annular shape portion 151. Each of the first engaging portions 183 has a shape of a recess on one axial end portion of the annular shape portion 151, recessed to be in a rectangular shape, and is open in two directions that are one side in the axial direction and the radially inner side.

On the other end surface (lower end surface in FIG. 29) of the stator insulator 182 in the axial direction, twelve second engaging portion 184 are formed as projections. The second engaging portions 184 are formed at twelve portions in the stator insulator 182 at equal intervals (30° interval) in the circumferential direction. In the present embodiment, the twelve second engaging portions 184 are formed in an inner circumferential edge portion of the other end surface (the lower end surface in FIG. 29) of the annular shape portion 151 in the axial direction. The twelve second engaging portions 184 are formed at positions on the inner side of the twelve second extending portion 154 (not illustrated in FIG. 29, refer to FIG. 26) in the radial direction, in the other axial end portion of the annular shape portion 151. The twelve second engaging portion 184 are formed at positions shifted with respect to the twelve first engaging portions 183 in one side in the circumferential direction (clockwise direction in FIG. 29) by an electrical angle of 60°. Each of the second engaging portions 184 are formed as a rectangular projection on the other end surface of the annular shape portion 151 in the axial direction. Each of the second engaging portions 184 has a rectangular shape corresponding to the inner circumference surface of the first engaging portion 183.

The U-phase stator section S3u, the V-phase stator section S3v, and the W-phase stator section S3w each having the stator insulator 182 as described above are stacked in this order in the axial direction so that the first stator core bases 145 and the second stator core bases 147 (not illustrated in FIG. 29, refer to FIG. 25) are alternately arranged in the axial direction. The second engaging portion 184 of the stator insulator 182 in the U-phase stator section S3u is inserted in the axial direction to and thus is engaged with the first engaging portion 183 of the stator insulator 182 in the V-phase stator section S3v adjacent to the U-phase stator section S3u in the axial direction. Thus, the stator insulator 182 of the U-phase stator section S3u and the stator insulator 182 of the V-phase stator section S3v are engaged to restrict relative movement in the circumferential direction. In the stator sections S3u and S3v, the first stator core 141 and the second stator core 142 are not relatively rotatable in the circumferential direction with respect to the stator insulator 182. Thus, the U-phase stator section S3u and the V-phase stator section S3v are positioned in the rotational direction by the stator insulator 182. In the same manner, the second engaging portion 184 of the stator insulator 182 in the V-phase stator section S3v is inserted in the axial direction to and thus is engaged with the first engaging portion 183 of the stator insulator 182 in the W-phase stator section S3w adjacent to the V-phase stator section S3v in the axial direction. Thus, the stator insulator 182 of the V-phase stator section S3v and the stator insulator 182 of the W-phase stator section S3w are engaged in a manner restricting relative movement in the circumferential direction. In each of the stator sections S3v and S3w, the first stator core 141 and the second stator core 142 are not relatively rotatable in the circumferential direction with respect to the stator insulator 182. Thus, the V-phase stator section S3v and the W-phase stator section S3w are positioned in the rotational direction by the stator insulator 182.

In each of the stator insulators 182, the twelve first engaging portions 183 are formed at positions shifted from the twelve second engaging portions 184 by an electrical angle of 60°. Thus, the U-phase stator section S3u and the V-phase stator section S3v, adjacent to each other in the axial direction, are stacked while being shifted from each other by an electrical angle of 60° in the circumferential direction, and the V-phase stator section S3v and the W-phase stator section S3w, adjacent to each other in the axial direction, are stacked while being shifted from each other by an electrical angle of 60° in the circumferential direction.

According to the sixth embodiment, the following advantages can be obtained in addition to the advantages of the fourth embodiment.

(1) With the stator insulator 182 including the first engaging portion 183 and the second engaging portion 184, the stator sections S3u and S3v adjacent to each other in the axial direction and the stator sections S3v and S3w adjacent to each other in the axial direction are positioned in the rotational direction. Thus, in the stator 181 including the three stator sections S3u, S3v, and S3w stacked in the axial direction, the disturbance of the magnetic flux due to the positional shift among the stator sections S3u, S3v, and S3w in the rotational direction can be prevented. Thus, vibration or noise due to the disturbance of the magnetic flux can be more effectively prevented from being generated.

(2) The stator sections S3u, S3v, and S3w can be positioned to one another in the rotational direction, with a simple configuration in which the first engaging portion 183 and the second engaging portion 184 as a recess and a projection that engage with each other are provided to the stator insulators 182 in the stator sections S3u and S3v adjacent to each other in the axial direction and in the stator sections S3v and S3w adjacent to each other in the axial direction. The stator insulators 182 would not be so complicated by providing the first and second engaging portions 183 and 184.

(3) The stator sections S3u, S3v, and S3w can be positioned relative to one another in the rotational direction with the first and second engaging portions 183 and 184, and thus can be easily coupled without using a jig for positioning the stator sections S3u, S3v, and S3w relative to one another in the rotational direction.

(4) The stator insulator 182 is provided with a plurality of (i.e., twelve) the first engaging portions 183 and a plurality of (i.e., twelve) the second engaging portions 184. The stator insulators 182 of the stator sections S3u and S3v adjacent to each other in the axial direction are engaged with each other in a manner restricting relative movement in the circumferential direction, with the first engaging portions 183 and the second engaging portions 184 engaged with each other at a plurality of portions. In the same manner, the stator insulators 182 of the stator sections S3v and S3w adjacent to each other in the axial direction are engaged with each other in a manner restricting relative movement in the circumferential direction, with the first engaging portions 183 and the second engaging portions 184 engaged with each other at a plurality of portions. Thus, compared with a case where the stator insulator 182 is provided with a single first engaging portion 183 and a single second engaging portion 184, the stator sections S3u and S3v adjacent to each other in the axial direction and the stator sections S3v and S3w adjacent to each other in the axial direction can be positioned in the rotational direction more stably.

Seventh Embodiment

A seventh embodiment of a motor is described below. In the seventh embodiment, the configurations that are the same as those in the fourth embodiment are denoted with the same reference numerals, and a detailed description thereof will be omitted.

Figure 30:
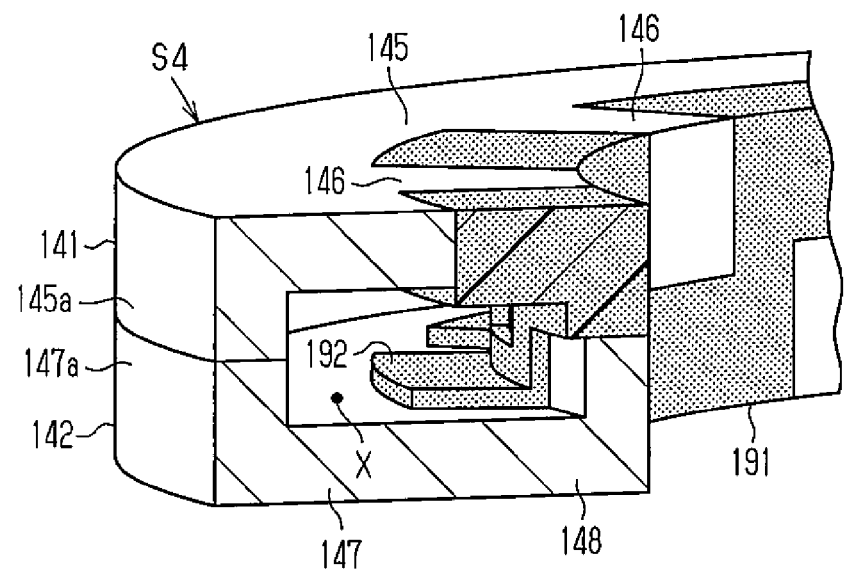
FIG. 30 is a cross-sectional view of a stator section in a seventh embodiment.

The motor 111 includes a stator section S4 illustrated in FIG. 30 instead of each of the stator sections Su, Sv, and Sw according to the fourth embodiment. The stator section S4 includes a stator insulator 191 instead of the stator insulator 143 according to the fourth embodiment.

The stator insulator 191 has a configuration obtained by adding a coil holding portion 192 to the stator insulator 143 according to the fourth embodiment. More specifically, the stator insulator 191 as a whole has a larger thickness than the stator insulator 143, to project into an inner void X between the first stator core 141 and the second stator core 142, which are coupled to each other. In the stator insulator 191, portions projecting into the void between the first stator core 141 and the second stator core 142 from side surfaces of the first stator core 141 and the second stator core 142 opposing the void (inner void X) between the first and second stator cores 141 and 142 serve as the coil holding portion 192.

Figure 31:
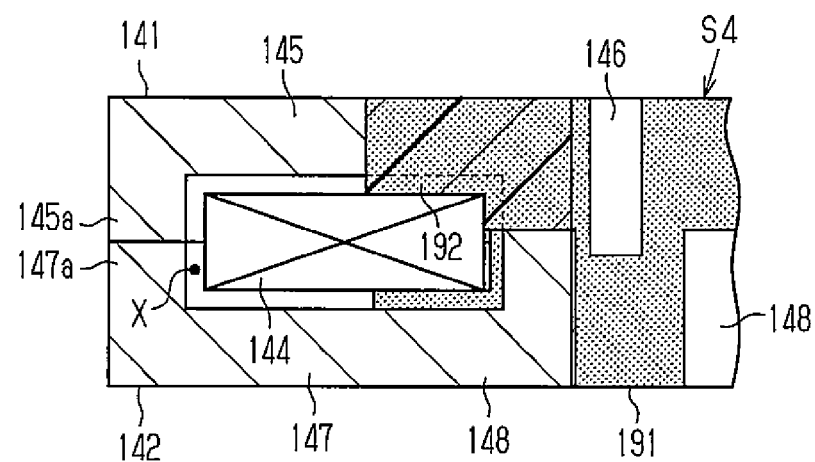
FIG. 31 is a cross-sectional view of the stator section in the seventh embodiment.

As illustrated in FIG. 31, the coil 144, arranged in the inner void X between the first and second stator cores 141 and 142, is sandwiched by the coil holding portion 192 from both sides in the axial direction. With the portion of the coil 144 on the radially inner side arranged on the inner side of the coil holding portion 192, the coil 144 is prevented from coming into contact with the first stator claw pole 146 and the second stator claw pole 148. With the portion of the coil 144 on the radially inner side arranged on the inner side of the coil holding portion 192, gaps are formed between the coil 144 and the first and second stator core bases 145 and 147. Thus, the coil 144 is prevented from coming into contact with the first and second stator cores 141 and 142.

The seventh embodiment has the following advantages in addition to the advantages of the fourth embodiment.

(1) The coil 144, arranged between the first stator core 141 and the second stator core 142, comes into contact with the coil holding portion 192 projecting into the void between the stator cores 141 and 152 from the inner side surfaces of the first and second stator cores 141 and 142. Thus, the coil 144 is less likely to come into contact with the inner side surfaces of the first and second stator cores 141 and 142. Thus, the stator insulator 191 can achieve insulation between the coil 144 and the first and second stator cores 141 and 142.

(2) The coil holding portion 192 is formed with the stator insulator 191 as a whole having a large thickness to project into the void between the first and second stator cores 141 and 142. Thus, the shape of the stator insulator 191 would not be complicated by providing the coil holding portion 192.

Eighth Embodiment

An eighth embodiment of a motor is described below. In the eighth embodiment, the configurations that are the same as those in the fourth embodiment are denoted with the same reference numerals, and a detailed description thereof will be omitted.

Figure 32:
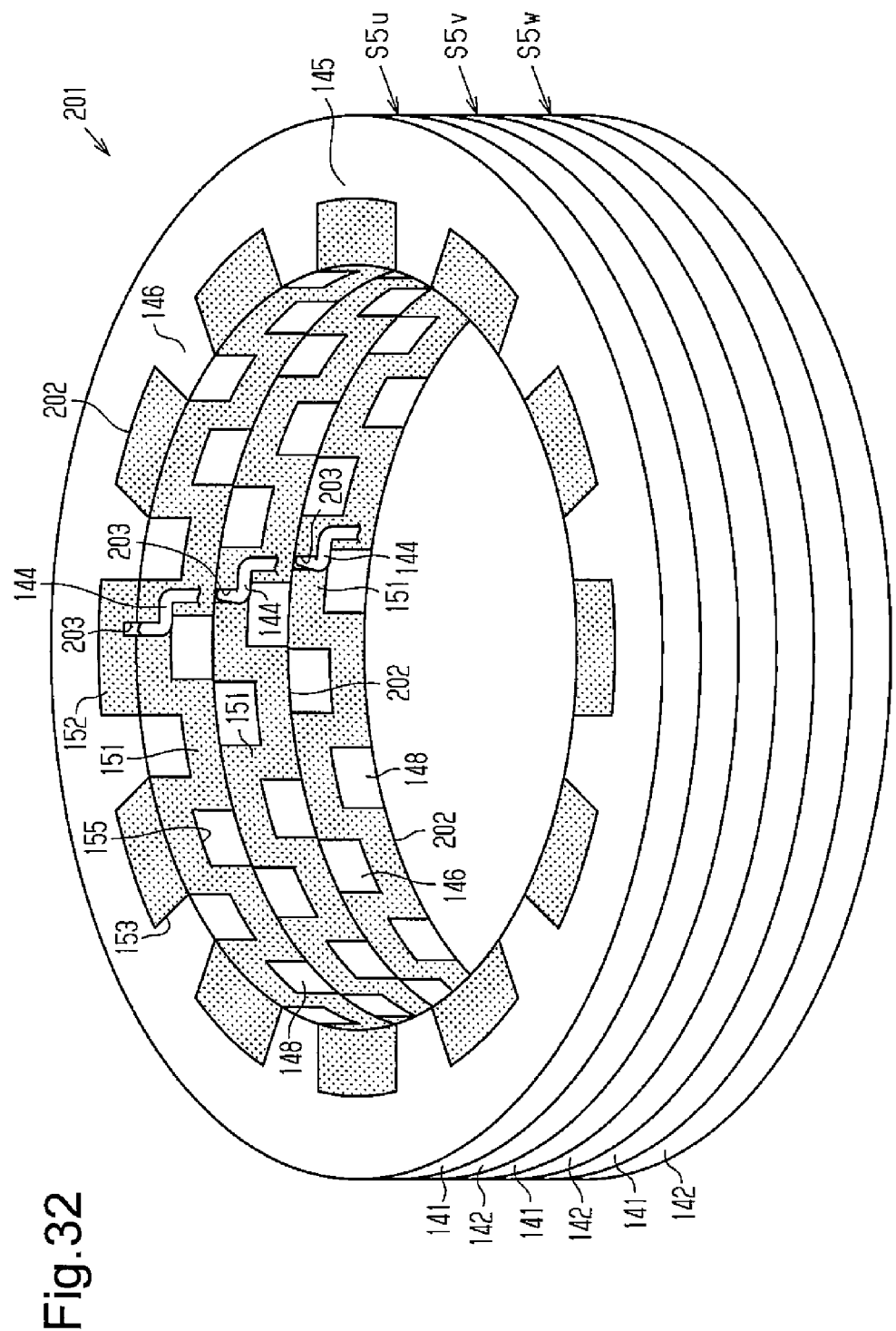
FIG. 32 is a perspective view of a stator in an eighth embodiment.

The motor 111 includes a stator 201 illustrated in FIG. 32 instead of the stator 114 according to the fourth embodiment. Stator sections S5u, S5v, and S5w in the stator 181 each include a stator insulator 202 instead of the stator insulator 143 according to the fourth embodiment. The U-phase stator section S5u, the V-phase stator section S5v, and the W-phase stator section S5w are stacked in this order so that the first stator core bases 145 and the second stator core bases 147 (not illustrated in FIG. 32, refer to FIG. 25) are alternately arranged. The U-phase stator section S5u and the V-phase stator section S5v, adjacent to each other in the axial direction, are stacked while being shifted from each other by an electrical angle of 60° in the circumferential direction. The V-phase stator section S5v and the W-phase stator section S5w, adjacent to each other in the axial direction, are stacked while being shifted from each other by an electrical angle of 60° in the circumferential direction.

The stator insulator 202 has a configuration obtained by adding a coil guide groove 203 to the stator insulator 143 according to the fourth embodiment. The coil guide groove 203 is a groove formed through the stator insulators 202 so that a void between the first and second stator cores 141 and 142 communicates with an outer void of each of the stator sections S5u, S5v, and S5w. In the present embodiment, the coil guide groove 203 is formed to extend from a base end portion of one of the first extending portions 152 (an end portion on the radially inner side) to the annular shape portion 151, in each of the stator insulators 202. The coil guide groove 203 extends in the radial direction in the first extending portion 152, and extends in the axial direction in the annular shape portion 151.

In each of the stator sections S5u, S5v, and S5w including the stator insulator 202 provided with the coil guide groove 203 as described above, an end portion of the coil 144, arranged in the void between the first and second stator cores 141 and 142 can be pulled out of the stator sections S5u, S5v, or S5w, through the coil guide groove 203.

The eighth embodiment has the following advantages in addition to the advantages of the fourth embodiment.

(1) The end portion of the coil 144 can be easily pulled out of the stator 201 through the coil guide groove 203.

(2) The coil guide groove 203 is a groove with a simple shape formed through the stator insulator 202. Thus, the shape of the stator insulator 202 would not be complicated by providing a configuration for pulling the end portion of the coil 144 out of the stator 201.

Ninth Embodiment

A ninth embodiment of a motor is described below. In the ninth embodiment, the configurations that are the same as those in the fourth embodiment are denoted with the same reference numerals, and a detailed description thereof will be omitted.

Figure 33:
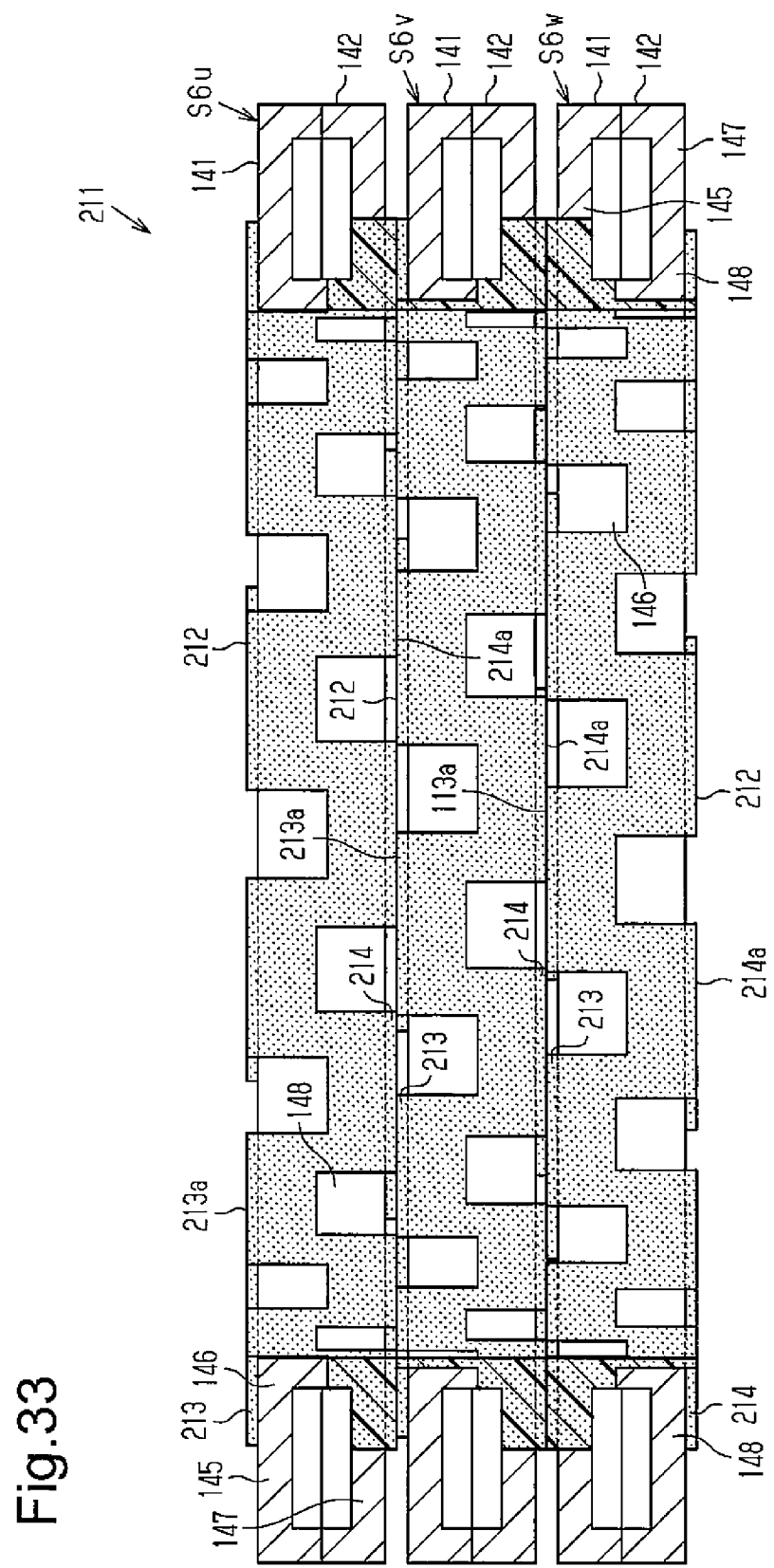
FIG. 33 is a cross-sectional view of a stator in a ninth embodiment.

The motor 111 includes a stator 211 illustrated in FIG. 33, instead of the stator 114 according to the fourth embodiment. Stator sections S6u, S6v, and S6w in the stator 211 each include a stator insulator 212 instead of the stator insulator 143 according to the fourth embodiment. In FIG. 33, the coil 144 is omitted.

The stator insulator 212 has a configuration obtained by adding a first axial projection 213 and a second axial projection 214 to the stator insulator 143 according to the fourth embodiment. More specifically, compared with the stator insulator 143, the stator insulator 212 as a whole has a larger length in the axial direction to project in both sides of the axial direction from the first and second stator cores 141 and 142, which are coupled to each other. A portion of the stator insulator 212 in the stator section S6u projecting toward the outer side of the stator section S6u from the first stator core 141 in the axial direction (portion projecting toward the upper side from the first stator core 141 in FIG. 33) serves as the first axial projection 213. A similar portion of the stator insulator 212 in each of the stator sections S6v and S6w also serves as the first axial projection 213. A portion of the stator insulator 212 in the stator section S6u projecting toward the outer side of the stator section S6u from the second stator core 142 in the axial direction (portion projecting toward the lower side from the second stator core 142 in FIG. 33) serves as the second axial projection 214. A similar portion of the stator insulator 212 in each of the stator sections S6v and S6w also serves as the second axial projection 214.

An end surface of the first axial projection 213 in the axial direction serves as a first contact surface 213a having a planar shape orthogonal to the axial direction and parallel to the first stator core base 145. An end surface of the second axial projection 214 in the axial direction serves as a second contact surface 214a having a planar shape orthogonal to the axial direction and parallel to the second stator core base 147. The first contact surface 213a and the second contact surface 214a are in parallel with each other.

The U-phase stator section S6u, the V-phase stator section S6v, and the W-phase stator section S6w each including the stator insulator 212 described above are stacked in this order so that the first stator core bases 145 and the second stator core bases 147 are alternately arranged in the axial direction. The U-phase stator section S6u and the V-phase stator section S6v, adjacent to each other in the axial direction, are stacked with the second contact surface 214a of the second axial projection 214 of the stator insulator 212 in the U-phase stator section S6u brought in contact with the first contact surface 213a of the first axial projection 213 of the stator insulator 212 in the V-phase stator section S6v. Thus, the first axial projection 213 and the second axial projection 214 arranged between the stator core bases 147 and 145 make the second stator core base 147 in the U-phase stator section S6u and the first stator core base 145 in the V-phase stator section S6v separated from each other in the axial direction. In the same manner, the V-phase stator section S6v and the W-phase stator section S6w, adjacent to each other in the axial direction, are stacked with the second contact surface 214a of the second axial projection 214 of the stator insulator 212 in the V-phase stator section S6v brought in contact with the first contact surface 213a of the first axial projection 213 of the stator insulator 212 in the W-phase stator section S6w. Thus, the first axial projection 213 and the second axial projection 214 arranged between the stator core bases 147 and 145 make the second stator core base 147 in the V-phase stator section S6v and the first stator core base 145 in the W-phase stator section S6w separated from each other in the axial direction.

The U-phase stator section S6u and the V-phase stator section S6v, adjacent to each other in the axial direction, are stacked while being shifted from each other by an electrical angle of 60° in the circumferential direction. The V-phase stator section S6v and the W-phase stator section S6w, adjacent to each other in the axial direction, are stacked while being shifted from each other by an electrical angle of 60° in the circumferential direction.

The ninth embodiment has the following advantages in addition to the advantages of the fourth embodiment.

(1) With the second axial projection 214 of the stator insulator 212 in the U-phase stator section S6u and the first axial projection 213 of the stator insulator 212 in the V-phase stator section S6v, the second stator core 142 of the U-phase stator section S6u and the first stator core 141 of the V-phase stator section S6v, adjacent to each other in the axial direction, can be easily separated from each other in the axial direction. In the same manner, with the second axial projection 214 of the stator insulator 212 in the V-phase stator section S6v and the first axial projection 213 of the stator insulator 212 in the W-phase stator section S6w, the second stator core 142 in the V-phase stator section S6v and the first stator core 141 in the W-phase stator section S6w, adjacent to each other in the axial direction, can be separated from each other in the axial direction. Thus, magnetic interference among the stator sections S6u, S6v, and S6w can be prevented.

(2) The first axial projection 213 and the second axial projection 214 have a simple configuration of projecting further from the first and second stator cores 141 and 142 in the axial direction. Thus, axial separation of the stator cores 141 and 142, which are adjacent to each other in the axial direction, in the stator sections S6u and S6v, which are adjacent to each other in the axial direction, and axial separation of the stator cores 141 and 142, which are adjacent to each other in the axial direction, in the stator sections S6v and S6w, which are adjacent to each other in the axial direction, do not cause the shape of the stator insulator 212 to be complicated.

The fourth to the ninth embodiments may be modified as follows.

In the sixth embodiment, the first engaging portions 183 and the second engaging portions 184 are provided to the stator insulator 182 in the stator 181. Alternatively, the first engaging portions 183 and the second engaging portions 184 may be provided to the rotor insulator 123 in the rotor 113. In such a case, the rotor insulator 123 of the U-phase rotor section Ru and the rotor insulator 123 of the V-phase rotor section Rv adjacent to the U-phase rotor section Ru in the axial direction cause the first engaging portion 183 and the second engaging portion 184 to serve as a recess and a projection engaged with each other in a manner restricting relative movement in the circumferential direction. The rotor insulator 123 of the V-phase rotor section Rv and the rotor insulator 123 of the W-phase rotor section Rw adjacent to the V-phase rotor section Rv in the axial direction cause the first engaging portion 183 and the second engaging portion 184 to serve as a recess and a projection engaged with each other in a manner restricting relative movement. As a result, the rotor insulator 123 including the first engaging portions 183 and the second engaging portions 184 positions the rotor sections Ru and Rv, which are adjacent to each other in the axial direction, and the rotor sections Rv and Rw, which are adjacent to each other in the axial direction, in the rotational direction. Thus, in the rotor 113 including the plurality of rotor sections Ru, Rv, and Rw stacked in the axial direction, the magnetic flux can be prevented from being disturbed that would occur when the rotor sections Ru, Rv, and Rw are displaced in the rotational direction.

In the sixth embodiment, each of the first engaging portions 183 is a recess recessed in one axial end portion of annular shape portion 151, and each of the second engaging portions 184 is a projection projecting from the other axial end portion of the annular shape portion 151. Alternatively, the first engaging portion 183 may have a projecting shape, and the second engaging portion 184 may have a recessed shape. The shapes of the first engaging portion 183 and the second engaging portion 184 are not limited to those in the sixth embodiment, as long as the first engaging portion 183 and the second engaging portion 184 have shapes for engaging with each other so that the stator insulators 182 of the stator sections S3u and S3v, which are adjacent to each other in the axial direction, and the stator insulators 182 of the stator sections S3v and S3w, which are adjacent to each other in the axial direction, are engaged with each other in a manner restricting relative movement in the circumferential direction. For example, the first engaging portion 183 may be a recess having a tubular inner circumference surface and the second engaging portion 184 may be a projection having a cylindrical shape.

In the sixth embodiment, the twelve first engaging portions 183 and the twelve second engaging portions 184 are provided to the stator insulator 182. However, the numbers of the first engaging portions 183 and of the second engaging portions 184 provided to the stator insulator 182 are not limited in such a manner. The stator insulator 182 may include a single first engaging portion 183 and a single second engaging portion 184, or the numbers of the first engaging portions 183 and of the second engaging portions 184 may each be a number other than twelve and be greater than two. The number of first engaging portions 183 having a recessed shape may be smaller than the number of second engaging portions 184 having a projecting shape.

The positions where the first engaging portions 183 and the second engaging portions 184 are formed in the stator insulator 182 are not limited to those in the sixth embodiment. The first engaging portions 183 and the second engaging portions 184 may be formed at positions in the stator insulators 182 of the stator sections S3u and S3v, adjacent to each other in the axial direction, where the engaging portions are engageable, or at positions in the stator insulators 182 of the stator sections S3v and S3w, adjacent to each other in the axial direction, where the engaging portions are engageable. For example, each of the first engaging portions 183 may be formed in a center portion of the corresponding first extending portion 152 in the radial direction, and each of the second engaging portions 184 may be formed in a center portion of the corresponding second extending portion 154 in the radial direction.

In the seventh embodiment, the coil holding portion 192 is formed with the stator insulator 191 as a whole projecting into the void between the first and second stator cores 141 and 142, which are coupled to each other. However, the shape of the coil holding portion 192 is not limited to this. The coil holding portion 192 may have any shape with which the coil 144 can be held between the first and second stator cores 141 and 142, which are coupled to each other, without coming into contact with the first and second stator cores 141 and 142. For example, the stator insulator 191 is formed to be partially thick to project into the void between the first and second stator cores 141 and 142, which are coupled to each other. In the stator insulator 191, portions projecting into the void between the first and second stator cores 141 and 142 from the side surfaces of the first and second stator cores 141 and 142 opposing the void between the first and second stator cores 141 and 142 may serve as the coil holding portion 192.

In the eighth embodiment, only a single coil guide groove 203 is formed in the stator insulator 202. Alternatively, a plurality of coil guide grooves 203 may be formed in the stator insulator 202. The shape of the coil guide groove 203 is not limited to that in the eighth embodiment, and may be of any shape with which the end portion of the coil 144 can be pulled out between the first and second stator cores 141 and 142. For example, the coil guide groove 203 may be formed only in the annular shape portion 151 or may be formed to extend between the annular shape portion 151 and the second extending portions 154.

In the ninth embodiment, the first axial projection 213 and the second axial projection 214 are formed with both ends of the stator insulator 212 in the axial direction as a whole extending in both sides of the axial direction of the first and second stator cores 141 and 142, which are coupled to each other. However, the shapes of the first axial projection 213 and the second axial projection 214 are not limited to those in the ninth embodiment. The first axial projection 213 and the second axial projection 214 can have any shapes as long as the stator sections S6u, S6v, and S6w can be stacked in the axial direction with the first and second stator core bases 145 and 147 stacked in parallel. For example, the first axial projection 213 and the second axial projection 214 may be formed with the stator insulator 212 partially extending in both sides of the axial direction of the first and second stator cores 141 and 142, which are coupled to each other.

In the ninth embodiment, the stator insulator 212 includes the first axial projection 213 and the second axial projection 214. However, the stator insulator 212 does not necessarily include both the first axial projection 213 and the second axial projection 214. For example, the stator insulator 212 may include at least one of the first axial projection 213 and the second axial projection 214. Advantages similar to those of the ninth embodiment can be obtained also with this configuration.

In the ninth embodiment, the first axial projection 213 and the second axial projection 214 are provided to the stator insulator 212 of each of the stator sections S6u, S6v, and S6w. Similar projections may be provided to the rotor insulator 123 of each of the rotor sections Ru, Rv, and Rw. More specifically, the rotor insulator 123 may project toward opposite sides in the axial direction from the first and second rotor cores 121 and 122 stacked in the axial direction. In this configuration, with the rotor insulator 123, the second rotor cores 122, adjacent to each other in the axial direction, in the rotor sections Ru and Rv, which are adjacent to each other in the axial direction, and the first rotor cores 121, which are adjacent to each other in the axial direction, in the rotor sections Rv and Rw, which are adjacent to each other in the axial direction, can be easily separated from each other in the axial direction. Thus, the magnetic interference among the rotor sections Ru, Rv, and Rw can be prevented.

The rotor insulators 123 and 161 may each be formed of a magnet. Thus, the flow of magnetic flux can be controlled with the rotor insulators 123 and 161, and the motor performance can be improved.

In the fourth to the ninth embodiments, the rotor insulators 123 and 161 engage with the twelve first rotor claw poles 126 and the twelve second rotor claw poles 128 in a manner restricting relative movement in the circumferential direction. Alternatively, the rotor insulators 123 and 161 may engage with at least one first rotor claw pole 126 and at least one second rotor claw pole 128 in a manner restricting relative movement in the circumferential direction.

In the fourth to the ninth embodiments, the stator insulators 143, 171, 182, 191, 202, and 212 engage with the twelve first stator claw pole 146 and the twelve second stator claw poles 148 in a manner restricting relative movement in the circumferential direction. Alternatively, the stator insulators 143, 171, 182, 191, 202, and 212 may engage with at least one first stator claw pole 146 and at least one second stator claw pole 148 in a manner restricting relative movement in the circumferential direction.

In the fourth embodiment, the motor 111 includes both the rotor insulator 123 and the stator insulator 143. Alternatively, the motor 111 may include any one of the rotor insulator 123 and the stator insulator 143. The same applies to the fifth to the ninth embodiments.

The first rotor claw pole 126 may not include the first radially extending portion 126a, and may only include the first magnetic pole portion 126b extending in one side of the axial direction from the first rotor core base 125. In the same manner, the second rotor claw pole 128 may not include the second radially extending portion 128a, and may only include the second magnetic pole portion 128b extending in one side of the axial direction from the second rotor core base 127.

The first stator claw pole 146 may not include the first radially extending portion 146a, and may only include the first magnetic pole portion 146b extending in one side of the axial direction from the first stator core base 145. In the same manner, the second stator claw pole 148 may not include the second radially extending portion 148a, and may only include the second magnetic pole portion 148b extending in one side of the axial direction from the second stator core base 147.

The first and second rotor cores 121 and 122 may be formed as a plurality of divided cores coupled in the circumferential direction. The first and second stator cores 141 and 142 may be formed as a plurality of divided cores coupled in the circumferential direction.

The number of the first rotor claw poles 126 in the first rotor core 121 is not limited to twelve, and can be changed. In the same manner, the number of the second rotor claw poles 128 in the second rotor core 122 is not limited to twelve and can be changed. The number of the first stator claw poles 146 in the first stator core 141 is not limited to twelve and can be changed. In the same manner, the number of the second stator claw poles 148 in the second stator core 142 is not limited to twelve and can be changed.

The field magnet 124 is not limited to ferrite magnet, and may be samarium-cobalt (SmCo) magnet, neodymium magnet, or the like.

The rotor 113 according to the fourth embodiment includes the three rotor sections Ru, Rv, and Rw, and the stator 114 includes the three stator sections Su, Sv, and Sw. The number of rotor sections in the rotor 113 is not limited to three and may be any number that is equal to or larger than one. The number of stator sections in the stator 114 is not limited to three and may be any number that is equal to or larger than one. The same applies to the fifth, the seventh, and the eighth embodiments. In the sixth and the ninth embodiments, any configuration may be employed in which the rotor 113 includes a plurality of rotor sections and the stator includes a plurality of stator sections.

In the fourth embodiment, the motor 111 is a motor of an inner rotor type in which the rotor 113 is arranged on the inner side of the stator 114. Alternatively, the fourth embodiment may be applied to a motor of an outer rotor type in which the rotor is arranged on the outer circumference of the stator, the same applies to the fifth to the ninth embodiments.

Next, technical concepts that can be recognized from the fourth to the ninth embodiments and modified examples of the fourth to the ninth embodiments are described below.

(A) A motor in which
the rotor is configured by stacking in the axial direction a plurality of rotor sections, each including the first rotor core, the second rotor core, the permanent magnet, and the rotor insulator, and
the rotor insulator of each of the rotor sections projects toward opposite sides in the axial direction from the first and second rotor cores.

In this configuration, with the rotor insulator, the rotor cores in adjacent ones of the rotor sections in the axial direction can be separated from each other in the axial direction. Thus, magnetic interference among the rotor sections can be prevented.

(B) The motor in which the rotor insulator includes a magnet.

In this configuration, the flow of magnetic flux can be controlled with the rotor insulator, whereby the motor performance can be improved.

Tenth Embodiment

A motor according to a tenth embodiment applied to a blower (blower device) will be described below.

Figure 34:
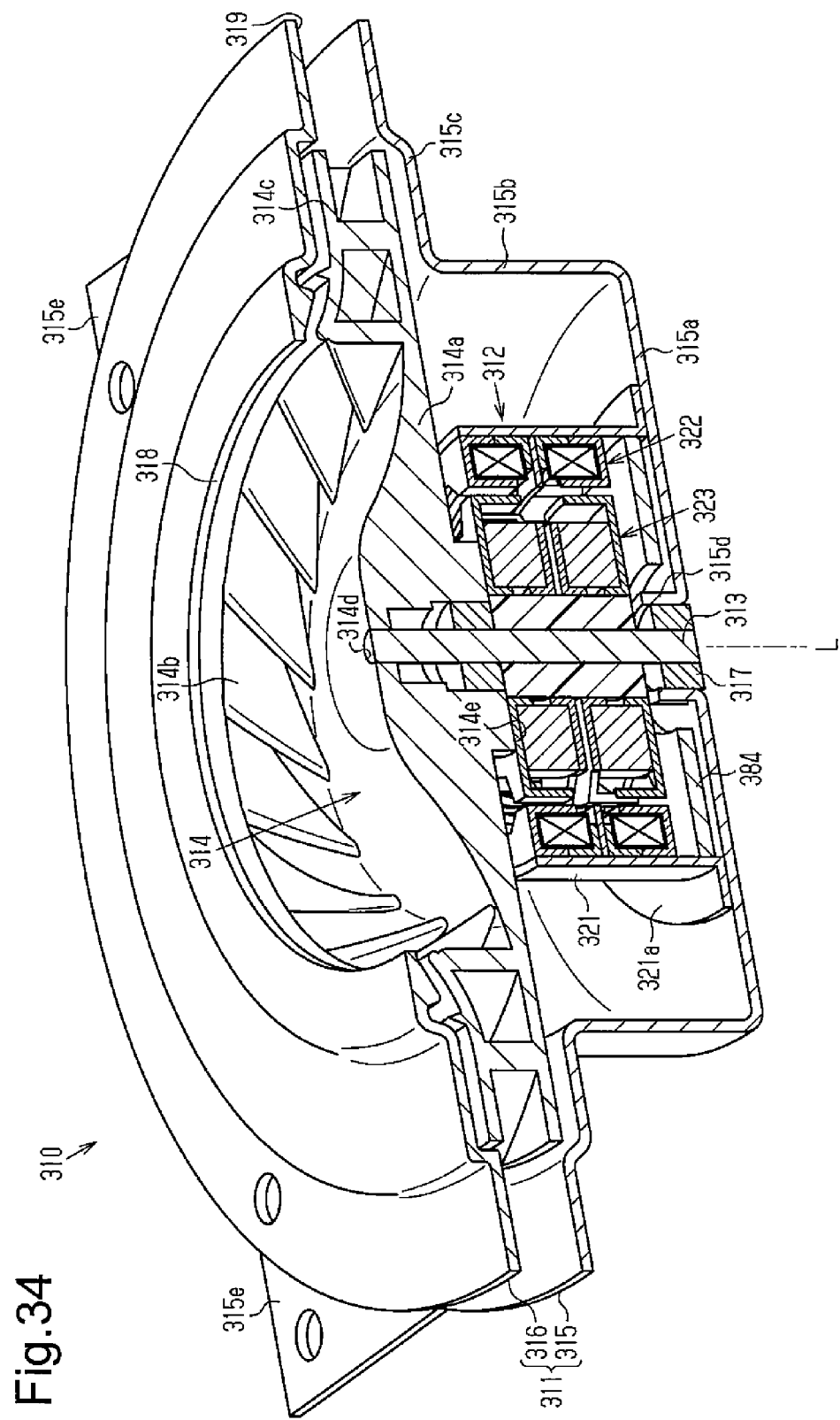
FIG. 34 is a perspective cross-sectional view of a blower in a tenth embodiment.

As illustrated in FIG. 34, a blower 310 according to the present embodiment is used as a blower for a vehicle, for example. The blower 310 includes a housing 311, a brushless motor 312 (hereinafter, simply referred to as a motor 312) accommodated in the housing 311, and a fan 314 that is rotatable integrally with a rotation shaft 313 of the motor 312 in the housing 311.

The housing 311 includes a housing main body 315, having a bottomed cylinder shape in which the motor 312 is accommodated, and a top plate portion 316, supported by the housing main body 315. The housing main body 315 includes a bottom portion 315a having a circular shape as viewed in an axial direction of the rotation shaft 313, an outer circumference wall portion 315b having a cylindrical shape extending in the axial direction from an outer circumference edge of the bottom portion 315a, and a flange portion 315c extending in the radial direction from an end portion of the outer circumference wall portion 315b on an side opposite to the bottom portion 315a. A bearing accommodating portion 315d having a cylindrical shape extending in the axial direction is formed in a center portion of the bottom portion 315a. A bearing 317 that axially supports the rotation shaft 313 is fixed in the bearing accommodating portion 315d.

The top plate portion 316 has an annular plate shape. The top plate portion 316 is arranged to oppose the flange portion 315c of the housing main body 315 in the axial direction, with a predetermined distance provided in between, and is fixed to the flange portion 315c with a screw (not illustrated) and the like for example. An outer edge portion of the fan 314 is arranged between the top plate portion 316 and the flange portion 315c. A fixing portion 315e for a position where the blower 310 is arranged is formed in the flange portion 315c while extending outward in the radial direction.

The fan 314 includes a base 314a having a disk shape with a larger diameter than the outer circumference wall portion 315b of the housing main body 315, a plurality of vanes 314b arranged on the upper surface of the base 314a (a surface of the base 314a on a side opposite to the motor) close to the outer circumference edge, and a upper wall portion 314c that is integrally formed with the vanes 314b and oppose the top plate portion 316 in the axial direction.

The fan 314 can integrally rotate with the rotation shaft 313 of the motor 312. More specifically, the rotation shaft 313 is inserted in the center portion of the base 314a, and has a distal end portion fit and fixed in a fixing hole 314d formed in the center portion of the base 314a. The upper surface of the base 314a has a tapered shape having the center portion projecting in the side opposite to the motor in the axial direction. The fixing surface 314e formed in the axial direction end surface of the base 314a opposing the motor 312, is fixed to a later described rotor 323 of the motor 312 with an adhesive or the like, for example. The fixing surface 314e forms a plane extending in a direction orthogonal to the axial direction.

Each of the vanes 314b of the fan 314 has a bottom end integrally connected to the upper surface of the base 314a and has an upper end integrally connected to a lower surface of the upper wall portion 314c. The inner circumferential edge portion of the upper wall portion 314c is curved to be separated from the base 314a. The vanes 314b each have a shape with which air can be blown outward in the radial direction based on the rotation of the fan 314.

In the blower 310 having the configuration described above, a circular opening formed through the center of the top plate portion 316 serves as an intake port 318. An opening (gap) between an outer edge of the top plate portion 316 and an outer edge of the flange portion 315c serves as a blowing port 319. Thus, when the fan 314 rotates together with the rotation shaft 313, air is drawn in through the intake port 318 by the operation of the vanes 314b, moved between the base 314a and the upper wall portion 314c, and blown outward in the radial direction through the blowing port 319.

[Configuration of Motor]

Figure 35:
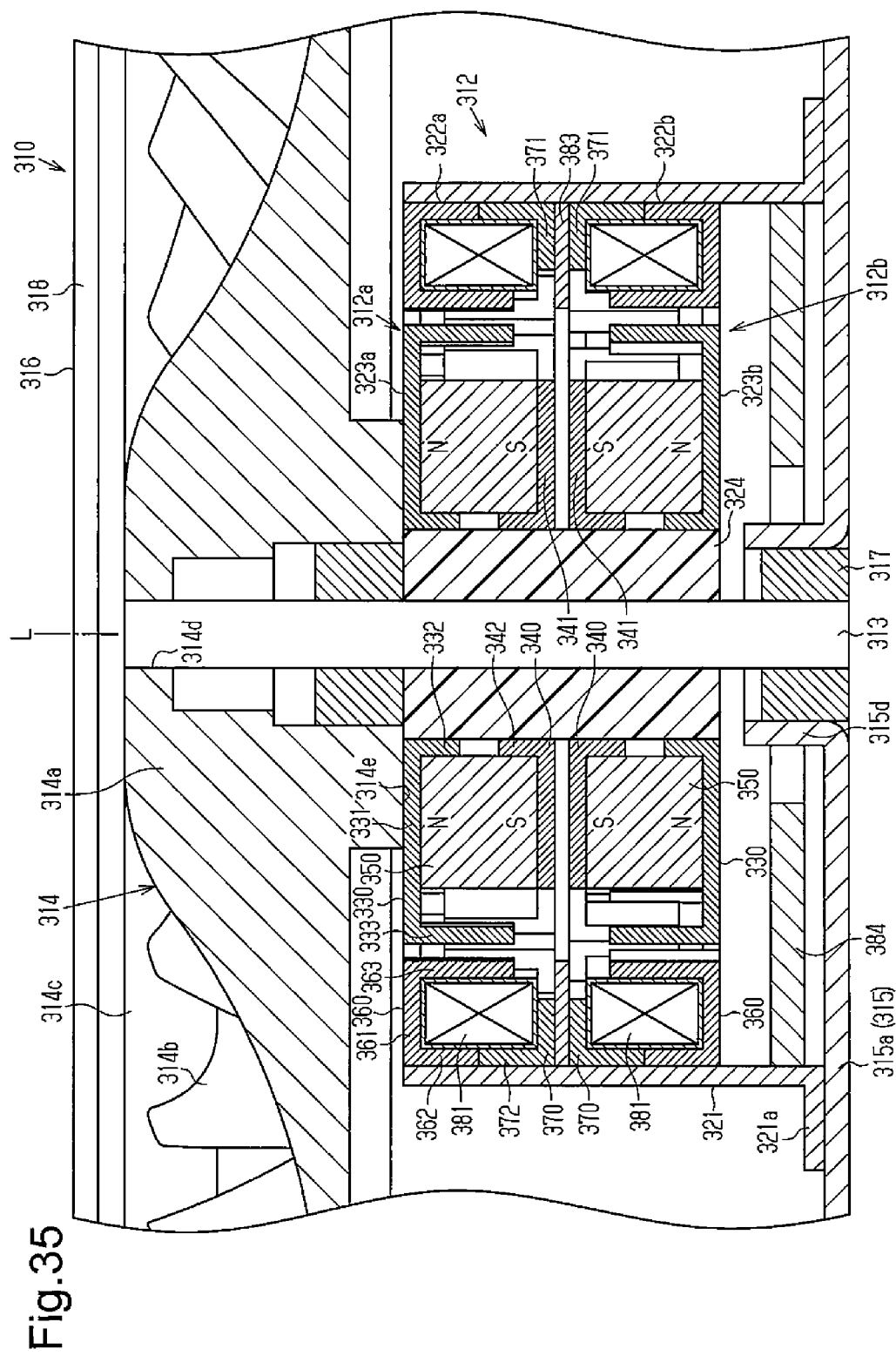
FIG. 35 is a partial, cross-sectional view of the blower shown in FIG. 34.

As illustrated in FIG. 34 and FIG. 35, the motor 312 includes a yoke housing (motor housing) 321 (hereinafter, simply referred to as a yoke 321) that has a cylindrical shape and is supported by the housing 311, a stator 322 fixed to an inner circumference surface of the yoke 321, and the rotor 323 that is arranged on an inner circumferential side of the stator 322 and has the rotation shaft 313. The yoke 321 has a cylindrical shape with a smaller diameter than the outer circumference wall portion 315b, and is arranged on the inner circumferential side of the outer circumference wall portion 315b. The yoke 321 has a flange portion 321a arranged at one axial end (a lower end in FIG. 34 and FIG. 35) and fixed to the bottom portion 315a of the housing main body 315.

Next, a configuration of the motor 312 will be described in detail. As illustrated in FIG. 35, the motor 312 includes an A-phase motor unit 312a and a B-phase motor unit 312b arranged in this order in the axial direction from the fan 314 (output side). The A-phase motor unit 312a and the B-phase motor unit 312b have the same configuration, and form the so-called multi-Lundell motor. Thus, the motor 312 is a two-phase multi-Lundell motor including the A-phase motor unit 312a and the B-phase motor unit 312b.

The A-phase motor unit 312a includes an A-phase rotor section 323a, which is integrally rotatable with the rotation shaft 313, and an A-phase stator section 322a, which is fixed to the inner circumference surface of the yoke 321 at a position on the outer circumferential side of the A-phase rotor section 323a. In the same manner, the B-phase motor unit 312b includes a B-phase rotor section 323b, which is integrally rotatable with the rotation shaft 313, and a B-phase stator section 322b, which is fixed to the inner circumference surface of the yoke 321 at a position on the outer circumferential side of the B-phase rotor section 323b.

[Configuration of Rotor]

The rotor 323 of the motor 312 includes the rotation shaft 313, a cylindrical sleeve 324 formed from resin and fit to the outer side of the rotation shaft 313, and the A-phase rotor section 323a and the B-phase rotor section 323b fixed to the outer circumference surface of the sleeve 324. The A-phase rotor section 323a and the B-phase rotor section 323b both have the Lundell structure and have the same configuration and the same shape. The A-phase rotor section 323a and the B-phase rotor section 323b each have an annular shape as a whole and are fit and fixed on the outer side of the sleeve 324 to be arranged in the axial direction of the rotation shaft 313.

Figure 36:
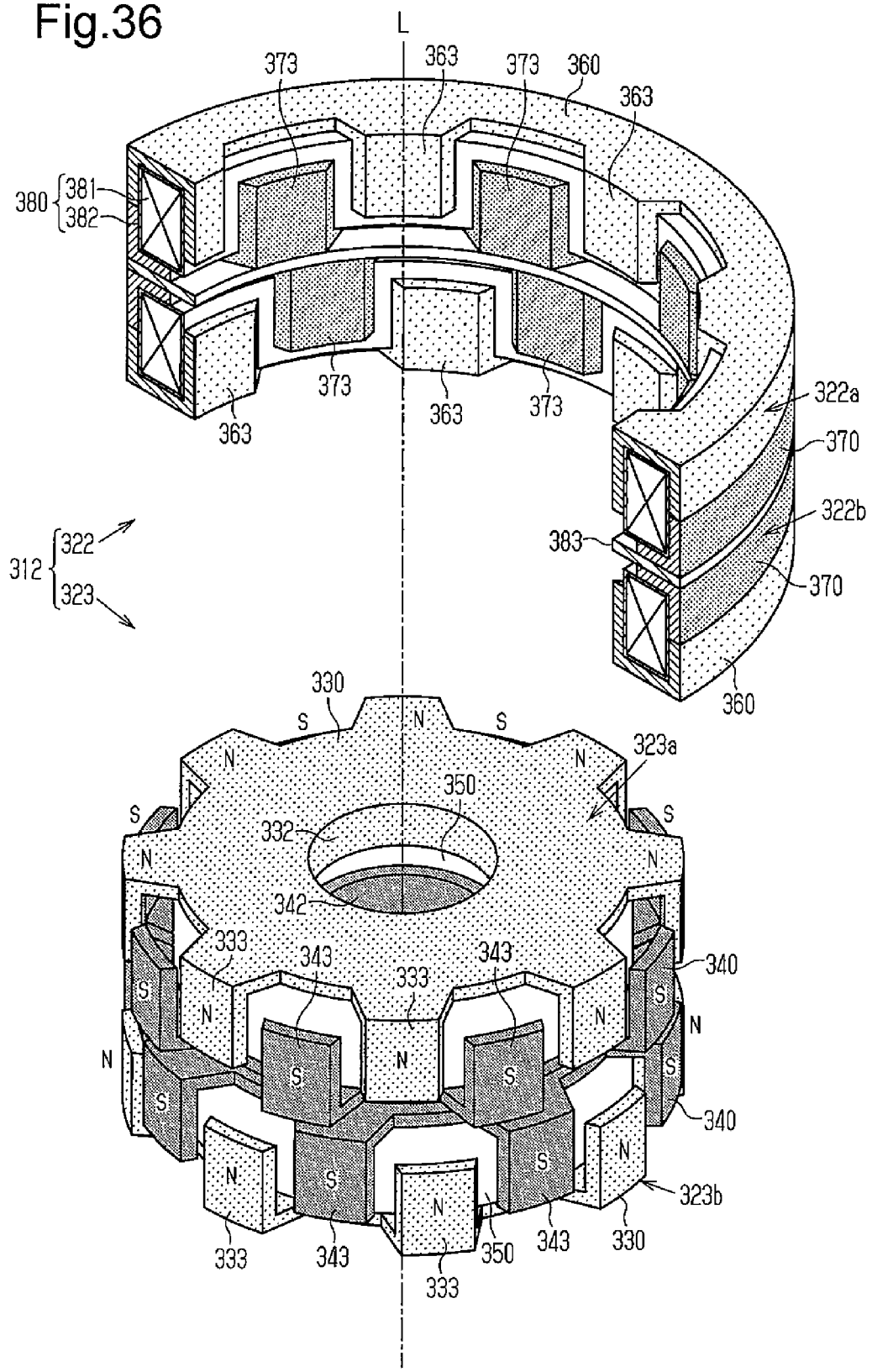
FIG. 36 is an exploded perspective view of a motor in which a stator shown in FIG. 34 is partially cut out.
Figure 37:
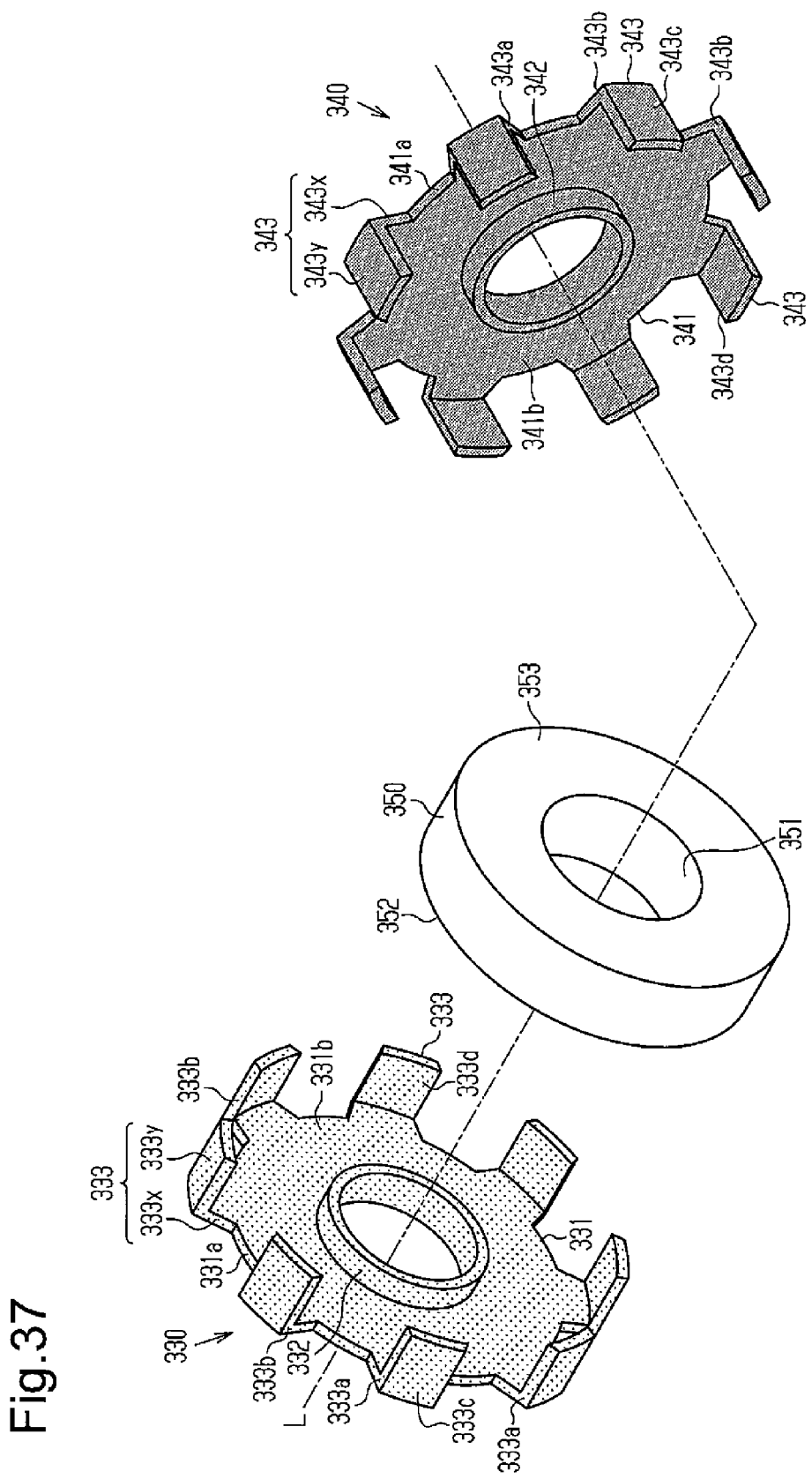
FIG. 37 is an exploded perspective view of a rotor section of a single motor unit (A-phase motor unit and B-phase motor unit) shown in FIG. 34.

As illustrated in FIG. 36 and FIG. 37, the A-phase rotor section 323a and the B-phase rotor section 323b each include a first rotor core 330, a second rotor core 340, and an annular magnet (permanent magnet) 350.

[First Rotor Core]

As illustrated in FIG. 37, the first rotor core 330 has a first rotor core base 331 formed by a magnetic steel sheet having an annular plate shape. An inner circumference wall portion 332, having a cylindrical shape in which the inner circumference wall portion 332 is inserted, is formed at the center position of the first rotor core base 331. The inner circumference wall portion 332 extends inward in the axial direction (toward the second rotor core 340) from an inner side surface of the first rotor core base 331. The inner circumference surface of the inner circumference wall portion 332 is fixed to the outer circumference surface of the sleeve 324.

Thus, the first rotor core base 331 is fixed to the rotation shaft 313 with the sleeve 324 in between.

Eight first rotor claw poles 333, having the same shape, are formed in the outer circumference surface of the first rotor core base 331 at equal intervals (45-degree interval) in the circumferential direction. Each of the first rotor claw poles 333 extends outward in the radial direction from the first rotor core base 331, and has a distal end formed by bending to extend in the axial direction toward the second rotor core 340.

Here, a portion of the first rotor claw pole 333 projecting outward in the radial direction from the outer circumference surface 331a of the first rotor core base 331 is referred to as a first rotor side basal portion 333x, and the distal end portion extending in the axial direction due to the bending is referred to as a first rotor side magnetic pole portion 333y. The first rotor side basal portion 333x has a trapezoidal shape to have a smaller width toward the radially outer side, as viewed in the axial direction. The first rotor side magnetic pole portion 333y has a rectangular shape as viewed in the radial direction. Circumferential direction end surfaces 333a and 333b of the first rotor claw pole 333, including the first rotor side basal portion 333x and the first rotor side magnetic pole portion 333y, are each a flat surface.

The first rotor side magnetic pole portion 333y formed by bending to extend in the axial direction has a sector cross-sectional shape in the direction orthogonal to the axial direction. Surfaces 333c and 333d of the first rotor side magnetic pole portion 333y respectively on the outer side and the radially inner side are each an arcuate surface concentric to the outer circumference surface 331a of the first rotor core base 331 and extend about the axis L of the rotation shaft 313, as viewed in the axial direction.

An angle of the first rotor side basal portion 333x of each of the first rotor claw poles 333 in the circumferential direction, that is, an angle between the axis L of the rotation shaft 313 and a portion between base end portions of the circumferential direction end surfaces 333a and 333b of the first rotor claw pole 333 is set to be smaller than an angle of a gap between adjacent ones of the first rotor claw poles 333.

[Second Rotor Core]

As illustrated in FIG. 37, the second rotor core 340 is made of the same material and has the same shape as the first rotor core 330, and includes a second rotor core base 341 having an annular plate shape. An inner circumference wall portion 342 having a cylindrical shape in which the rotation shaft 313 is inserted is formed at a center position of the second rotor core base 341. The inner circumference wall portion 342 extends inward in the axial direction (toward the first rotor core 330) from the inner side surface of the second rotor core base 341. The inner circumference wall portion 342 has an inner circumference surface fixed to the outer circumference surface of the sleeve 324. Thus, the second rotor core base 341 is fixed to the rotation shaft 313 with the sleeve 324 in between. Inner circumference wall portions 332 and 342 of the first and second rotor cores bases 331 and 341 oppose each other in the axial direction with a gap in between.

Eight second rotor claw poles 343, having the same shape, are formed in the outer circumference surface of the second rotor core base 341 at equal intervals (45-degree interval) in the circumferential direction. Each of the second rotor claw poles 343 extends outward in the radial direction from the second rotor core base 341, and has a distal end formed by bending to extend in the axial direction toward the first rotor core 330.

Here, a portion of the second rotor claw pole 343 projecting outward in the radial direction from the outer circumference surface of 341a of the second rotor core base 341 is referred to as a second rotor side basal portion 343x, and the distal end portion extending in the axial direction due to the bending is referred to as a second rotor side magnetic pole portion 343y. The second rotor side basal portion 343x has a trapezoidal shape to have a smaller width toward the radially outer side, as viewed in the axial direction. The second rotor side magnetic pole portion 343y has a rectangular shape as viewed in the radial direction. Circumferential direction end surfaces 343a and 343b of the second rotor claw pole 343, including the second rotor side basal portion 343x and the second rotor side magnetic pole portion 343y, are each a flat surface.

The second rotor side magnetic pole portion 343y formed by bending to extend in the axial direction has a sector cross-sectional shape in the direction orthogonal to the axial direction. Surfaces 343c and 343d of the second rotor side magnetic pole portion 343y respectively on the outer side and the radially inner side are each an arcuate surface concentric to the outer circumference surface 341a of the second rotor core base 341 and extend about the axis L, as viewed in the axial direction.

An angle of the second rotor side basal portion 343x of each of the second rotor claw poles 343 in the circumferential direction, that is, an angle between the axis L of the rotation shaft 313 and a portion between base end portions of the circumferential direction end surfaces 343a and 343b is set to be smaller than an angle of a gap between adjacent ones of the second rotor claw poles 343.

The second rotor core 340 is arranged and fixed with respect to the first rotor core 330 so that the second rotor claw poles 343 of the second rotor core 340 are each arranged between corresponding adjacent ones of the first rotor claw poles 333 of the first rotor core 330 as viewed in the axial direction. The second rotor core 340 is coupled to the first rotor core 330 so that the annular magnet 350 is arranged between the first rotor core base 331 and the second rotor core base 341 in the axial direction.

[Annular Magnet]

In the present embodiment, the annular magnet 350 is a permanent magnet having an annular plate shape formed of a ferrite sintered magnet for example. As illustrated in FIG. 37, a through hole 351 in which the rotation shaft 313 is inserted is formed at the center position of the annular magnet 350. One axial side surface 352 and the other axial side surface 353 of the annular magnet 350 respectively come into contact with an opposing surface 331b (a surface on the inner side in the axial direction) of the first rotor core base 331 and an opposing surface 341b (a surface on the inner side in the axial direction) of the second rotor core base 341, and the annular magnet 350 is clamped and fixed between the first rotor core base 331 and the second rotor core base 341. The annular magnet 350 is arranged on the outer circumferential sides of the inner circumference wall portions 332 and 342 of the first and second rotor cores bases 331 and 341. The annular magnet 350 is set to have an outer diameter that is the same as an outer diameter of each of the first and second rotor cores bases 331 and 341, and to have a predetermined thickness.

The annular magnet 350 is magnetized so that a portion closer to the first rotor core base 331 serves as the N pole and a portion closer to the second rotor core base 341 serves as the S pole (see FIG. 35). Thus, with the annular magnet 350, the first rotor claw poles 333 of the first rotor core 330 function as the N poles and the second rotor claw poles 343 of the second rotor core 340 function as the S poles, as illustrated in FIG. 36.

The A-phase rotor section 323a and the B-phase rotor section 323b, each including the first and second rotor cores 330 and 340 and the annular magnet 350, are each formed to have the so-called Lundell structure using the annular magnet 350. The A-phase rotor section 323a and the B-phase rotor section 323b have the first rotor claw poles 333, serving as the N poles, and the second rotor claw poles 343, serving as the S poles, alternately arranged in the circumferential direction, and the number of poles thereof is sixteen (the number of pair of poles is eight).

As illustrated in FIG. 35, the A-phase rotor section 323a and the B-phase rotor section 323b are arranged in the axial direction on the sleeve 324 to form the two-phase Lundell rotor 323. Here, the A-phase rotor section 323a and the B-phase rotor section 323b are fixed to the sleeve 324 while being arranged in the axial direction as follows.

The A-phase rotor section 323a and the B-phase rotor section 323b are arranged to oppose each other with the second rotor cores 340 (the second rotor core bases 341) thereof opposing each other with a gap in between (or in contact with each other) in the axial direction.

As illustrated in FIG. 36, an angle of arrangement of the B-phase rotor section 323b with respect to the A-phase rotor section 323a is set so that shifting in the counterclockwise direction by a predetermined angle is achieved as viewed from the A-phase motor unit 312a. More specifically, the magnetic poles (the first and second rotor claw poles 333 and 343) of the B-phase rotor section 323b are shifted in the counterclockwise direction by the predetermined angle with respect to the magnetic poles (the first and second rotor claw poles 333 and 343) of the A-phase rotor section 323a.

[Configuration of Stator]

As illustrated in FIG. 35, the stator 322 of the motor 312 has a two-phase structure in which the A-phase stator section 322a and the B-phase stator section 322b, each having the Lundell structure, are arranged in the axial direction. The A-phase stator section 322a and the B-phase stator section 322b have the same configuration and the same shape. The A-phase stator section 322a and the B-phase stator section 322b have an annular shape as a whole, and are fixed to the inner circumference surface of the yoke 321 to be arranged in the axial direction of the rotation shaft 313. The A-phase stator section 322a and the B-phase stator section 322b respectively oppose the A-phase rotor section 323a and the B-phase rotor section 323b on the radially inner side.

Figure 38:
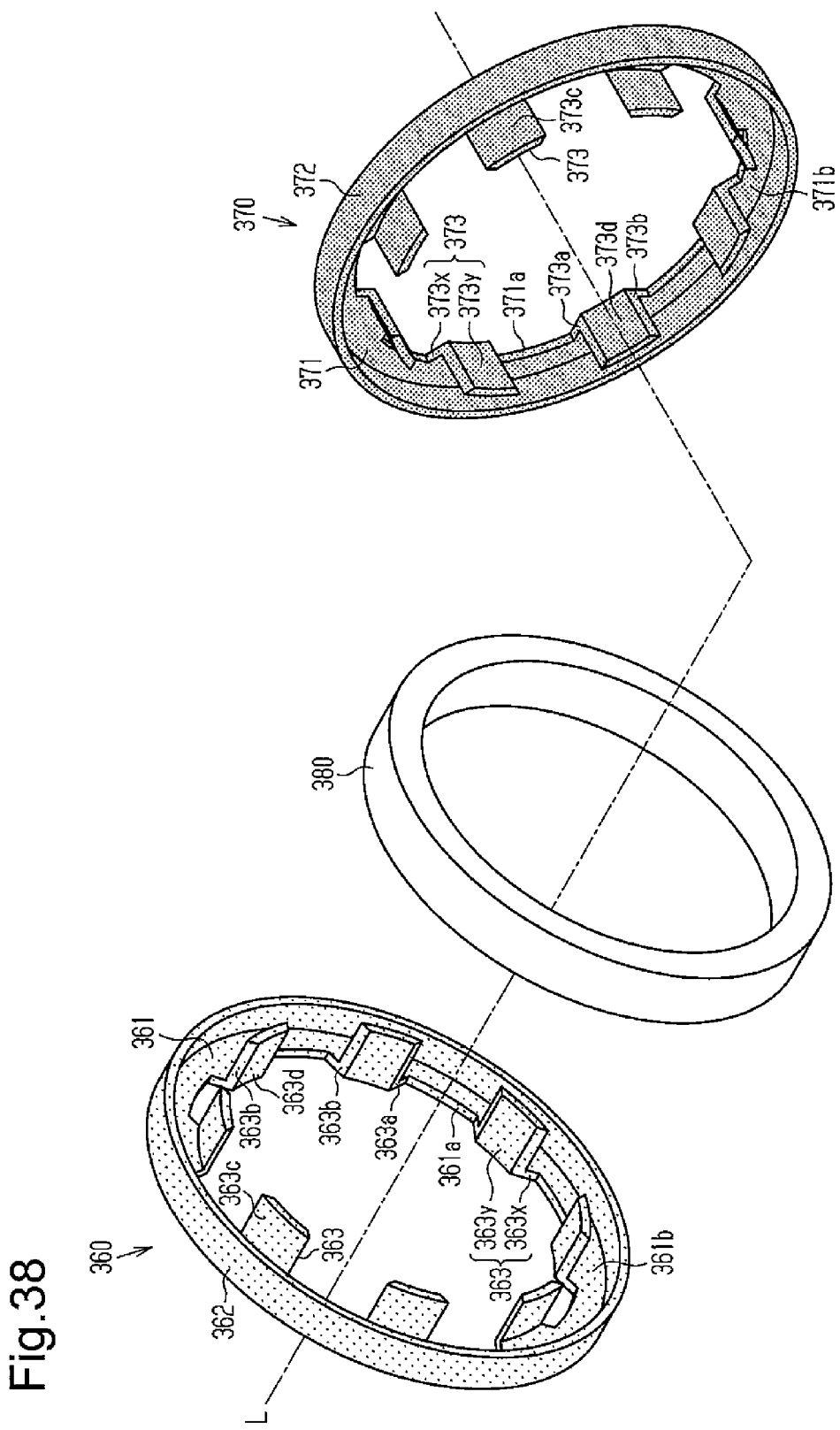
FIG. 38 is an exploded perspective view of a stator section of the single motor unit (A-phase motor unit and B-phase motor unit) shown in FIG. 34.

As illustrated in FIG. 36 and FIG. 38, the A-phase stator section 322a and the B-phase stator section 322b each include a first stator core 360, a second stator core 370, and a coil portion 380.

[First Stator Core]

As illustrated in FIG. 38, the first stator core 360 has a first stator core base 361 formed by a magnetic steel sheet having an annular plate shape. A first stator side cylindrical outer wall 362 having a cylindrical shape is formed at an outer circumference edge of the first stator core base 361. The first stator side cylindrical outer wall 362 extends inward from the opposing surface 361b of the first stator core base 361 opposing the second stator core 370 in the axial direction (toward the second stator core 370).

Eight first stator claw poles 363, having the same shape, are formed in the inner circumference surface 361a of the first stator core base 361 at an equal interval (45-degree interval) in the circumferential direction. Each of the first stator claw poles 363 extends inward in the radial direction from the first stator core base 361 and has a distal end formed by bending to extend in the axial direction toward the second stator core 370.

Here, a portion of the first stator claw pole 363 projecting inward in the radial direction from the inner circumference surface of 361a of the first stator core base 361 is referred to as a first stator side basal portion 363x, and the distal end portion extending in the axial direction due to the bending is referred to as a first stator side magnetic pole portion 363y. The first stator side basal portion 363x has a trapezoidal shape to have a smaller width toward the radially outer side, as viewed in the axial direction. The first stator side magnetic pole portion 363y has a rectangular shape as viewed in the radial direction. Circumferential direction end surfaces 363a and 363b of the first stator claw pole 363, including the first stator side basal portion 363x and the first stator side magnetic pole portion 363y, are each a flat surface.

The first stator side magnetic pole portion 363y formed by bending to extend in the axial direction has a sector cross-sectional shape in the direction orthogonal to the axial direction. Surfaces 363c and 363d of the first stator side magnetic pole portion 363y respectively on the outer side and the radially inner side are each an arcuate surface concentric to the inner circumference surface of 361a of the first stator core base 361 and extend about the axis L, as viewed in the axial direction.

An angle of the first stator side basal portion 363x of each of the first stator claw poles 363 in the circumferential direction, that is, an angle between the axis L of the rotation shaft 313 and a portion between a portions between base end portions of the circumferential direction end surfaces 363a and 363b is set to be smaller than an angle of a gap between adjacent ones of the first stator claw poles 363.

[Second Stator Core]

As illustrated in FIG. 38, the second stator core 370 is made of the same material and has the same shape as the first stator core 360, and includes a second stator core base 371 formed to have an annular plate shape. A second stator side cylindrical outer wall 372 having a cylindrical shape is formed at an outer circumference edge of the second stator core base 371. The second stator side cylindrical outer wall 372 extends inward in the axial direction (toward the second stator core 370) from the opposing surface 371b of the second stator core base 371 opposing the first stator core 360. The second stator side cylindrical outer wall 372 comes into contact with the first stator side cylindrical outer wall 362 in the axial direction.

Eight second stator claw poles 373, having the same shape, are formed in the inner circumference surface 371a of the second stator core base 371 at an equal interval (45-degree interval) in the circumferential direction. Each of the second stator claw poles 373 extends inward in the radial direction from the second stator core base 371, and has a distal end formed by bending to extend in the axial direction toward the first stator core 360.

Here, a portion of the second stator claw pole 373 projecting inward in the radial direction from the inner circumference surface of 371a of the second stator core base 371 is referred to as a second stator side basal portion 373x, and the distal end portion extending in the axial direction due to the bending is referred to as a second stator side magnetic pole portion 373y. The second stator side basal portion 373x has a trapezoidal shape to have a smaller width toward the radially outer side, as viewed in the axial direction. The second stator side magnetic pole portion 373y has a rectangular shape as viewed in the radial direction. Circumferential direction end surfaces 373a and 373b of the second stator claw pole 373, including the second stator side basal portion 373x and the second stator side magnetic pole portion 373y, are each a flat surface.

The second stator side magnetic pole portion 373y formed by bending to extend in the axial direction has a sector cross-sectional shape in the direction orthogonal to the axial direction. Surfaces 373c and 373d of the second stator side magnetic pole portion 373y respectively on the outer side and the radially inner side are each an arcuate surface concentric to the inner circumference surface of 371a of the second stator core base 371 and extend about the axis L as viewed in the axial direction.

An angle of the second stator side basal portion 373x of the each of the second stator claw poles 373 in the circumferential direction, that is, an angle between the axis L of the rotation shaft 313 and a portion between base end portions of the circumferential direction end surfaces 373a and 373b is set to be smaller than an angle of a gap between adjacent ones of the second stator claw poles 373.

The second stator core 370 thus formed has the same shape as the first stator core 360. The first stator side cylindrical outer wall 362 formed on the first stator core base 361 are brought in contact with the second stator side cylindrical outer wall 372 formed on the second stator core base 371. Here, the second stator core 370 has the second stator side cylindrical outer wall 372 brought into contact with the first stator side cylindrical outer wall 362, so that each of the second stator claw poles 373 is positioned between adjacent ones of the first stator claw poles 363 as viewed in the axial direction.

In this state, an annular void having a rectangular cross-sectional shape, defined by the opposing surfaces 361b and 371b of the first and second stator core bases 361 and 371 and the inner circumference surfaces of the first and second stator side cylindrical outer walls 362 and 372 is formed. The coil portion 380 is arranged and fixed in the annular void having a rectangular cross-sectional shape.

[Coil Portion]

As illustrated in FIG. 36, the coil portion 380 includes an annular shaped coil 381 having its circumference covered with a coil insulating layer 382 formed by resin molding.

As illustrated in FIG. 38, an outer side surface of the coil portion 380 in the axial direction close to the first stator core 360 is in contact with the opposing surface 361b of the first stator core base 361 and the inner side surface of each of the first stator side basal portions 363x (first stator claw poles 363) in the axial direction. An outer side surface of the coil portion 380 in the axial direction close to the second stator core 370 is in contact with the opposing surface 371b of the second stator core base 371 and the inner side surface of each of the second stator side basal portions 373x (second stator claw poles 373) in the axial direction. The coil portion 380 is set to have a predetermined thickness corresponding to the axial lengths of the first and second stator claw poles 363 and 373. The axial lengths of the first and second stator claw poles 363 and 373 match axial lengths of the first and second rotor claw poles 333 and 343.

In FIG. 38, a lead terminal of the annular shaped coil 381 is omitted in the drawing for the sake of description. Thus, a notch or a groove, to be formed on the cylindrical outer walls 362 and 372 of the first and second stator cores 360 and 370 and the yoke 321 for guiding the lead terminal to the outside, are omitted in the figure.

The A-phase stator section 322a and the B-phase stator section 322b, including the first and second stator cores 360 and 370 and the coil portion 380, each have the so-called Lundell structure. More specifically, the A-phase stator section 322a and the B-phase stator section 322b serve as a stator having a 16-pole Lundell structure in which the annular shaped coil 381, between the first and second stator cores 360 and 370, magnetized the first and second stator cores 360 and 370 to different magnetic poles.

As illustrated in FIG. 35 and FIG. 36, the A-phase stator section 322a and the B-phase stator section 322b are stacked in the axial direction with a spacer 383 in between, to form a two-layer two-phase Lundell stator 322. The A-phase stator section 322a and the B-phase stator section 322b are fixed to the inner circumference surface of the yoke 321 while being stacked as follows.

The A-phase stator section 322a and the B-phase stator section 322b are stacked with their second stator cores 370 (the second stator core bases 371) opposing each other in the axial direction with the spacer 383 having an annular plate shape in between.

As illustrated in FIG. 36, an angle of arrangement of the B-phase stator section 322b with respect to the A-phase stator section 322a is set so that shifting in the clockwise direction by a predetermined angle is achieved as viewed from the A-phase motor unit 312a in the axial direction. More specifically, the magnetic poles (the first stator claw poles 363 and 373) of the B-phase stator section 322b, opposing the A-phase stator section 322a in the axial direction, are shifted in the clockwise direction by the predetermined angle with respect to the magnetic poles (the first and second stator claw poles 363 and 373) of the A-phase stator section 322a.

As illustrated in FIG. 34 and FIG. 35, a control circuit board 384, supported by the bottom portion 315a of the housing main body 315 is arranged in a void at the inner side of the yoke 321 and between the B-phase motor unit 312b and the bottom portion 315a in the axial direction. The control circuit board 384 extends in a direction orthogonal to the axial direction. The lead terminal of the annular shaped coil 381 of each of the A-phase stator section 322a and the B-phase stator section 322b leads to the bottom portion 315a from the stator 322 to be connected to the control circuit board 384. The annular shaped coil 381 of the A-phase stator section 322a is supplied with A-phase AC voltage through the lead terminal from an A-phase driving circuit (not illustrated) mounted to the control circuit board 384. The control circuit board 384 of the B-phase stator section 322b is supplied with B-phase AC voltage through the lead terminal from a B-phase driving circuit (not illustrated) mounted to the control circuit board 384.

Next, the operation of the tenth embodiment will be described.

When the annular shaped coil 381 of the A-phase stator section 322a is supplied with the A-phase AC voltage and the annular shaped coil 381 of the B-phase stator section 322b is supplied with the B-phase AC voltage with a predetermined phase difference from the A-phase AC voltage, a rotating magnetic field is generated in the stator 322, and the rotor 323 including the rotation shaft 313 is rotated. When the fan 314 is rotated by the rotation of the rotation shaft 313, air is drawn in through the intake port at the center of the top plate portion 316 and blown in the radial direction of the rotation shaft 313 through the blowing port 319 between the outer edges of the top plate portion 316 and the flange portion 315c of the housing main body 315.

In the present embodiment, the stator 322 has a two-phase structure including the A-phase stator section 322a and the B-phase stator section 322b respectively corresponding to the A-phase AC voltage and the B-phase AC voltage. Thus, the rotor 323 also has the two-phase structure including the A-phase rotor section 323a and the B-phase rotor section 323b. Thus, the magnetic fluxes from the annular magnets 350 of the A-phase rotor section 323a and the B-phase rotor section 323b can be received in each of the corresponding one of the A-phase stator section 322a and the B-phase stator section 322b, and the output can be increased.

Next, advantages of the tenth embodiment will be described.

(1) The motor 312, provided as a drive source for the blower 310, includes the A-phase motor unit 312a and the B-phase motor unit 312b forming the multi-Lundell structure described above. More specifically, the A-phase motor unit 312a and the B-phase motor unit 312b forming the multi-Lundell structure respectively include the A-phase rotor section 323a and the B-phase rotor section 323b each having the Lundell structure. Thus, the number of poles can be easily changed by changing the number of the first and second rotor claw poles 333 and 343 without changing the number of annular magnets 350 and the like in each of the A-phase rotor section 323a and the B-phase rotor section 323b.

The A-phase motor unit 312a and the B-phase motor unit 312b forming the multi-Lundell structure respectively include the A-phase rotor section 323a and the B-phase rotor section 323b each having the Lundell structure. Thus, the number of poles can be easily changed by changing the number of the first and second stator claw poles 363 and 373 without changing the structure of the coil portion 380 in each of the A-phase stator section 322a and the B-phase stator section 322b.

In the present embodiment, the two motor units (the A-phase motor unit 312a and the B-phase motor unit 312b) forming the multi-Lundell structure are used. This allows for an increase in the output.

The tenth embodiment may be modified as follows.

Figure 39:
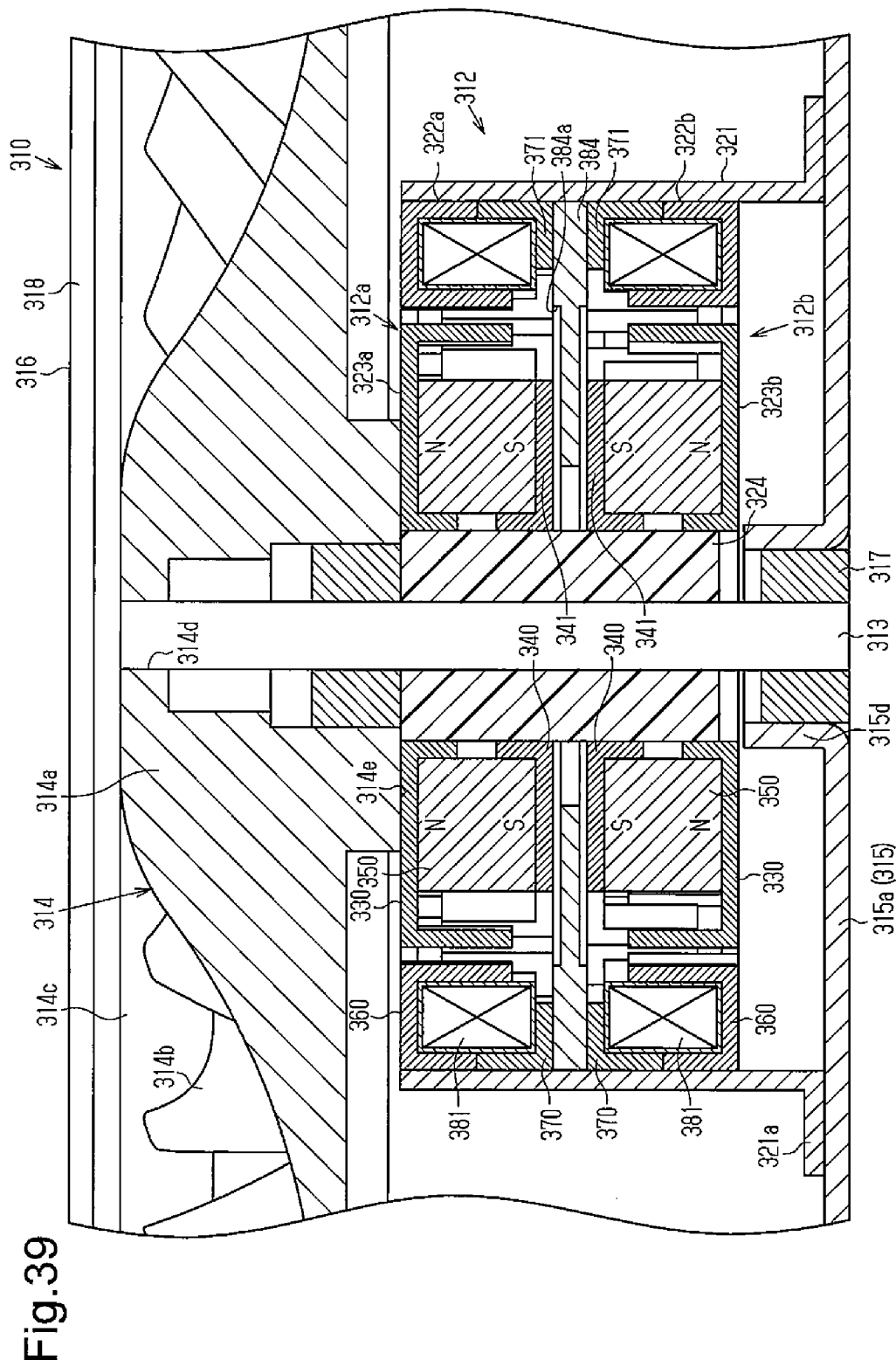
FIG. 39 is a cross-sectional view of a blower in a modified example of the tenth embodiment.

The control circuit board 384 is arranged in the void between the B-phase motor unit 312b and the bottom portion 315a in the tenth embodiment but may instead be arranged between the A-phase motor unit 312a and the B-phase motor unit 312b in the axial direction, for example, as illustrated in FIG. 39. In such an example, the spacer 383 arranged between the A-phase stator section 322a and the B-phase stator section 322b in the tenth embodiment is omitted. In such an example, the control circuit board 384 is arranged between the A-phase stator section 322a and the B-phase stator section 322b and between the A-phase rotor section 323a and the B-phase rotor section 323b.

The control circuit board 384 includes a step portion 384a, formed at its intermediate portion in the radial direction and serving as a thickness change point and has a thickness of an inner circumference side portion of the step portion 384a smaller than a thickness of an outer circumference side portion of the step portion 384a. The control circuit board 384 is in contact with the second stator core bases 371 of different phases in the axial direction, and opposes the second rotor core bases 341 of different phases with a gap in between in the axial direction. Thus, the gap is set so that contact with the A-phase rotor section 323a and the B-phase rotor section 323b that are rotating members is prevented.

The control circuit board 384 is arranged between the A-phase motor unit 312a and the B-phase motor unit 312b in the axial direction as described above and thus can be respectively arranged close to the A-phase motor unit 312a and the B-phase motor unit 312. Thus, the lead terminal can be directly brought into contact with the control circuit board 384 without using other components such as a terminal for electrically connecting the lead terminals of the annular shaped coil 381 of different phases to the control circuit board 384. As a result, the control circuit board 384 and the annular shaped coil 381 can be connected with a simple structure. Furthermore, the motor performance can be improved without using the terminal and the like for the connection described above. When the control circuit board 384 is arranged between the A-phase motor unit 312a and the B-phase motor unit 312b, the leakage of electromagnetic noise generated in by operation of a switching element mounted on the control circuit board 384 can be prevented.

In the example illustrated in FIG. 39, the control circuit board 384 extends to a portion between the A-phase rotor section 323a and the B-phase rotor section 323b. With a rotation detection element, such as a Hall IC, provided in this extended portion, position information on the rotor 323 can be detected with the rotation detection element detecting magnetism from the first and second rotor claw poles 333 and 343. Thus, the position information on the rotor 323 can be detected without adding a sensor magnet to the rotor 323.

Eleventh Embodiment

An eleventh embodiment of a motor that is applied to a blower is described below. The present embodiment differs from the tenth embodiment only in the arrangement of the A-phase motor unit 312a and the B-phase motor unit 312b. Thus, the configurations that are the same as those in the tenth embodiment are denoted with the same reference numerals, and differences are described in detail.

Figure 40:
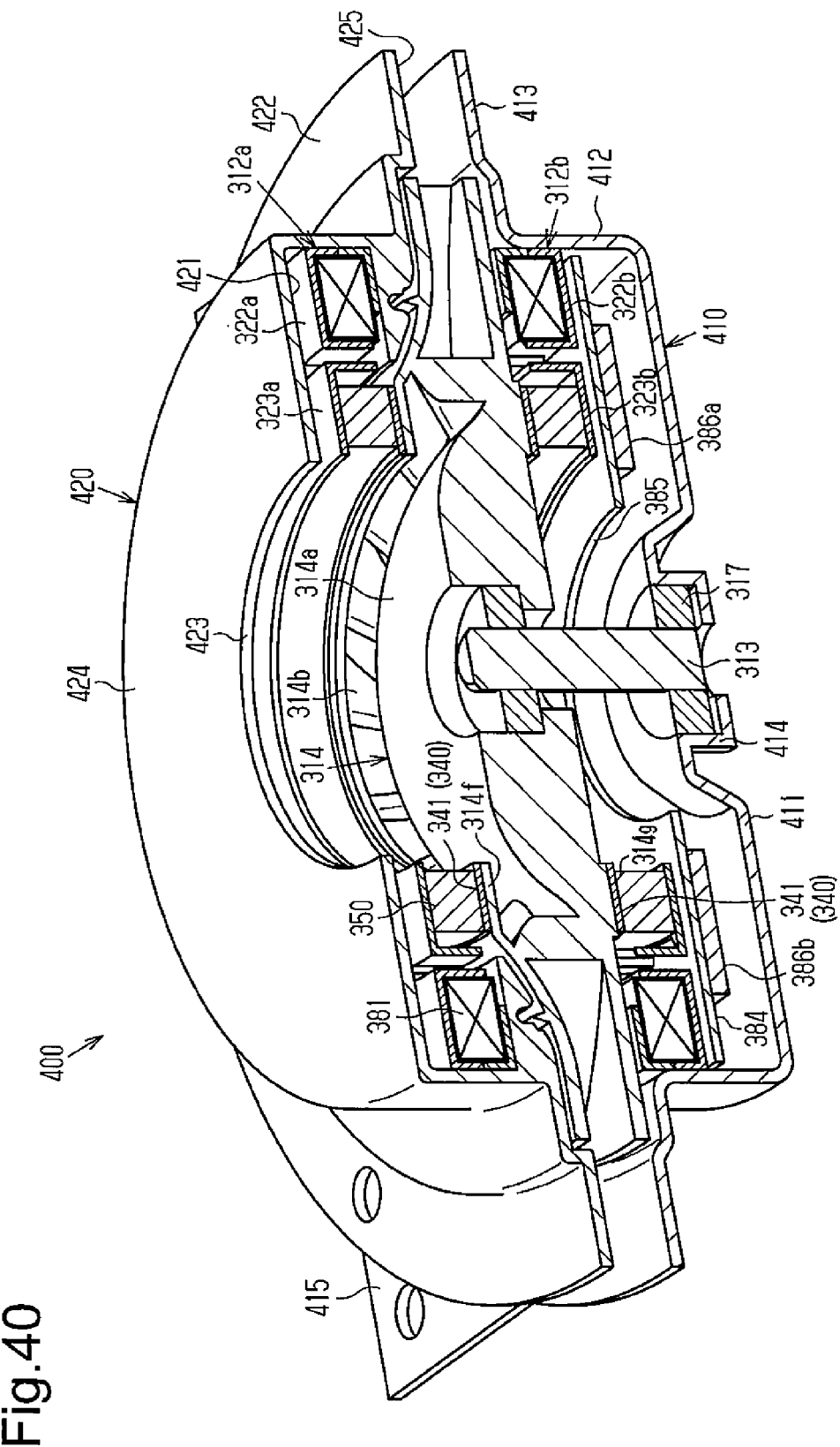
FIG. 40 is a perspective cross-sectional view of a blower in an eleventh embodiment.
Figure 41:
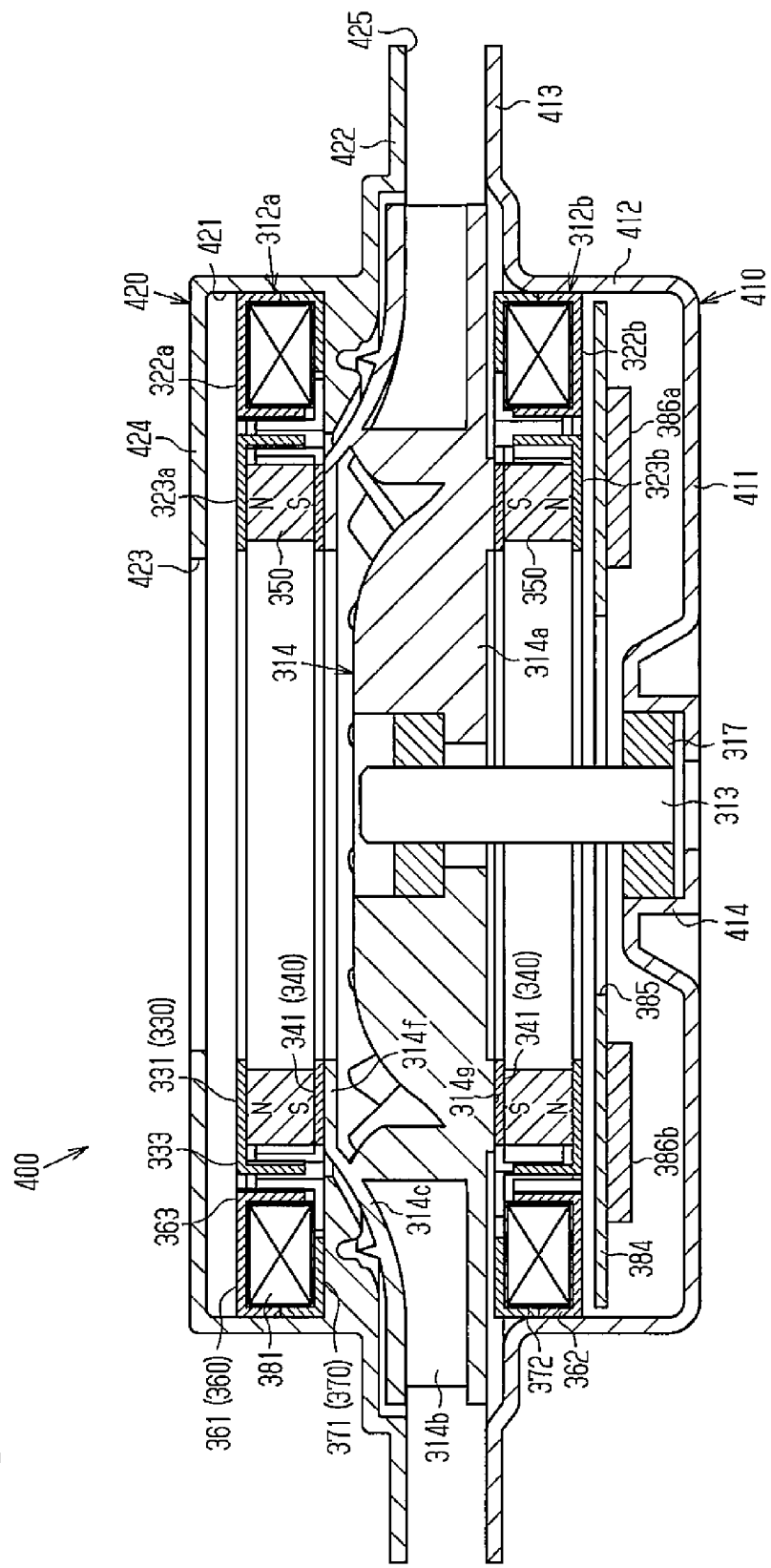
FIG. 41 is a cross-sectional view of the blower shown in FIG. 40.

As illustrated in FIG. 40 and FIG. 41, in a blower 400 according to the present embodiment, the A-phase motor unit 312a, forming the motor, is arranged at one axial side of the fan 314 (between the upper wall portion 314c and the fan 314), and the B-phase motor unit 312b is arranged at the other axial side of the fan 314 (between the base 314a and the fan 314). In other words, the fan 314 is arranged between the A-phase motor unit 312a and the B-phase motor unit 312b in the axial direction.

More specifically, the blower 400 according to the present embodiment includes a first housing (motor housing) 410 and a second housing (motor housing) 420 respectively arranged at opposite sides of the fan 314 in the axial direction. The first housing 410 is arranged close to the base 314a of the fan 314, and the second housing 420 is arranged close to the upper wall portion 314c of the fan 314. The first housing 410 corresponds to the housing main body 315 according to the tenth embodiment, and the second housing 420 corresponds to the top plate portion 316 according to the tenth embodiment.

More specifically, the first housing 410 has a bottomed cylindrical shape, and includes a bottom portion 411 having a circular shape as viewed in the axial direction of the axial direction, an outer circumference wall portion 412 having a cylindrical shape extending in the axial direction from the outer circumference edge of the bottom portion 411, and a bottom portion 411 extending in the radial direction from an end portion of the outer circumference wall portion 412 on the opposite side of the bottom portion 411. A bearing accommodating portion 414 is formed in a center portion of the bottom portion 411. A bearing 317 that axially supports the rotation shaft 313 is fixed in the bearing accommodating portion 414.

The second housing 420 has an annular shape as a whole, and includes a stator accommodating portion 421, in which the A-phase stator section 322a is accommodated, and a flange portion 422, having an annular plate shape extending outward in the radial direction from the stator accommodating portion 421. The stator accommodating portion 421 has a rectangular U shaped cross-sectional shape, open inward in the radial direction.

The flange portion 422 of the second housing 420 is arranged to oppose the flange portion 413 of the first housing 410 with a predetermined distance in between in the axial direction, and is fixed to the flange portion 413 with a screw (not illustrated) and the like for example. An outer circumference edge of the fan 314 is arranged between the flange portions 413 and 422. A fixing portion 415 where the blower 400 is arranged is formed on the flange portion 413 of the first housing 410 extending outward in the radial direction.

The second housing 420 includes an upper bottom portion 424 having a circular upper bottom portion 424 open in the axial direction of the rotation shaft 313. The intake port 423 is set to have a diameter that is substantially the same as an inner diameter of the A-phase rotor section 323a, which will be described later. Furthermore, a configuration that is substantially the same as that in the tenth embodiment is employed so that a blowing port 425 include an opening (gap) between the flange portions 413 and 422 of the first and second housings 410 and 420 serves as a blowing port 425.

The A-phase stator section 322a, serving as a component of the A-phase motor unit 312a arranged on the axially upper side of the fan 314 (between the upper wall portion 314c and the fan 314), is accommodated and fixed in the stator accommodating portion 421 of the second housing 420. The A-phase rotor section 323a is arranged on the inner circumferential side of the A-phase stator section 322a.

The A-phase rotor section 323a is fixed to an extending portion 314f extending outward in the radial direction from the inner edge portion of the upper wall portion 314c of the fan 314. More specifically, the extending portion 314f has a flat plate shape extending in the direction orthogonal to the axis of the rotation shaft 313. A second rotor core base 341 (second rotor core 340) in the A-phase rotor section 323a is fixed to the upper surface of the extending portion 314f with an adhesive and the like, for example.

The B-phase stator section 322b, which serves as a component of a B-phase motor unit 312b arranged at a lower side of the fan 314 (between the base 314a and the fan 314) in the axial direction, is fixed to the inner circumference surface of the outer circumference wall portion 412 of the first housing 410. The B-phase rotor section 323b is arranged on the inner circumferential side of the B-phase stator section 322b.

The B-phase rotor section 323b is fixed to a fixing surface 314g formed on the axial direction lower end surface of the base 314a of the fan 314. The fixing surface 314g has planar shape extending in the direction orthogonal to the axis of the rotation shaft 313. The second rotor core base 341 (second rotor core 340) in the B-phase rotor section 323b is fixed to the fixing surface 314g with an adhesive and the like for example.

The A-phase stator section 322a and the B-phase stator section 322b according to the eleventh embodiment and the counterparts in the tenth embodiment are different from each other in sizes and the like, but are the same in the basic configuration. The A-phase stator section 322a and the B-phase stator section 322b are arranged to have their second stator cores 370 opposing the fan 314. As in the tenth embodiment, the A-phase stator section 322a and the B-phase stator section 322b are arranged so that an angle of arrangement of the B-phase stator section 322b with respect to the A-phase stator section 322a is set so that shifting in the clockwise direction by a predetermined angle is achieved as viewed in the axial direction from the A-phase motor unit 312a.

The A-phase rotor section 323a and the B-phase rotor section 323b according to the eleventh embodiment have substantially the same configuration as the counterparts in the tenth embodiment, but are different therefrom in that the inner circumference wall portions 332 and 342 are formed on the first and second rotor cores bases 331 and 341. As in the tenth embodiment, an angle of arrangement of the B-phase rotor section 323b with respect to the A-phase rotor section 323a is set so that shifting in the clockwise direction by a predetermined angle is achieved as viewed in the axial direction from the A-phase motor unit 312a.

Figure 42:
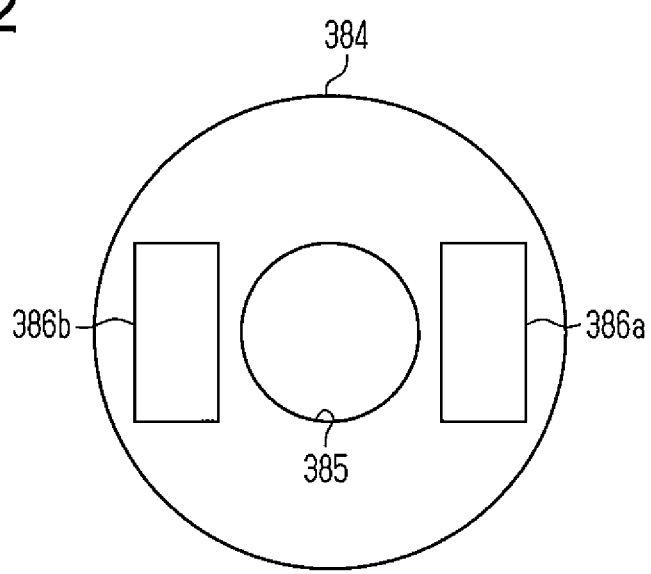
FIG. 42 is a plan view of a control circuit board shown in FIG. 40.

In the eleventh embodiment, the control circuit board 384 is accommodated in the first housing 410. The first housing 410 is arranged between the bottom portion 411 and the B-phase motor unit 312b (the B-phase stator section 322b and the B-phase rotor section 323b) in the first housing 410. As illustrated in FIG. 40 and FIG. 42, the control circuit board 384 has an annular plate shape with a center hole 385 in which the rotation shaft 313 is inserted, as illustrated in FIG. 40 and FIG. 42. An A-phase driving circuit 386a and a B-phase driving circuit 386b are respectively mounted to 180 opposite positions, in the circumferential direction of the rotation shaft 313, in a back surface (a plate surface close to the bottom portion 411) of the control circuit board 384.

The lead terminals (not illustrated) of the annular shaped coils 381 of the A-phase stator section 322a and the B-phase stator section 322b are respectively connected to the A-phase driving circuit 386a and the B-phase driving circuit 386b. The annular shaped coil 381 of the phase stator section 322a is supplied with the A-phase AC voltage through the lead terminal from the A-phase driving circuit 386a. The annular shaped coil 381 of the B-phase stator section 322b is supplied with the B-phase AC voltage through the lead terminal from the B-phase driving circuit 386b.

Next, and operation in the eleventh embodiment will be described.

When the annular shaped coil 381 of the A-phase stator section 322a is supplied with the A-phase AC voltage, and the annular shaped coil 381 of the B-phase stator section 322b is supplied with the B-phase AC voltage with a predetermined phase difference from the A-phase AC voltage, a rotating magnetic field is generated in the stator 322, whereby rotational force for rotating the A-phase rotor section 323a and the B-phase rotor section 323b is generated. Thus, the fan 314 to which the A-phase rotor section 323a and the B-phase rotor section 323b are fixed integrally rotates with the rotation shaft 313. Then, by the operation of the vanes 314b of the fan 314, the air is taken in through the intake port 423 of the second housing 420 and the axially inner side of the A-phase rotor section 23a, passes between the base 314a and the upper wall portion 314c of the fan 314, and is blown outward in the radial direction through the blowing port 319 between the flange portions 413 and 422 of the first and second housings 410 and 420. Thus, the air flows between the A-phase motor unit 312a and the B-phase motor unit 312b, as the fan 314 rotates.

Next, advantages of the eleventh embodiment will be described.

(1) The A-phase motor unit 312a is provided to one axial side of the fan 314, and the B-phase motor unit 312b is provided to the other axial side of the fan 314. In this configuration, the fan 314 is rotated by the rotational force of the rotor 323 generated on both axial sides of the fan 314. Thus, the shaft runout can be effectively prevented when the fan 314 rotates. With the fan 314 arranged between the A-phase motor unit 312a and the B-phase motor unit 312b, small wind noise of the fan 314 leaking out can be achieved. The A-phase motor unit 312a and the B-phase motor unit 312b are separated from each other by the fan 314, and thus leakage flux and the like that may be generated due to magnetic interference between the A-phase motor unit 312a and the B-phase motor unit 312b can be reduced.

(2) The A-phase rotor section 323a is fixed to the axial direction first end surface (the end surface of the upper wall portion 314c) of the fan 314, and the B-phase rotor section 323b is fixed to the axial direction second end surface (the fixing surface 314g of the base 314a) of the fan 314. In this configuration, the A-phase rotor section 323a and the B-phase rotor section 323b are directly fixed to the fan 314 and thus an attempt to downsize the blower 400 in the axial direction can be facilitated.

(3) The inner side of the A-phase rotor section 323a in the radial direction serves a flow path of the air flowing due to the rotation of the fan 314. In this configuration, the air passes through the inner side of the A-phase rotor section 323a in the radial direction when the fan 314 rotates, and thus heat generated in the A-phase motor unit 312a can be prevented from staying. Thus, the resistance in the annular shaped coil 381 can be prevented from increasing due to heat, and as a result, the motor output can be prevented from degrading.

The tenth and the eleventh embodiments may be modified as follows.

The fan 314 is directly fixed to the A-phase rotor section 323a in the tenth embodiment, and is directly connected to the A-phase rotor section 323a and the B-phase rotor section 323b in the eleventh embodiment. However, the embodiments are not limited to this. For example, in the tenth embodiment, the fan 314 may be fixed to be integrally rotatable with the rotation shaft 313 without being directly fixed to the A-phase rotor section 323a. In the same manner, in the eleventh embodiment, the fan 314 may be fixed to be integrally rotatable with the rotation shaft 313 without being directly fixed to the A-phase rotor section 323a and the B-phase rotor section 323b. The rotation shaft 313 and the A-phase rotor section 323a and the B-phase rotor section 323b can integrally rotate also in this configuration.

In the eleventh embodiment, the fan 314 and the A-phase rotor section 323a and the B-phase rotor section 323b integrally rotate with the rotation shaft 313. However, the structure is not limited in such a manner. For example, a fixed shaft that cannot rotate may be provided to the first housing 410 or the second housing 420 instead of the rotation shaft 313 according to the eleventh embodiment, and the fan 314 may be axially supported by the fixed shaft.

In the tenth and the eleventh embodiments, the A-phase rotor section 323a and the B-phase rotor section 323b are the rotor sections in the 16 pole Lundell structure, and the A-phase stator section 322a and the B-phase stator section 322b are the stator sections in the 16 pole Lundell structure. The number of the first and second rotor claw poles 333 and 343 and the number of the first and second stator claw poles 363 and 373 may be changed. For example, the number of magnetic poles obtained by the A-phase rotor section 323a and the B-phase rotor section 323b and the A-phase stator section 322a and the B-phase stator section 322b may be the number other than 16 such as eight or twenty-four.

In the tenth and the eleventh embodiments, the motor 312 includes the two motor units forming the multi-Lundell structure. However, the structure is not limited in such a manner. More specifically, the motor 312 may not be a motor including the A-phase motor unit 312a and the B-phase motor unit 312b (the number of phases of the motor is two). For example, the number of phases of the motor may be changed as appropriate, and a motor including one or three or more motor units may be employed.

In the tenth embodiment, the A-phase motor unit 312a and the B-phase motor unit 312b of the motor 312 are arranged between the fan 314 and the bottom portion 315a (on the opposite side of the intake port 318 with respect to the fan 314). However, the structure is not limited in such a manner. For example, the A-phase motor unit 312a and the B-phase motor unit 312b may be provided to the upper wall portion 314c of the fan 314, as in the case of the A-phase motor unit 312a according to the eleventh embodiment. Thus, the A-phase stator section 322a and the B-phase stator section 322b are supported by the top plate portion 316. The A-phase rotor section 323a and the B-phase rotor section 323b configured to be capable of rotating integrally with each other, with the A-phase rotor section 323a or the B-phase rotor section 323b fixed to the upper wall portion 314c of the fan 314.

In such a configuration, the inner sides of the A-phase rotor section 323a and the B-phase rotor section 323b in the radial direction serve as the flow path of the air flowing due to the rotation of the fan 314. In this configuration, heat generated in the motor 312 can be prevented from staying. Thus, the resistance in the annular shaped coil 381 can be prevented from increasing due to heat, and as a result, the output of the motor 312 can be prevented from degrading.

The annular magnets 350 of the A-phase rotor section 323a and the B-phase rotor section 323b are formed of the ferrite sintered magnet in the tenth and the eleventh embodiments. However, the structure is not limited in such a manner. For example, the annular magnet 350 may be formed of other permanent magnets including a neodymium magnet and a samarium-cobalt magnet.

In the tenth and the eleventh embodiments, the first and second rotor cores 330 and 340 and the first and second stator cores 360 and 370 are each formed by a single magnetic steel sheet but may also be formed by stacking a plurality of thin magnetic steel sheets. The first and second rotor cores 330 and 340 and the first and second stator cores 360 and 370 may be formed of a powder magnetic core.

A configuration of covering the circumference of the annular shaped coil 381 with the coil insulating layer 382 formed by resin molding in the tenth and the eleventh embodiments may also be implemented by a cylindrical coil bobbin.

The configurations such as the shapes of the housing 311 (the first and second housings 410 and 420) of the blowers 310 and 400 and the fan 314 is not limited to those in the tenth and the eleventh embodiments, and can be changed in accordance with the configuration.

Next, technical concepts that can be recognized from the tenth embodiment and the eleventh embodiment are described below.

(A) A blower in which the rotor section of a first single motor unit is fixed to an axial direction first end surface of the fan, and the rotor section of a second single motor unit is fixed to an axial direction second end surface of the fan.

(B) A blower including a flow path through which air flows when the fan rotates formed at an inner side of the rotor in the radial direction.

The above-described first to eleventh embodiments and their modified examples may be combined.

The invention claimed is:
1. A motor comprising:
  a stator including an inner circumference stator section and an outer circumference stator section, which is located at an outer circumferential side of the inner circumference stator section, wherein the inner circumference stator section and the outer circumference stator section each include
    two stator cores each including a plurality of claw poles in a circumferential direction, wherein the stator cores are coupled to each other so that the claw poles of one of the stator cores and the claw poles of the other one of the stator cores are alternately arranged in the circumferential direction, and
    a coil located between the two stator cores in an axial direction to cause the claw poles to function as magnetic poles; and
  a rotor rotated by a rotating magnetic field generated at the stator, wherein the rotor includes
    an inner circumference magnet located at an inner circumferential side of the inner circumference stator section and opposed to the claw poles in a radial direction, and
    an outer circumference magnet located at an outer circumferential side of the outer circumference stator section and opposed to the claw poles in the radial direction, wherein
  the inner circumference stator section and the inner circumference magnet configure an inner circumference motor unit, and
  the outer circumference stator section and the outer circumference magnet configure an outer circumference motor unit.
2. The motor according to claim 1, wherein
  at least one of the inner circumference stator section and the outer circumference stator section includes a projection projecting in the axial direction from each of the claw poles, and
  the rotor includes an axial opposing magnet that opposes the projection in the axial direction.
3. The motor according to claim 2, wherein the coil of the inner circumference stator section and the coil of the outer circumference stator section are each supplied with drive current of a different phase.
4. The motor according to claim 1, wherein the inner circumference motor unit and the outer circumference motor unit are configured to have different phases.
5. The motor according to claim 1, wherein
  the inner circumference motor unit is one of a plurality of inner circumference motor units arranged in the axial direction, and
  the outer circumference motor unit is one of a plurality of outer circumference motor units arranged in the axial direction.
6. The motor according to claim 5, wherein
  the plurality of inner circumference motor units are configured to have different phases, and
  the plurality of outer circumference motor units are configured to have different phases.
7. The motor according to claim 1, comprising a ventilation passage extending between the inner circumference stator section and the outer circumference stator section, wherein the ventilation passage communicates a first axial side and a second axial side of the stator.

8. The motor according to claim 7, wherein
  the inner circumference stator section and the outer circumference stator section are spaced apart by a gap in the radial direction, and
  the ventilation passage is configured by an outer circumference surface of the inner circumference stator section and an inner circumference surface of the outer circumference stator section that are opposed to each other and spaced apart from each other in the radial direction.
9. The motor according to claim 8, wherein at least one of the outer circumference surface of the inner circumference stator section and the inner circumference surface of the outer circumference stator section configuring the ventilation passage includes a large number of recesses and projections.
10. A motor comprising:
  a rotor including first and second rotor cores stacked in an axial direction, each including a plurality of claw poles arranged in a circumferential direction, and a permanent magnet located between the first rotor core and the second rotor core and magnetized in the axial direction;
  a stator including first and second stator cores stacked in the axial direction, each including a plurality of claw poles arranged in the circumferential direction, and a coil located between the first stator core and the second stator core and extended in the circumferential direction; and
  at least one of a rotor insulator and a stator insulator, wherein
  the rotor insulator is engaged with at least one of the claw poles of the first rotor core and at least one of the claw poles of the second rotor core in a manner restricting relative movement in the circumferential direction, and
  the stator insulator is engaged with at least one of the claw poles of the first stator core and at least one of the claw poles of the second stator core in a manner restricting relative movement in the circumferential direction.
11. The motor according to claim 10, wherein
  the stator is configured by stacking in the axial direction a plurality of stator sections, each including the first stator core, the second stator core, the coil, and the stator insulator, and
  the stator insulators of adjacent ones of the stator sections in the axial direction are engaged with each other in a manner restricting relative movement in the circumferential direction.
12. The motor according to claim 10, wherein
  the stator includes the stator insulator,
  the first stator core and the second stator core are spaced apart by a void, and
  the stator insulator projects toward the void from side surfaces of the first stator core and the second stator core opposing the void.
13. The motor according to claim 10, wherein
  the stator includes the stator insulator, and
  the stator insulator includes a coil guide groove that receives an end portion of the coil.
14. The motor according to claim 10, wherein
  the stator is configured by stacking in the axial direction a plurality of stator sections, each including the first stator core, the second stator core, the coil, and the stator insulator,
  the stator insulator of each of the stator sections includes at least one of a first axial projection and a second axial projection, the first axial projection projects further toward an outer side of the stator section than the first stator core in the axial direction, and the second axial projection projects further toward the outer side of the stator section than the second stator core in the axial direction.

15. The motor according to claim 10, wherein the rotor includes the rotor insulator, the stator includes the stator insulator and opposes the rotor in the radial direction, and the rotor insulator and the stator insulator each include a slidable contact portion, wherein the slidable contact portions come into slidable contact with each other in the rotational direction between the first and second rotor cores opposed in the radial direction and the first and second stator cores opposed in the radial direction.

16. The motor according to claim 10, wherein the rotor is configured by stacking in the axial direction a plurality of rotor sections, each including the first rotor core, the second rotor core, the permanent magnet, and the rotor insulator, and the rotor insulators of adjacent ones of the rotor sections in the axial direction are engaged with each other in a manner restricting relative movement in the circumferential direction.

17. A blower comprising:

a motor including a rotor and a stator arranged opposing each other in a radial direction; and a fan configured to be rotatable integrally with the rotor, wherein the motor includes a motor housing, the rotor, and the stator, the rotor includes a first rotor core, a second rotor core, and a permanent magnet, the first and second rotor cores each include a claw pole including a core base configured to be rotatable integrally with the fan, a basal portion extending in the radial direction from the core base, and a magnetic pole portion extending in an axial direction from a distal end of the basal portion, the permanent magnet is located between the first and second rotor cores and magnetized in the axial direction, the stator includes a first stator core, a second stator core, and a coil, the first and second stator core each include a claw pole including a core base supported by the motor housing, a basal portion extending in the radial direction from the core base, and a magnetic pole portion extending in the axial direction from a distal end of the basal portion, and the coil is located between the first and second stator cores and extended in a circumferential direction.

18. The blower according to claim 17, wherein the rotor includes a plurality of rotor sections, the plurality of rotor sections each include the first rotor core, the second rotor core, and the permanent magnet, the stator includes a plurality of stator sections, the number of which is the same as the plurality of rotor sections, the plurality of stator sections each include the first stator core, the second stator core, and the coil, and corresponding ones of the rotor sections and the stator sections are arranged opposing each other in the radial direction and configure a single motor unit.

19. The blower according to claim 18, wherein the motor includes two of the single motor units, and a control circuit board that supplies drive voltage to the coil of each of the plurality of stator sections is located between the two motor units in the axial direction.

20. The blower according to claim 18, wherein the motor includes two of the single motor units, and the single motor units are arranged at opposite sides of the fan in the axial direction.

* * * * *